US012601923B2

(12) United States Patent
Connor

(10) Patent No.: US 12,601,923 B2
(45) Date of Patent: Apr. 14, 2026

(54) AUGMENTED REALITY (AR) EYEWEAR WITH AN ENVIRONMENT-ONLY VIEWING MODE AND AN AUGMENTED REALITY VIEWING MODE

(71) Applicant: Robert A. Connor, Wyoming, MN (US)

(72) Inventor: Robert A. Connor, Wyoming, MN (US)

(73) Assignee: Holovisions LLC, Ham Lake, MN (US)

( * ) Notice: Subject to any disclaimer, the term of this patent is extended or adjusted under 35 U.S.C. 154(b) by 0 days.

(21) Appl. No.: 18/800,091

(22) Filed: Aug. 11, 2024

(65) Prior Publication Data

US 2024/0402504 A1     Dec. 5, 2024

Related U.S. Application Data

(63) Continuation-in-part of application No. 18/586,439, filed on Feb. 24, 2024, now Pat. No. 12,205,231, which is a continuation-in-part of application No. 18/088,548, filed on Dec. 24, 2022, now Pat. No. 12,013,538, which is a continuation-in-part of application No. 17/722,354, filed on Apr. 17, 2022, now Pat. No. 11,754,843, which is a continuation-in-part of application No. 17/501,495, filed on Oct. 14, 2021, now Pat. No. 11,307,420, which is a continuation-in-part of application No. 16/686,170, filed on Nov. 17, 2019, now Pat. No. 11,163,163, which is a continuation-in-part of application No. 16/175,924, filed on Oct. 31, 2018, now Pat. No. 10,859,834, which is a
(Continued)

(51) Int. Cl.
*G02B 27/01* (2006.01)
*G02C 5/14* (2006.01)

(52) U.S. Cl.
CPC ..... *G02B 27/0176* (2013.01); *G02B 27/0172* (2013.01); *G02C 5/146* (2013.01); *G02B 2027/0156* (2013.01); *G02B 2027/0178* (2013.01)

(58) Field of Classification Search
CPC ............ G02B 27/0176; G02B 27/0172; G02B 2027/0156; G02B 2027/0178; G02B 2027/0154; G02B 2027/0159; G02B 26/0816; G02C 5/146; G02C 11/10
See application file for complete search history.

(56) References Cited

U.S. PATENT DOCUMENTS 9,678,349 B2 *  6/2017  Yang ................... G02B 27/0093
10,042,186 B2 *  8/2018  Chao ...................... G02C 11/10
10,215,698 B2   2/2019  Han et al.
(Continued)

*Primary Examiner* — Collin X Beatty

(57) ABSTRACT

This invention is augmented reality eyewear with a first mode which provides a clear, bright, wide-angle environment-only view when needed and a second mode which displays an augmented reality view when needed. This eyewear can have a virtual-object-display component which pivots between being on an eyewear sidepiece (e.g. temple) and being in front of a person's eye. It also includes a light emitter, wherein the virtual-object-display component reflects and/or refracts light from the light emitter toward the person's eye when the virtual-object-display component is in its second configuration.

14 Claims, 20 Drawing Sheets

Related U.S. Application Data continuation-in-part of application No. 15/942,498, filed on Mar. 31, 2018, now Pat. No. 10,338,400.

(60) Provisional application No. 63/212,054, filed on Jun. 17, 2021, provisional application No. 63/192,664, filed on May 25, 2021, provisional application No. 62/791,359, filed on Jan. 11, 2019, provisional application No. 62/751,076, filed on Oct. 26, 2018, provisional application No. 62/749,775, filed on Oct. 24, 2018, provisional application No. 62/746,487, filed on Oct. 16, 2018, provisional application No. 62/720,171, filed on Aug. 21, 2018, provisional application No. 62/716,507, filed on Aug. 9, 2018, provisional application No. 62/714,684, filed on Aug. 4, 2018, provisional application No. 62/703,025, filed on Jul. 25, 2018, provisional application No. 62/699,800, filed on Jul. 18, 2018, provisional application No. 62/695,124, filed on Jul. 8, 2018, provisional application No. 62/646,856, filed on Mar. 22, 2018, provisional application No. 62/638,087, filed on Mar. 3, 2018, provisional application No. 62/624,699, filed on Jan. 31, 2018, provisional application No. 62/572,328, filed on Oct. 13, 2017, provisional application No. 62/563,798, filed on Sep. 27, 2017, provisional application No. 62/561,834, filed on Sep. 22, 2017, provisional application No. 62/528,331, filed on Jul. 3, 2017.

(56) References Cited

U.S. PATENT DOCUMENTS

| | | | |
|---|---|---|---|
| 10,690,986 B2 | 6/2020 | Firka et al. | |
| 10,768,451 B1 | 9/2020 | Carlson | |
| 10,962,783 B2 | 3/2021 | Wilson et al. | |
| 11,086,143 B1 | 8/2021 | Gill et al. | |
| 11,215,829 B2 | 1/2022 | Topliss et al. | |
| 11,467,407 B2 | 10/2022 | DeLapp et al. | |
| 11,885,968 B2 | 1/2024 | Hua et al. | |
| 2008/0198324 A1* | 8/2008 | Fuziak | G02C 5/001 351/158 |
| 2009/0174946 A1* | 7/2009 | Raviv | G02B 27/0176 359/632 |
| 2013/0021658 A1 | 1/2013 | Miao et al. | |
| 2013/0077175 A1 | 3/2013 | Hotta et al. | |
| 2013/0314759 A1 | 11/2013 | Miao et al. | |
| 2014/0003762 A1 | 1/2014 | Macnamara | |
| 2014/0036361 A1 | 2/2014 | Woodgate et al. | |
| 2015/0036223 A1 | 2/2015 | Dobschal et al. | |
| 2015/0168730 A1* | 6/2015 | Ashkenazi | G02B 27/0176 359/630 |
| 2016/0161740 A1 | 6/2016 | Bar-Zeev et al. | |
| 2016/0178910 A1 | 6/2016 | Giudicelli et al. | |
| 2016/0189432 A1 | 6/2016 | Bar-Zeev et al. | |
| 2016/0335806 A1 | 11/2016 | Chan et al. | |
| 2017/0139110 A1 | 5/2017 | Woodgate et al. | |
| 2017/0285347 A1 | 10/2017 | Cai et al. | |
| 2017/0299869 A1 | 10/2017 | Urey et al. | |
| 2017/0299870 A1 | 10/2017 | Urey et al. | |
| 2017/0345217 A1 | 11/2017 | Chan et al. | |
| 2018/0003962 A1 | 1/2018 | Urey et al. | |
| 2018/0003981 A1 | 1/2018 | Urey | |
| 2018/0074248 A1 | 3/2018 | Shani et al. | |
| 2018/0074318 A1 | 3/2018 | Wheelwright et al. | |
| 2018/0074319 A1 | 3/2018 | Wheelwright et al. | |
| 2018/0074320 A1 | 3/2018 | Wheelwright et al. | |
| 2018/0074323 A1 | 3/2018 | Wheelwright et al. | |
| 2018/0074324 A1 | 3/2018 | Wheelwright et al. | |
| 2018/0074325 A1 | 3/2018 | Wheelwright et al. | |
| 2018/0100959 A1 | 4/2018 | Vasylyev | |
| 2018/0143427 A1 | 5/2018 | Griffin et al. | |
| 2018/0164882 A1 | 6/2018 | Johnson et al. | |
| 2018/0172995 A1 | 6/2018 | Lee et al. | |
| 2018/0172999 A1 | 6/2018 | Sulai et al. | |
| 2018/0173017 A1* | 6/2018 | Imagawa | G02B 27/0176 |
| 2018/0182150 A1 | 6/2018 | Benishti et al. | |
| 2018/0231784 A1 | 8/2018 | Koudsi et al. | |
| 2018/0252917 A1 | 9/2018 | Takahashi et al. | |
| 2018/0252918 A1 | 9/2018 | Takahashi et al. | |
| 2018/0284441 A1 | 10/2018 | Cobb | |
| 2018/0348524 A1 | 12/2018 | Blum et al. | |
| 2019/0025602 A1 | 1/2019 | Qin et al. | |
| 2019/0041232 A1 | 2/2019 | Maruyama et al. | |
| 2019/0043238 A1 | 2/2019 | Benishti et al. | |
| 2019/0090766 A1 | 3/2019 | Block et al. | |
| 2019/0094537 A1 | 3/2019 | Choi et al. | |
| 2019/0094550 A1 | 3/2019 | Takagi et al. | |
| 2019/0101764 A1 | 4/2019 | Cakmakci | |
| 2019/0101767 A1 | 4/2019 | Geng et al. | |
| 2019/0107719 A1 | 4/2019 | Edwin et al. | |
| 2019/0107723 A1 | 4/2019 | Lee et al. | |
| 2019/0121143 A1* | 4/2019 | Zhang | G02B 27/0176 |
| 2019/0129213 A1 | 5/2019 | Cho et al. | |
| 2019/0158810 A1 | 5/2019 | Cho et al. | |
| 2019/0162950 A1 | 5/2019 | Lapstun | |
| 2019/0165052 A1 | 5/2019 | Son et al. | |
| 2019/0187472 A1 | 6/2019 | Choi et al. | |
| 2019/0227305 A1 | 7/2019 | Fortin-Desch Nes et al. | |
| 2019/0227315 A1 | 7/2019 | Sun et al. | |
| 2019/0228586 A1 | 7/2019 | Bar-Zeev et al. | |
| 2019/0235252 A1 | 8/2019 | Freedman et al. | |
| 2019/0235281 A1 | 8/2019 | Etzkorn et al. | |
| 2019/0265476 A1 | 8/2019 | Blum et al. | |
| 2019/0265515 A1 | 8/2019 | Lee et al. | |
| 2019/0273916 A1 | 9/2019 | Benishti et al. | |
| 2019/0278092 A1 | 9/2019 | Kuo et al. | |
| 2019/0282399 A1 | 9/2019 | Goetz | |
| 2019/0285960 A1 | 9/2019 | Sasa et al. | |
| 2019/0289284 A1 | 9/2019 | Smith et al. | |
| 2019/0293938 A1 | 9/2019 | Le Saux et al. | |
| 2019/0294019 A1 | 9/2019 | Park et al. | |
| 2019/0294109 A1 | 9/2019 | Lee et al. | |
| 2019/0331918 A1 | 10/2019 | Hong | |
| 2019/0331923 A1 | 10/2019 | Cai et al. | |
| 2019/0331924 A1 | 10/2019 | Cai et al. | |
| 2019/0339528 A1 | 11/2019 | Freeman et al. | |
| 2019/0348460 A1 | 11/2019 | Chen et al. | |
| 2019/0352808 A1 | 11/2019 | Yoon et al. | |
| 2019/0353906 A1 | 11/2019 | Gollier et al. | |
| 2019/0361245 A1 | 11/2019 | Lanman et al. | |
| 2019/0371065 A1 | 12/2019 | Anders et al. | |
| 2019/0377182 A1 | 12/2019 | Sharp | |
| 2019/0377183 A1 | 12/2019 | Sharp | |
| 2019/0377184 A1 | 12/2019 | Sharp et al. | |
| 2019/0377186 A1 | 12/2019 | Collins | |
| 2019/0378338 A1 | 12/2019 | Bar-Zeev et al. | |
| 2019/0378872 A1 | 12/2019 | Chen et al. | |
| 2019/0385342 A1 | 12/2019 | Freeman et al. | |
| 2019/0391396 A1 | 12/2019 | Saarikko | |
| 2020/0012110 A1 | 1/2020 | Blum et al. | |
| 2020/0026076 A1 | 1/2020 | Beckman | |
| 2020/0033693 A1 | 1/2020 | Lu et al. | |
| 2020/0041798 A1 | 2/2020 | Kress et al. | |
| 2020/0064627 A1 | 2/2020 | Ouderkirk et al. | |
| 2020/0081252 A1 | 3/2020 | Jamali et al. | |
| 2020/0110268 A1 | 4/2020 | Robbins et al. | |
| 2020/0117005 A1 | 4/2020 | Chi et al. | |
| 2020/0124858 A1 | 4/2020 | Cakmakci | |
| 2020/0132919 A1 | 4/2020 | Cakmakci | |
| 2020/0142109 A1 | 5/2020 | Olkkonen et al. | |
| 2020/0142202 A1 | 5/2020 | Lee et al. | |
| 2020/0159026 A1 | 5/2020 | Waldern et al. | |
| 2020/0166691 A1 | 5/2020 | Vartiainen et al. | |
| 2020/0166756 A1 | 5/2020 | DeLapp et al. | |
| 2020/0174255 A1 | 6/2020 | Hollands et al. | |
| 2020/0192095 A1 | 6/2020 | Puetz et al. | |
| 2020/0192152 A1 | 6/2020 | Jamali et al. | |
| 2020/0209626 A1 | 7/2020 | Huang et al. | |
| 2020/0225479 A1 | 7/2020 | Chi et al. | |
| 2020/0249480 A1 | 8/2020 | Martinez et al. | |
| 2020/0257065 A1 | 8/2020 | Chi et al. | |

(56)         References Cited

U.S. PATENT DOCUMENTS

| | | | |
|---|---|---|---|
| 2020/0259307 A1 | 8/2020 | Sharma et al. |
| 2020/0271936 A1 | 8/2020 | Leibovici et al. |
| 2020/0271938 A1 | 8/2020 | Taylor et al. |
| 2020/0281457 A1 | 9/2020 | Zimanyi |
| 2020/0281458 A1 | 9/2020 | Zimanyi |
| 2020/0301151 A1 | 9/2020 | Freedman et al. |
| 2020/0301153 A1 | 9/2020 | Toleno et al. |
| 2020/0301239 A1 | 9/2020 | Akkaya et al. |
| 2020/0303151 A1 | 9/2020 | Du et al. |
| 2020/0333596 A1 | 10/2020 | Yoon et al. |
| 2020/0334907 A1 | 10/2020 | Bender et al. |
| 2020/0336731 A1 | 10/2020 | Welch et al. |
| 2020/0345293 A1 | 11/2020 | Ras et al. |
| 2020/0348514 A1 | 11/2020 | Chi et al. |
| 2020/0348518 A1 | 11/2020 | Georgiou et al. |
| 2020/0348522 A1 | 11/2020 | Xiao et al. |
| 2020/0355929 A1 | 11/2020 | Zhang et al. |
| 2020/0371280 A1 | 11/2020 | Geng et al. |
| 2020/0371362 A1 | 11/2020 | Xiao et al. |
| 2020/0371371 A1 | 11/2020 | Liang et al. |
| 2020/0371387 A1 | 11/2020 | Gollier et al. |
| 2020/0371388 A1 | 11/2020 | Geng et al. |
| 2020/0393736 A1 | 12/2020 | Hu |
| 2020/0393910 A1 | 12/2020 | Gribetz et al. |
| 2020/0396431 A1 | 12/2020 | Stafford |
| 2020/0400955 A1 | 12/2020 | Messer et al. |
| 2020/0408981 A1 | 12/2020 | Curtis et al. |
| 2021/0003848 A1 | 1/2021 | Choi et al. |
| 2021/0011290 A1 | 1/2021 | Maimone et al. |
| 2021/0018657 A1 | 1/2021 | Tsai et al. |
| 2021/0026138 A1 | 1/2021 | Alasaarela et al. |
| 2021/0033790 A1 | 2/2021 | Ward et al. |
| 2021/0041704 A1 | 2/2021 | Bhargava et al. |
| 2021/0051315 A1 | 2/2021 | Shamir et al. |
| 2021/0055466 A1 | 2/2021 | Eisenfeld |
| 2021/0055546 A1 | 2/2021 | Shin et al. |
| 2021/0055548 A1 | 2/2021 | Rao et al. |
| 2021/0055551 A1 | 2/2021 | Chi et al. |
| 2021/0055552 A1 | 2/2021 | Chi et al. |
| 2021/0055560 A1 | 2/2021 | Tez et al. |
| 2021/0055561 A1 | 2/2021 | Danziger et al. |
| 2021/0055563 A1 | 2/2021 | Bouchier et al. |
| 2021/0055580 A1 | 2/2021 | Wells et al. |
| 2021/0063606 A1 | 3/2021 | Glik et al. |
| 2021/0063733 A1 | 3/2021 | Ronen |
| 2021/0063774 A1 | 3/2021 | Wang et al. |
| 2021/0065427 A1 | 3/2021 | Wade |
| 2021/0066402 A1 | 3/2021 | Pu et al. |
| 2021/0066574 A1 | 3/2021 | Diest et al. |
| 2021/0072437 A1 | 3/2021 | Singh et al. |
| 2021/0072453 A1 | 3/2021 | Peng et al. |
| 2021/0072541 A1 | 3/2021 | Kim et al. |
| 2021/0072559 A1 | 3/2021 | Wang et al. |
| 2021/0072585 A1 | 3/2021 | Shipton et al. |
| 2021/0072821 A1 | 3/2021 | Von Und Zu Liechtenstein |
| 2021/0074067 A1 | 3/2021 | Kwon et al. |
| 2021/0080635 A1 | 3/2021 | Menezes et al. |
| 2021/0080721 A1 | 3/2021 | Geng et al. |
| 2021/0080722 A1 | 3/2021 | Geng et al. |
| 2021/0080724 A1 | 3/2021 | Sulai et al. |
| 2021/0080725 A1 | 3/2021 | Sulai et al. |
| 2021/0080726 A1 | 3/2021 | Geng et al. |
| 2021/0080730 A1 | 3/2021 | Morrison et al. |
| 2021/0080739 A1 | 3/2021 | Geng et al. |
| 2021/0080763 A1 | 3/2021 | Sulai et al. |
| 2021/0080906 A1 | 3/2021 | Jolly et al. |
| 2021/0088700 A1 | 3/2021 | Wang et al. |
| 2021/0088794 A1 | 3/2021 | Melville |
| 2021/0088795 A1 | 3/2021 | Cheng et al. |
| 2021/0089129 A1 | 3/2021 | Osterhout et al. |
| 2021/0096380 A1 | 4/2021 | Osmanis et al. |
| 2021/0096391 A1 | 4/2021 | Ma et al. |
| 2021/0096453 A1 | 4/2021 | Wheelwright et al. |
| 2021/0103145 A1 | 4/2021 | You et al. |
| 2021/0103180 A1 | 4/2021 | Sears et al. |
| 2021/0103182 A1 | 4/2021 | Tan et al. |
| 2021/0109278 A1 | 4/2021 | Peroz et al. |
| 2021/0109352 A1 | 4/2021 | Lee et al. |
| 2021/0109433 A1 | 4/2021 | Trisnadi et al. |
| 2021/0112647 A1 | 4/2021 | Coleman |
| 2021/0191125 A1 | 6/2021 | Li et al. |
| 2021/0215938 A1 | 7/2021 | Maimone et al. |
| 2021/0240036 A1 | 8/2021 | Jamali et al. |
| 2021/0255490 A1 | 8/2021 | Parsons et al. |
| 2022/0006987 A1 | 1/2022 | Seiler et al. |
| 2022/0043323 A1 | 2/2022 | Skirlo et al. |
| 2023/0014448 A1 | 1/2023 | Morin et al. |
| 2023/0288707 A1 | 9/2023 | Guan |
| 2023/0333358 A1 | 10/2023 | Ha |
| 2023/0360567 A1 | 11/2023 | Yang |
| 2023/0367073 A1 | 11/2023 | Landig et al. |
| 2023/0367123 A1 | 11/2023 | Amirsolaimani |
| 2023/0367128 A1 | 11/2023 | Ha |
| 2023/0368477 A1 | 11/2023 | Moskalev |
| 2023/0393309 A1 | 12/2023 | Rao et al. |
| 2023/0400690 A1 | 12/2023 | Marsh et al. |
| 2023/0400748 A1 | 12/2023 | Valentine et al. |
| 2023/0408826 A1 | 12/2023 | Oh et al. |

* cited by examiner

AUGMENTED REALITY (AR) EYEWEAR WITH AN ENVIRONMENT-ONLY VIEWING MODE AND AN AUGMENTED REALITY VIEWING MODE

CROSS-REFERENCE TO RELATED APPLICATIONS

This application is a continuation-in-part of U.S. patent application Ser. No. 18/586,439 filed on 2024 Feb. 24.

U.S. patent application Ser. No. 18/586,439 was a continuation-in-part of U.S. patent application Ser. No. 18/088, 548 filed on 2022 Dec. 24. U.S. patent application Ser. No. 18/088,548 was a continuation-in-part of U.S. patent application Ser. No. 17/722,354 filed on 2022 Apr. 17. U.S. patent application Ser. No. 17/722,354 was a continuation-in-part of U.S. patent application Ser. No. 17/501,495 filed on 2021 Oct. 14.

U.S. patent application Ser. No. 17/501,495 was a continuation-in-part of U.S. patent application Ser. No. 16/686, 170 filed on 2019 Nov. 17. U.S. patent application Ser. No. 17/501,495 claimed the priority benefit of U.S. provisional patent application 63/192,664 filed on 2021 May 25. U.S. patent application Ser. No. 17/501,495 claimed the priority benefit of U.S. provisional patent application 63/212,054 filed on 2021 Jun. 17. U.S. patent application Ser. No. 16/686,170 claimed the priority benefit of U.S. provisional patent application 62/791,359 filed on 2019 Jan. 11. U.S. patent application Ser. No. 16/686,170 was a continuation-in-part of U.S. patent application Ser. No. 16/175,924 filed on 2018 Oct. 31 which issued as U.S. Pat. No. 10,859,834 on 2020 Dec. 8.

U.S. patent application Ser. No. 16/175,924 claimed the priority benefit of U.S. provisional patent application 62/751,076 filed on 2018 Oct. 26. U.S. patent application Ser. No. 16/175,924 claimed the priority benefit of U.S. provisional patent application 62/749,775 filed on 2018 Oct. 24. U.S. patent application Ser. No. 16/175,924 claimed the priority benefit of U.S. provisional patent application 62/746,487 filed on 2018 Oct. 16. U.S. patent application Ser. No. 16/175,924 claimed the priority benefit of U.S. provisional patent application 62/720,171 filed on 2018 Aug. 21. U.S. patent application Ser. No. 16/175,924 claimed the priority benefit of U.S. provisional patent application 62/716,507 filed on 2018 Aug. 9. U.S. patent application Ser. No. 16/175,924 claimed the priority benefit of U.S. provisional patent application 62/714,684 filed on 2018 Aug. 4. U.S. patent application Ser. No. 16/175,924 claimed the priority benefit of U.S. provisional patent application 62/703,025 filed on 2018 Jul. 25. U.S. patent application Ser. No. 16/175,924 claimed the priority benefit of U.S. provisional patent application 62/699,800 filed on 2018 Jul. 18. U.S. patent application Ser. No. 16/175,924 claimed the priority benefit of U.S. provisional patent application 62/695,124 filed on 2018 Jul. 8. U.S. patent application Ser. No. 16/175,924 was a continuation-in-part of U.S. patent application Ser. No. 15/942,498 filed on 2018 Mar. 31 which issued as U.S. Pat. No. 10,859,83410338400 on 2019 Jul. 2. U.S. patent application Ser. No. 16/175,924 claimed the priority benefit of U.S. provisional patent application 62/646,856 filed on 2018 Mar. 22. U.S. patent application Ser. No. 16/175,924 claimed the priority benefit of U.S. provisional patent application 62/638,087 filed on 2018 Mar. 3. U.S. patent application Ser. No. 16/175,924 claimed the priority benefit of U.S. provisional patent application 62/624,699 filed on 2018 Jan. 31.

U.S. patent application Ser. No. 15/942,498 claimed the priority benefit of U.S. provisional patent application 62/646,856 filed on 2018 Mar. 22. U.S. patent application Ser. No. 15/942,498 claimed the priority benefit of U.S. provisional patent application 62/638,087 filed on 2018 Mar. 3. U.S. patent application Ser. No. 15/942,498 claimed the priority benefit of U.S. provisional patent application 62/624,699 filed on 2018 Jan. 31. U.S. patent application Ser. No. 15/942,498 claimed the priority benefit of U.S. provisional patent application 62/572,328 filed on 2017 Oct. 13. U.S. patent application Ser. No. 15/942,498 claimed the priority benefit of U.S. provisional patent application 62/563,798 filed on 2017 Sep. 27.U.S. patent application Ser. No. 15/942,498 claimed the priority benefit of U.S. provisional patent application 62/561,834 filed on 2017 Sep. 22. U.S. patent application Ser. No. 15/942,498 claimed the priority benefit of U.S. provisional patent application 62/528,331 filed on 2017 Jul. 3.

The entire contents of these related applications are incorporated herein by reference.

FEDERALLY SPONSORED RESEARCH

Not Applicable

SEQUENCE LISTING OR PROGRAM

Not Applicable

BACKGROUND

Field of Invention This invention relates to augmented reality eyewear.

Introduction

Augmented reality (or mixed reality) eyewear superimposes images of virtual objects on a person's view of the real world. Augmented reality eyewear can be embodied in specialized eyeglasses or a head mounted display. With current technology, there is a tradeoff between augmented reality eyewear designs which provide the best view (e.g. clear, bright, and wide-angle) of the real world and designs which provide the best view (e.g. clear, bright, and opaque) of virtual objects. There is a need for augmented reality eyewear which optimizes, or entirely avoids, this trade off. Ideally, augmented reality eyewear should be able to provide a clear, bright, wide-angle view of the real world when needed, but also provide a clear, bright, opaque view of virtual objects when needed.

Review of the Relevant Art

U.S. patent application 20130021658 (Miao et al., Jan. 24, 2013, "Compact See-Through Display System") discloses an optical system with a display panel, an image former, a viewing window, a proximal beam splitter, and a distal beam splitter. U.S. patent application 20130077175 (Hotta et al., Mar. 28, 2013, "Display Device") discloses a display device with an image projection unit, an optical unit, and a mounting unit. U.S. patent application 20130314759 (Miao et al., Nov. 28, 2013, "Compact See-Through Display System") discloses an optical system with a display panel, an image former, a viewing window, a proximal beam splitter, and a distal beam splitter.

U.S. patent application 20140003762 (Macnamara, Jan. 2, 2014, "Multiple Depth Plane Three-Dimensional Display Using a Wave Guide Reflector Array Projector") discloses a two-dimensional array of linear wave guides and 2D planar wave guide assemblies. U.S. patent applications 20140036361 (Woodgate et al., Feb. 6, 2014, "Directionally Illuminated Waveguide Arrangement") and 20170139110 (Woodgate et al., May 18, 2017, "Directionally Illuminated Waveguide Arrangement") disclose a light-guiding valve apparatus comprising an optical valve, a two dimensional light source array, and a focusing optic for providing large area collimated illumination from localized light sources. U.S. patent application 20150036223 (Dobschal et al., Feb. 5, 2015, "Display Device Comprising Multifunction Glass, Production Method and Optical Element Having a Fresnel Structure") discloses a multifunction optical element with a Fresnel structure for out coupling.

U.S. patent application 20160161740 (Bar-Zeev et al., Jun. 9, 2016, "Automatic Variable Virtual Focus for Augmented Reality Displays") discloses an augmented reality display wherein a user's focal region is tracked and a virtual object is displayed in that region. U.S. patent application 20160178910 (Giudicelli et al., Jun. 23, 2016, "Optical Projection Device for Display Means Such as Augmented Reality Glasses") discloses augmented reality glasses with a planar optical guide, at least two input optics, and at least two collimation elements. U.S. patent application 20160189432 (Bar-Zeev et al., Jun. 30, 2016, "Automatic Focus Improvement for Augmented Reality Displays") discloses a see-through display with a variable focus lens.

U.S. patent applications 20160335806 (Chan et al., Nov. 17, 2016, "Reprojection OLED Display for Augmented Reality Experiences") and 20170345217 (Chan et al., Nov. 30, 2017, "Reprojection OLED Display for Augmented Reality Experiences") disclose methods for displaying virtual images in an augmented reality environment at a frame rate that is greater than a rendering frame rate. U.S. patent applications 20170285347 (Cai et al., Oct. 5, 2017, "Augmented/Virtual Reality Near-Eye Displays with Edge Imaging Lens Comprising A Plurality of Display Devices"), 20190331923 (Cai et al., Oct. 31, 2019, "Augmented/Virtual Reality Near-Eye Displays with Edge Imaging Lens Comprising a Plurality of Display Devices"), and 20190331924 (Cai et al., Oct. 31, 2019, "Augmented/Virtual Reality Near-Eye Displays with Edge Imaging Lens Comprising a Plurality of Display Devices") disclose a lens with a beam-splitting interface which is horizontal along the width of the lens.

U.S. patent application 20170299869 (Urey et al., Oct. 19, 2017, "Near-to-Eye Display Device") discloses a near-to-eye display device with a spatial light modulator which modulates an illumination wave to create a virtual-scene wave that is steered to an exit pupil plane. U.S. patent application 20170299870 (Urey et al., Oct. 19, 2017, "Apparatus for Generating a Coherent Beam Illumination") discloses an apparatus which generates a coherent illumination beam. U.S. patent application 20180003962 (Urey et al., Jan. 4, 2018, "Near-to-Eye Display Device with Variable Resolution") discloses a near-to-eye display device with a spatial light modulator and a microdisplay.

U.S. patent application 20180003981 (Urey, Jan. 4, 2018, "Near-to-Eye Display Device with Spatial Light Modulator and Pupil Tracker") discloses a near-to-eye display device with a spatial light modulator, a rotatable reflective optical element, and a pupil-tracking device. U.S. patent application 20180074318 (Wheelwright et al., Mar. 15, 2018, "Hybrid Fresnel Lens with Reduced Artifacts") discloses a lens wherein a first portion of a first lens surface is defined by a smooth surface profile function and a second portion of the first lens surface is defined by a Fresnel surface profile function. U.S. patent application 20180074319 (Wheelwright et al., Mar. 15, 2018, "Hybrid Fresnel Lens with Increased Field of View") discloses a lens portion with a Fresnel surface profile. U.S. patent application 20180074324 (Wheelwright et al., Mar. 15, 2018, "Fresnel Lens with Dynamic Draft for Variable Gaze") discloses a lens configured for transmitting light in a first medium to a first reference pupil including an optically transparent substrate having a plurality of Fresnel structures.

U.S. patent application 20180074248 (Shani et al., Mar. 15, 2018, "Slim Waveguide Coupling Apparatus and Method") discloses an illumination structure with a discrete light source near a bottom surface of a waveguide and below a depression in a top surface thereof. U.S. patent applications 20180074320 (Wheelwright et al., Mar. 15, 2018, "Dynamic Draft for Fresnel Lenses"), 20180074323 (Wheelwright et al., Mar. 15, 2018, "Fresnel Lens with Dynamic Draft for Reduced Optical Artifacts"), and 20180074325 (Wheelwright et al., Mar. 15, 2018, "Fresnel Lens with Dynamic Pitch") disclose lenses with a plurality of Fresnel structures. U.S. patent application 20180100959 (Vasylyev, Apr. 12, 2018, "Illumination System Using Edge-Lit Waveguide and Microstructured Surfaces") discloses an apparatus for distributing light from a planar waveguide through an array of elongated surface relief features formed in a major surface of the waveguide.

U.S. patent application 20180143427 (Griffin et al., May 24, 2018, "Optical System for a Display with an Off Axis Projector") discloses an optical projection system that presents a displayed virtual image at a predetermined distance in front of a viewing position. U.S. patent application 20180164882 (Johnson et al., Jun. 14, 2018, "Electronic Device with Adjustable Reflective Display") discloses a tracking system that gathers point-of-gaze information, vergence information, and head position information. U.S. patent application 20180172999 (Sulai et al., Jun. 21, 2018, "Multifocal System with Polarizing Elements") discloses a head-mounted display (HMD) with a multifocal block having one or more possible focal distances.

U.S. patent applications 20180172995 (Lee et al., Jun. 21, 2018, "Waveguide Display with a Small Form Factor, a Large Field of View, and a Large Eyebox"), 20190107723 (Lee et al., Apr. 11, 2019, "Waveguide Display with a Small Form Factor, a Large Field of View, and a Large Eyebox"), and 20200142202 (Lee et al., May 7, 2020, "Waveguide Display with a Small Form Factor, a Large Field of View, and a Large Eyebox") disclose a device with a waveguide display and one or more projectors which project an image light at least along one dimension. U.S. patent applications 20180182150 (Benishti et al., Jun. 28, 2018, "Combining Video-Based and Optic-Based Augmented Reality in a Near Eye Display"), 20190043238 (Benishti et al., Feb. 7, 2019, "Combining Video-Based and Optic-Based Augmented Reality in a Near Eye Display"), and 20190273916 (Benishti et al., Sep. 5, 2019, "Combining Video-Based and Optic-Based Augmented Reality in a Near Eye Display") disclose an array of variably-transparent pixels.

U.S. patent application 20180231784 (Koudsi et al., Aug. 16, 2018, "Optical Display System for Augmented Reality and Virtual Reality") discloses optical display systems and methods for providing three-dimensional and two-dimensional convergence corrected images to a user. U.S. patent application 20180252917 (Takahashi et al., Sep. 6, 2018, "Display Image Projection Apparatus and Display Image Projection System") discloses a free-curved surface Fresnel mirror inside an HUD unit. U.S. patent application 20180252918 (Takahashi et al., Sep. 6, 2018, "Display Image Projection System") discloses an aspherical mirror or a free-curved surface mirror inside an HUD unit.

U.S. patent application 20180284441 (Cobb, Oct. 4, 2018, "Wide Field Head Mounted Display") discloses an optical apparatus with a concave spherical mirror that has a center of curvature at the viewer's pupil. U.S. patent application 20180348524 (Blum et al., Dec. 6, 2018, "Releasably Attachable Augmented Reality System for Eyewear") discloses an Augmented Reality apparatus which uses existing eyewear as an attachment platform. U.S. patent application 20190025602 (Qin et al., Jan. 24, 2019, "Compact Near-Eye Display Optics for Augmented Reality") discloses an optical system with three filter stacks which convert light via circular polarization. U.S. patent application 20190041232 (Maruyama et al., Feb. 7, 2019, "Vehicular Display Device") discloses a vehicular display device which displays a guide route.

U.S. Pat. No. 10,215,698 (Han et al., Feb. 29, 2019, "Multiple Light Paths Architecture and Obscuration Methods for Signal and Perfusion Index Optimization") disclose a photoplethysmographic device with one or more light emitters and one or more light sensors. U.S. patent application 20190090766 (Block et al., Mar. 28, 2019, "Concentric Architecture for Optical Sensing") discloses an electronic device with optical sensing and a concentric architecture. U.S. patent application 20190094537 (Choi et al., Mar. 28, 2019, "Display Device") discloses a display device with a plurality of diffractive optical elements which are each configured to emit light guided through a light guide plate to a user. U.S. patent application 20190094550 (Takagi et al., Mar. 28, 2019, "Virtual Image Display Device") discloses a non-telecentric optical system with an image display unit.

U.S. patent application 20190101764 (Cakmakci, Apr. 4, 2019, "Head-Worn Augmented Reality Display") discloses a combiner and a microdisplay device, wherein the combiner has a curved transparent structure and a reflective surface. U.S. patent application 20190101767 (Geng et al., Apr. 4, 2019, "Fresnel Assembly for Light Redirection in Eye Tracking Systems") discloses a head-mounted device with a display element, a Fresnel assembly, an illumination source, and a camera assembly. U.S. patent application 20190107719 (Edwin et al., Apr. 11, 2019, "Augmented Reality Display Comprising Eyepiece Having a Transparent Emissive Display") discloses an augmented reality head-mounted display system with a transparent emissive display.

U.S. patent application 20190129213 (Cho et al., May 2, 2019, "Display Apparatus") discloses a display apparatus with a liquid crystal panel and a shutter panel. U.S. patent application 20190158810 (Cho et al., May 23, 2019, "Multi-Lens Based Capturing Apparatus and Method") discloses a multi-lens capturing apparatus. U.S. patent application 20190162950 (Lapstun, May 30, 2019, "Head-Mounted Light Field Display") by the genius from down under discloses a head-mounted light field display device with at least one multiplexed light field display module adapted to face an eye of a viewer wearing the device, the multiplexed light field display module comprising a light field view image generator and a waveguide with a set of shutters. U.S. patent application 20190165052 (Son et al., May 30, 2019, "Display Device and Eyeglasses-Like Augmented Reality Device Using the Same") discloses a display with a lower substrate, an upper substrate, an insulating layer over the lower substrate, and an organic light-emitting diode on the insulating layer.

U.S. patent application 20190187472 (Choi et al., Jun. 20, 2019, "Optical System and Wearable Display Apparatus Having the Same") discloses an optical system with a first waveguide. a transmissive reflective layer on the first waveguide, a second waveguide on the transmissive reflective layer, an in-coupler, and an out-coupler. U.S. patent application 20190227315 (Sun et al., Jul. 25, 2019, "Systems and Methods of Attenuating Light in a Display") discloses a display with a first light source, a second light source, a movable mirror, and an attenuator.

U.S. patent applications 20190228586 (Bar-Zeev et al., Jul. 25, 2019, "Opacity Filter for Display Device") and 20190378338 (Bar-Zeev et al., Dec. 12, 2019, "Opacity Filter for Display Device") disclose an optical see-through head-mounted display with a see-through lens and an opacity filter is used to selectively block portions of the real-world scene. U.S. patent application 20190227305 (Fortin-Desch Nes et al., Jul. 25, 2019, "Optical Arrangements Including Fresnel Lens Elements") discloses an optical lens arrangement with a first Fresnel lens element and a second lens element.

U.S. patent application 20190235252 (Freedman et al., Aug. 1, 2019, "Method and System for Large Field of View Display with Scanning Mirror Having Optical Power") discloses an image display system with light sources which are configured to emit uncollimated light and also an eyepiece waveguide having an input port which receives beams of light at differing angles. U.S. patent application 20190235281 (Etzkorn et al., Aug. 1, 2019, "Eye-Mountable Device to Provide Automatic Accommodation and Method of Making Same") discloses an eye-mountable device with a lens enclosure, liquid crystal material, first and second electrodes, a substrate, and a controller. U.S. patent application 20190265476 (Blum et al., Aug. 29, 2019, "See-Through Near Eye Optical Module") discloses a semi-transparent near eye optical module with a transparent sparsely populated near eye display comprising a plurality of pixels or pixel patches and a sparsely populated micro-lens array.

U.S. patent application 20190265515 (Lee et al., Aug. 29, 2019, "Failsafe Operation of Eye-Mountable Device") discloses an eye-mountable device with an optical lens, an accommodation actuator to provide vision accommodation for the optical lens, and a controller including an accommodation logic to select one of a plurality of vision accommodation states for the device. U.S. patent application 20190278092 (Kuo et al., Sep. 12, 2019, "Augmented Reality Display System and Display Method Thereof") discloses an augmented reality display system with an input unit, an operation processing unit, and an output unit. U.S. patent application 20190282399 (Goetz, Sep. 19, 2019, "Ultrasonic Ophthalmic Device") discloses an ophthalmic device with an ultrasonic transducer, an accommodation actuator, and a controller.

U.S. patent application 20190285960 (Sasa et al., Sep. 19, 2019, "Electrochromic Device, Electronic Dimming Eyeglasses, Augmented Reality Eyeglasses, and Camera") discloses an electrochromic device which is reversibly and controllably colored and decolored by electricity. U.S. patent application 20190289284 (Smith et al., Sep. 19, 2019, "Light Field Capture and Rendering for Head-Mounted Displays") discloses systems and methods for capturing and rendering light fields for head-mounted displays. U.S. patent application 20190293938 (Le Saux et al., Sep. 26, 2019, "Method for Providing a Display Unit for an Electronic Information Device") discloses a display device with an optical element having a nonzero optical power.

U.S. patent application 20190294019 (Park et al., Sep. 26, 2019, "Beam Scanning Apparatus and Optical Apparatus Including the Same") discloses a beam scanning apparatus with a reflective phased array device. U.S. patent application 20190294109 (Lee et al., Sep. 26, 2019, "Holographic Display Device") discloses a holographic display with a backlight unit for emitting light and a spatial light modulator. U.S. patent application 20190331918 (Hong, Oct. 31, 2019, "Display System and Image Display Method") discloses a display, a waveguide, an image acquisition device, and a calibration device. U.S. patent application 20190339528 (Freeman et al., Nov. 7, 2019, "Wearable Image Manipulation and Control System with High Resolution Micro-Displays and Dynamic Opacity Augmentation in Augmented Reality Glasses") discloses a mixed reality display with dynamic opacity.

U.S. patent applications 20190348460 (Chen et al., Nov. 14, 2019, "Multi-Photodiode Pixel Cell") and 20190378872 (Chen et al., Dec. 12, 2019, "Multi-Photodiode Pixel Cell") disclose a semiconductor substrate including first and second photodiodes and a barrier layer between the photodiodes, wherein the photodiodes and the barrier layer form a stack. U.S. patent application 20190352808 (Yoon et al., Nov. 21, 2019, "Electronically Functional Yarn and Textile") discloses integrating electronic functionality into textiles. U.S. patent application 20190353906 (Gollier et al., Nov. 21, 2019, "Optical Assembly with Polarization Volume Holographic Element") discloses an optical assembly with a partial reflector that is optically coupled with a first polarization volume holographic element. U.S. patent application 20190361245 (Lanman et al., Nov. 28, 2019, "Augmented Reality Head-Mounted Display with a Fresnel Combiner and Pupil Steering") discloses a head-mounted display with a light projector and a Fresnel combiner.

U.S. patent application 20190371065 (Anders et al., Dec. 5, 2019, "Augmented Reality Masking") discloses masks for the portion of a scene which is not processed for viewing via augmented reality. U.S. patent application 20190377182 (Sharp, Dec. 12, 2019, "Reverse-Order Crossed Pancake Lens with Azimuthal Compensation") discloses a pancake lens block with azimuthal compensation. U.S. patent application 20190377183 (Sharp, Dec. 12, 2019, "Reverse-Order Crossed Pancake Lens with a Shaped Polarizer") discloses a pancake lens block with a shaped reflective polarizer. U.S. patent application 20190377184 (Sharp et al., Dec. 12, 2019, "Reverse-Order Crossed Pancake Lens with Index Gradient Structure") discloses a reverse-order crossed pancake lens block having an index gradient structure.

U.S. patent application 20190377186 (Collins, Dec. 12, 2019, "Systems and Methods for Augmented Reality Display") discloses an augmented reality system with a power source, a sensor array, a lens, and a projector. U.S. patent application 20190385342 (Freeman et al., Dec. 19, 2019, "Wearable Image Manipulation and Control System with Micro-Displays and Augmentation of Vision and Sensing in Augmented Reality Glasses") discloses a wearable mixed reality system comprising a camera and an image projection system. U.S. patent application 20190391396 (Saarikko, Dec. 26, 2019, "Tiled Waveguide Display with a Wide Field-Of-View") discloses a waveguide display with light sources, a source waveguide, an output waveguide, and a controller.

U.S. patent application 20200012110 (Blum et al., Jan. 9, 2020, "Augmented Reality or Mixed Reality System for Eyewear") discloses a see-through display with a micro-lens array. U.S. patent application 20200026076 (Beckman, Jan. 23, 2020, "Augmented Reality Display Systems with Variable, Directional Light Transmission Enhancing Virtual Images at an Observation Point") discloses a matrix of light-augmenting pixels in a variable-transmission semi-transparent screen. U.S. patent application 20200033693 (Lu et al., Jan. 30, 2020, "Varifocal System Using Hybrid Tunable Liquid Crystal Lenses") discloses a varifocal system with a stacked first-type liquid crystal lens and a stacked second-type LC lens in series.

U.S. patent application 20200041798 (Kress et al., Feb. 6, 2020, "Head Wearable Display Using Powerless Optical Combiner") discloses a lightguide with internal optical elements that redirect the light with an expanded cross-section size that is larger than the initial cross-section size. U.S. patent application 20200064627 (Ouderkirk et al., Feb. 27, 2020, "Illumination Assembly with In-Field Micro Devices") discloses a transparent substrate and a plurality of micro devices coupled to conductive pathways. U.S. patent application 20200081252 (Jamali et al., Mar. 12, 2020, "Polarization-Sensitive Components in Optical Systems for Large Pupil Acceptance Angles") discloses an eye tracking module and optical elements combined to allow changes in the positions of one or both eyes.

U.S. patent application 20200110268 (Robbins et al., Apr. 9, 2020, "Compact Optical System with MEMS Scanners for Image Generation and Object Tracking") discloses an optical system with micro electro mechanical system (MEMS) scanners to generate images and to scan the real world. U.S. patent application 20200117005 (Chi et al., Apr. 16, 2020, "Waveguide for Conveying Multiple Portions of Field of View") discloses a waveguide for conveying light carrying an image. U.S. patent application 20200124858 (Cakmakci, Apr. 23, 2020, "Freeform Head Mounted Display") discloses lenses having a combined optical power to form a curved intermediate image.

U.S. patent application 20200132919 (Cakmakci, Apr. 30, 2020, "Curved Optical See-Through Thin Freeform Lightguide with Large Field of View in Eyewear Formfactor") discloses a lightguide, a microdisplay, and a field lens positioned therebetween that directs light from the microdisplay into a top surface of the lightguide. U.S. patent application 20200142109 (Olkkonen et al., May 7, 2020, "Display Element, Personal Display Device, Method of Producing an Image on a Personal Display and Use") discloses a lightguide that guides light by total internal reflection, a diffractive in-coupling grating, and a diffractive out-coupling grating.

U.S. patent application 20200159026 (Waldern et al., May 21, 2020, "Wearable Heads Up Displays") discloses a display with a first waveguide, an input grating, a fold grating, an output grating, an image input image node assembly, and prismatic relay optics. U.S. patent application 20200166691 (Vartiainen et al., May 28, 2020, "Diffractive Grating with Variable Diffraction Efficiency and Method for Displaying an Image") discloses an optical grating with a first zone and a second zone, each having a two-dimensionally periodic grating structure. U.S. patent application 20200166756 (DeLapp et al., May 28, 2020, "Displays with Volume Phase Gratings") and Ser. No. 11/467,407 (DeLapp et al., Oct. 11, 2022, "Displays with Volume Phase Gratings") discloses input and output couplers made from volume phase holographic gratings.

U.S. patent application 20200174255 (Hollands et al., Jun. 4, 2020, "Optical Systems with Multi-Layer Holographic Combiners") discloses first hologram structures that replicate light over multiple output angles onto second hologram structures. U.S. patent application 20200192095 (Puetz et al., Jun. 18, 2020, "Eyeglass Lens for an Optical Imaging Element, and Augmented Reality Glasses") discloses a lens with a main body and at least one complementary element mounted on the main body. U.S. patent applications 20200192152 (Jamali et al., Jun. 18, 2020, "Optical System Using Segmented Phase Profile Liquid Crystal Lenses") and 20210240036 (Jamali et al., Aug. 5, 2021, "Optical System Using Segmented Phase Profile Liquid Crystal Lenses") disclose an adaptive lens which is coupled to an electronic display between an electronic display and a user's eyes.

U.S. Pat. No. 10,690,986 (Firka et al., Jun. 23, 2020, "Electronic Devices Having Electrically Adjustable Optical Shutters") discloses an electrically adjustable shutter. U.S. patent application 20200209626 (Huang et al., Jul. 2, 2020, "Near-Eye Augmented Reality Device") discloses a near-eye augmented reality device with imaging unit portions having birefringence and positive diopter, a lighting unit, and a polarization-control unit. U.S. patent application 20200225479 (Chi et al., Jul. 16, 2020, "Volume Bragg Gratings for Near-Eye Waveguide Display") discloses a waveguide display with a substrate which is transparent to visible light, a coupler configured to couple display light into the substrate such that the display light propagates within the substrate through total internal reflection, a first multiplexed volume Bragg grating (VBG) on the substrate, and a second multiplexed VBG on the substrate.

U.S. patent application 20200249480 (Martinez et al., Aug. 6, 2020, "Multi-Focal Catadioptric Head Mounted Display with LC Switch") discloses a beam splitter with a polarization beam splitting film and a mirror coating to generate two orthogonal polarization states with different optical paths. U.S. patent application 20200257065 (Chi et al., Aug. 13, 2020, "Dispersion Compensation for Light Coupling Through Slanted Facet of Optical Waveguide") discloses a pupil expander with a waveguide having a slanted facet. U.S. patent application 20200259307 (Sharma et al., Aug. 13, 2020, "Optical Elements for Beam-Shaping and Illumination") discloses a device with a light source, an optical element, and an encapsulant layer.

U.S. patent application 20200271936 (Leibovici et al., Aug. 27, 2020, "Near-Eye Display System Having Optical Combiner") discloses a device with an optical waveguide and a plurality of grating structures having variable grating periods or slant angles. U.S. patent application 20200271938 (Taylor et al., Aug. 27, 2020, "Super-Resolution Scanning Display for Near-Eye Displays") discloses a super-resolution scanning display with a light source, a conditioning assembly, and a scanning mirror assembly. U.S. Pat. No. 10,768,451 (Carlson, Sep. 8, 2020, "Diffusers in Wearable Devices") discloses a diffuser that diffuses light in a radial anisotropic diffusion pattern or a prism-like diffusion pattern.

U.S. patent applications 20200281458 (Zimanyi, Sep. 10, 2020, "Guided Lens Design Exploration Method for a Progressive Lens Simulator") and 20200281457 (Zimanyi, Sep. 10, 2020, "Guided Lens Design Exploration System for a Progressive Lens Simulator") disclose a progressive lens simulator with an eye tracker. U.S. patent application 20200301151 (Freedman et al., Sep. 24, 2020, "Method and System for Large Field of View Display with Scanning Mirror Having Optical Power") discloses a display system with a plurality of light sources and a waveguide having an input port configured to receive beams of light at differing angles. U.S. patent application 20200301153 (Toleno et al., Sep. 24, 2020, "Near Eye Display (NED) Device Housing Shell Integrated with Molded Boss Clusters for Precision Mounting of Hardware Components") discloses a near-eye display device with a housing shell which is integrated with molded boss clusters.

U.S. patent application 20200301239 (Akkaya et al., Sep. 24, 2020, "Varifocal Display with Fixed-Focus Lens") discloses a display with a projector, an optical waveguide, a fixed-focus lens, and a variable-focus lens. U.S. patent application 20200303151 (Du et al., Sep. 24, 2020, "Method and System for Adjusting Focal Point Position") discloses ways to adjust a focal point position of an X-ray tube. U.S. patent application 20200333596 (Yoon et al., Oct. 22, 2020, "Reflective Polarizer for Augmented Reality and Virtual Reality Display") discloses a head-mounted display with a first reflective polarizer having a first optical surface and a second optical surface that is opposite to the first optical surface.

U.S. patent application 20200334907 (Bender et al., Oct. 22, 2020, "Dynamic Partition of Augmented Reality Region") discloses boundary dimension values for different areas relative to a reference geographic location. U.S. patent application 20200336731 (Welch et al., Oct. 22, 2020, "Light Projector Using an Acousto-Optical Control Device") discloses using surface acoustic waves along a substrate to guide image light to different areas. U.S. patent application 20200345293 (Ras et al., Nov. 5, 2020, "Device for Imaging Skin") discloses a skin imaging device. U.S. patent application 20200348514 (Chi et al., Nov. 5, 2020, "Waveguide Including Volume Bragg Gratings") discloses a waveguide with Volume Bragg Gratings (VBGs).

U.S. patent application . 20200348518 (Georgiou et al., Nov. 5, 2020, "Near-Eye Peripheral Display Device") discloses a head-mounted, near-eye display device with a central display and a peripheral display. U.S. patent applications 20200348522 (Xiao et al., Nov. 5, 2020, "Wearable AR System, AR Display Device and Its Projection Source Module") and 20200371371 (Liang et al., Nov. 26, 2020, "Wearable AR System, AR Display Device and Its Projection Source Module") disclose an augmented reality display comprising a projection source with a curved light outgoing surface. U.S. patent application 20200355929 (Zhang et al., Nov. 12, 2020, "Holographic Optical Elements for Eye-Tracking Illumination") discloses eye-tracking with a substrate transparent to visible light, an array of light sources in the substrate, and a holographic optical element coupled to the substrate.

U.S. patent application 20200371280 (Geng et al., Nov. 26, 2020, "Optical Waveguide Beam Splitter with Polarization Volume Gratings for Display") discloses an optical device for providing illumination light with a waveguide and a plurality of polarization selective elements. U.S. patent application 20200371362 (Xiao et al., Nov. 26, 2020, "Wearable AR System and AR Display Device") discloses a projector, a first optical path having a first beamsplitter and a first reflector, and a second optical path having a second beamsplitter and a second reflector. U.S. patent application 20200371387 (Gollier et al., Nov. 26, 2020, "Optical Waveguide Beam Splitter with Reflective Polarizers for Display") discloses an optical device with a waveguide and a plurality of reflective polarizers.

U.S. patent application 20200371388 (Geng et al., Nov. 26, 2020, "Optical Waveguide Beam Splitter with Extraction Features for Display") discloses an optical device with a spatial light modulator and an optical waveguide. U.S. patent application 20200393736 (Hu, Dec. 17, 2020, "Display Glasses Using Meta-Surface Planar Lens Integrated with Liquid Lens") discloses an integrated lens with a planar lens and a liquid lens. U.S. patent application 20200393910 (Gribetz et al., Dec. 17, 2020, "Extramissive Spatial Imaging Digital Eye Glass Apparatuses, Methods and Systems for Virtual or Augmediated Vision, Manipulation, Creation, or Interaction with Objects, Materials, or Other Entities") discloses a first phenomenon interface a first augmediated-reality space, a second phenomenon interface, and a second augmediated-reality space, implemented as an extramissive spatial imaging digital eye glass.

U.S. patent application 20200396431 (Stafford, Dec. 17, 2020, "Foveated Near to Eye Display System Using a Computational Freeform Lens via Spatial Light Modulation of a Laser Projected Image onto an Emissive Film") discloses a projection system wherein light is projected through a spatial light modulator that contains a phase-only image of a Freeform Fourier Lens that is a combination of a Fresnel lens, an X-phase grating, a Y-phase grating, and a radial grating. U.S. patent application 20200400955 (Messer et al., Dec. 24, 2020, "Eyepieces for Augmented Reality Display System") discloses an augmented reality display with an eyepiece waveguide with an input coupling grating region. U.S. patent application 20200408981 (Curtis et al., Dec. 31, 2020, "Display System Having a Plurality of Light Pipes for a Plurality of Light Emitters") discloses a display system with a plurality of light pipes and light sources which send light into the light pipes.

U.S. patent application 20210003848 (Choi et al., Jan. 7, 2021, "Electronic Device and Method for Displaying Augmented Reality") discloses an optical engine; a first polarizer, a polarization converter, a waveguide, a focus tunable lens, and a second polarizer. U.S. patent applications 20210011290 (Maimone et al., Jan. 14, 2021, "Method to Reduce Diffraction Artifacts in a Waveguide Display and Display Using the Same") and 20210215938 (Maimone et al., Jul. 15, 2021, "Method to Reduce Diffraction Artifacts in a Waveguide Display and Display Using the Same") disclose a waveguide with at least one switchable grating configured to: during a virtual-world subframe of a display frame, decouple the image light out of the waveguide via diffraction, and during a real-world subframe of the display frame, transmit a light from a real-world environment to the eyebox.

U.S. patent application 20210018657 (Tsai et al., Jan. 21, 2021, "Optical Module Comprising Lens Assembly") discloses a lens assembly with polymer layers, each layer with a lens portion and an extension portion and an image sensor positioned below the lens assembly. U.S. patent application 20210026138 (Alasaarela et al., Jan. 28, 2021, "Projection Device and Projection Method for Head Mounted Display Based on Rotary MEMS Fast Scanner") discloses a micro-electromechanical system (MEMS) coupled to a microscopic mirror. U.S. patent application 20210033790 (Ward et al., Feb. 4, 2021, "MEMS-Driven Optical Package with Micro-Led Array") discloses an optical output lens, an optical filter between the output lens and LEDS, a tray of LEDs arrayed on a stage.

U.S. patent application 20210041704 (Bhargava et al., Feb. 11, 2021, "Eyepieces for Augmented Reality Display System") discloses a waveguide, an optically transmissive substrate, an input coupling grating, a multi-directional pupil expander, and an exit pupil expander. U.S. patent application 20210051315 (Shamir et al., Feb. 18, 2021, "Optical Display, Image Capturing Device and Methods with Variable Depth of Field") discloses a pixelated illumination array and a fiber bundle. U.S. patent application 20210055466 (Eisenfeld, Feb. 25, 2021, "Projector Configuration with Subdivided Optical Aperture for Near-Eye Displays, and Corresponding Optical Systems") discloses a system for displaying a projected image with a light-guide optical element having two major parallel surfaces and a projected image collimated to infinity.

U.S. patent application 20210055546 (Shin et al., Feb. 25, 2021, "Image Display Device Capable of Multi-Depth Expression") discloses an display configured to modulate light to form an image, a light transmitting unit that transmits the image formed by the display device to eyes of a viewer and with a focusing member, and a driving unit. U.S. patent application 20210055548 (Rao et al., Feb. 25, 2021, "Reconfigurable Optics for Multi-Plane Heads-Up Displays") discloses a display, a moveable optic, an optical element positioned between the display and the moveable optic, a lens actuator, and a display controller. U.S. patent application 20210055551 (Chi et al., Feb. 25, 2021, "Dispersion Compensation in Volume Bragg Grating-Based Waveguide Display") discloses a waveguide with a substrate transparent to visible light, a coupler configured to couple display light into the substrate as a guided wave in the substrate, a first VBG, and a second VBG.

U.S. patent application 20210055552 (Chi et al., Feb. 25, 2021, "Multiple Projector Field-Of-View Stitched Waveguide Display") discloses a waveguide display with two light projectors. U.S. patent application 20210055560 (Ben Tez et al., Feb. 25, 2021, "Compact Optics in Crossed Configuration for Virtual and Mixed Reality") discloses an optical system with channels which generate immersive virtual images. U.S. patent application 20210055561 (Danziger et al., Feb. 25, 2021, "Near-Eye Display Having Overlapping Projector Assemblies") discloses a display with at least two projectors. U.S. patent application 20210055563 (Bouchier et al., Feb. 25, 2021, "Methods and Systems for Augmented Reality") discloses a see-through tunable holographic mirror or tunable LCD array mirror.

U.S. patent application 20210055580 (Wells et al., Feb. 25, 2021, "Transparent Phase Change Actuator") discloses a transparent optical element with electroactive ceramic between transparent electrodes. U.S. patent application 20210063606 (Glik et al., Mar. 4, 2021, "Metasurface Optical Coupling Elements for a Display Waveguide") discloses a waveguide display with a light-transmissive substrate and an optical coupling element configured to input light rays to the substrate or output light rays from the substrate. U.S. patent application 20210063733 (Ronen, Mar. 4, 2021, "Optical System Including Light-Guide Optical Element with Partially-Reflective Internal Surfaces") discloses a light-guide optical element having a pair of parallel external surfaces and a set of mutually-parallel reflector surfaces.

U.S. patent application 20210063774 (Wang et al., Mar. 4, 2021, "Eyeglasses") discloses eyeglasses with a rim, a temple, a control circuit or battery, and a rotating shaft connecting the rim and temple. U.S. patent application 20210065427 (Wade, Mar. 4, 2021, "Virtual and Augmented Reality Using Light Fields") discloses communicating light field data to a user device, wherein the light field data comprises content greater than a display field of view of the user device. U.S. patent application 20210066402 (Pu et al., Mar. 4, 2021, "Display Substrate, Display Panel, and Manufacturing Method of Display Substrate") discloses a display with a base substrate, a first electrode, a light-emitting functional layer, and a second electrode.

U.S. patent application 20210066574 (Diest et al., Mar. 4, 2021, "Structured Actuators: Shaped Electroactive Polymers") discloses an electroactive polymer layer with a non-axisymmetric shape. U.S. patent application 20210072821 (Von Und Zu Liechtenstein, Mar. 11, 2021, "Apparatus and Method for Rendering a Virtual Monitor on Smart Ophthalmic Devices in Augmented Reality Environments") discloses a liquid lens, an optical phased array, and a dimmable occlusion matrix. U.S. patent application 20210072437 (Singh et al., Mar. 11, 2021, "Display Device with Diffraction Grating Having Reduced Polarization Sensitivity") discloses diffraction gratings which incouple or outcouple light of different polarizations. U.S. patent application 20210072453 (Peng et al., Mar. 11, 2021. "Display with Switchable Retarder Array") discloses a waveguide, an array of tunable retarders, and a polarization selective optical element.

U.S. patent application 20210072541 (Kim et al., Mar. 11, 2021, "Electronic Device and Method for Controlling Electronic Device") discloses a display, a speaker, and a communication module. U.S. patent application 20210072559 (Wang et al., Mar. 11, 2021. "Eyeglasses") discloses an eyeglass frame and two speakers. U.S. patent application 20210072585 (Shipton et al., Mar. 11, 2021, "Magnetic Field Driven Liquid Crystal Patterning Control System") discloses liquid crystal patterning control systems in which liquid crystals are aligned by magnetic fields.

U.S. patent application 20210074067 (Kwon et al., Mar. 11, 2021, "Electronic Device for Displaying Object for Augmented Reality and Operation Method Therefor") discloses selecting an augmented reality (AR) object based on received music. U.S. patent application 20210080635 (Menezes et al., Mar. 18, 2021, "Waveguides Having Reflective Layers Formed by Reflective Flowable Materials") discloses a surface of a waveguide that is contacted with a reflective flowable material. U.S. patent application 20210080725 (Sulai et al., Mar. 18, 2021, "Display Device with Holographic Diffuser Display and See-Through Lens Assembly") discloses an optical diffuser which outputs diffused image light having a same polarization as image light.

U.S. patent application 20210080726 (Geng et al., Mar. 18, 2021, "Display Device with Diffusive Display and See-Through Lens Assembly") discloses a display which is configured to output diffused image light from a first surface and to transmit ambient light from a second surface to the first surface. U.S. patent application 20210080730 (Morrison et al., Mar. 18, 2021, "Transparent Optical Module Using Pixel Patches and Associated Lenslets") discloses a transparent optical device comprising an optical architecture hierarchy. U.S. patent application 20210080739 (Geng et al., Mar. 18, 2021, "Short Distance Illumination of a Spatial Light Modulator Using a Pancake Lens Assembly") discloses a light source, a spatial light modulator (SLM), a first reflective surface, and a second reflective surface that is opposite to the first reflective surface.

U.S. patent application 20210080763 (Sulai et al., Mar. 18, 2021, "Display Device with Switchable Diffusive Display and See-Through Lens Assembly") discloses a display having optically anisotropic molecules between a front surface and a back surface. U.S. patent application 20210080906 (Jolly et al., Mar. 18, 2021, "Near-To-Eye and See-Through Holographic Displays") discloses a holographic display with space-multiplexed elemental modulators, each of which consists of a surface acoustic wave transducer atop an anisotropic waveguide.

U.S. patent applications 20210080721 (Geng et al., Mar. 18, 2021, "Thin See-Through Pancake Lens Assembly and Display Device Including the Same") and 20210080722 (Geng et al., Mar. 18, 2021, "Curved See-Through Pancake Lens Assembly and Display Device Including the Same") disclose an optical assembly which transmits image light received at a first surface in an optical path that includes reflection at each of a reflector and a beam splitter before the image light is output from a second surface. U.S. patent applications 20210080724 (Sulai et al., Mar. 18, 2021, "Display Device with Transparent Emissive Display and See-Through Lens Assembly") and 20210080763 (Sulai et al., Mar. 18, 2021, "Display Device with Switchable Diffusive Display and See-Through Lens Assembly") disclose a display which outputs image light from a front surface and transmits ambient light from a back surface to the front surface.

U.S. patent application 20210088700 (Wang et al., Mar. 25, 2021, "Varifocal Polarization Sensitive Diffusive Display") discloses a variofocal display with an image source and a display. U.S. patent application 20210088794 (Melville, Mar. 25, 2021, "Waveguide Display with Cantilevered Light Scanner") discloses glasses with an optical scanning system that protrudes through an opening in an eyepiece. U.S. patent application 20210088795 (Cheng et al., Mar. 25, 2021, "Wide Angle and High Resolution Tiled Head-Mounted Display Device") discloses a tiled head-mounted display with a plurality of prisms with free-form surfaces. U.S. patent application 20210089129 (Osterhout et al., Mar. 25, 2021, "See-Through Computer Display Systems") discloses designs for see-through computer displays. U.S. Pat. No. 10,962,783 (Wilson et al., Mar. 30, 2021, "Electronic Devices Having Electrically Adjustable Optical Layers") discloses an electrically-adjustable optical layer.

U.S. patent application 20210096380 (Osmanis et al., Apr. 1, 2021, "Near-Eye Display Apparatus and Method of Displaying Three-Dimensional Images") discloses projecting pairs of images associated with different cross-sectional planes of a three-dimensional image. U.S. patent application 20210096391 (Ma et al., Apr. 1, 2021, "Holographic Display, Holographic Display Device and Display Method Thereof") discloses a holographic display with a central display area and at least one annular tiled display area around the central display area. U.S. patent application 20210096453 (Wheelwright et al., Apr. 1, 2021, "Optical Assemblies Having Polarization Volume Gratings for Projecting Augmented Reality Content") discloses a display with an optical waveguide, a reflective optical element, and an in-coupler.

U.S. patent application 20210103145 (You et al., Apr. 8, 2021, "Augmented Reality Device Including Flat Combiner and Electronic Device Including the Same") discloses a light source, a display comprising a plurality of pixels, and an optical combiner. U.S. patent application 20210103180 (Sears et al., Apr. 8, 2021, "Photochromic Optical Element") discloses an optical element with a first boundary layer, a second boundary layer, and liquid crystals co-mingled with oblong photochromic dye molecules. U.S. patent application 20210103182 (Tan et al., Apr. 8, 2021, "Display Apparatus and Driving Method Thereof") discloses display panels which are substantially parallel to each other and spaced apart from each other along a depth direction.

U.S. patent application 20210109278 (Peroz et al., Apr. 15, 2021, "Waveguides Having Integrated Spacers, Waveguides Having Edge Absorbers, and Methods for Making the Same") discloses a near-eye display comprising a stack of waveguides having integral spacers separating the waveguides. U.S. patent application 20210109352 (Lee et al., Apr. 15, 2021, "See-Through Type Display Device and Glasses Type Augmented Reality Device Including the Same") discloses a see-through display with a light coupling lens with an aspherical surface. U.S. patent application 20210109433 (Trisnadi et al., Apr. 15, 2021, "Low-Profile Beam Splitter") discloses an optical device having a first surface, a second surface normal to the first surface, and a third surface at an angle to the second surface.

U.S. patent application 20210112647 (Coleman, Apr. 15, 2021, "Angularly Varying Light Emitting Device with an Imager") discloses an angularly varying light emitting device (AVLED). U.S. patent application 20210191125 (Li et al., Jun. 24, 2021, "Display with Holographic Relay and Holographic Image Combiner") discloses a device with an image source, a holographic relay, and a holographic image combiner in an off-axis configuration. U.S. Pat. No. 11,086, 143 (Gill et al., Aug. 10, 2021. "Tunable and Foveated Lens Systems") discloses eyeglasses with adjustable lenses that align with a user's eye. U.S. patent application 20210255490 (Parsons et al., Aug. 19, 2021, "Resonant Liquid Crystal Devices") discloses a tunable liquid crystal device with a liquid crystal layer between a pair of reflectors.

U.S. Pat. No. 11,215,829 (Topliss et al., Jan. 4, 2022, "Display Device with a Holographic Combiner") discloses an augmented reality headset with a reflective holographic combiner which directs light from a light engine into a user's eye while also transmitting light from the environment. U.S. patent application 20220006987 (Seiler et al., Jan. 6, 2022, "Multi-Projector Display Architecture") discloses a headset display with multiple projector integrated circuits each coupled to a central processor. U.S. patent application 20220043323 (Skirlo et al., Feb. 10, 2022, "Methods and Systems for Optical Beam Steering") discloses an optical beam steering device with a planar dielectric lens that collimates beams from different inputs in different directions. U.S. patent application 20230014448 (Morin et al., Jan. 19, 2023, "Methods for Handling Occlusion in Augmented Reality Applications Using Memory and Device Tracking and Related Apparatus") discloses devices which handle optical occlusion in augmented reality.

U.S. patent application 20230288707 (Guan, Sep. 14, 2023, "Near-To-Eye Display Device") discloses eyewear with an electronic display and a collimating device with a microlens array. U.S. patent application 20230333358 (Ha, Oct. 19, 2023, "Optical Device for Augmented Reality Having Optical Structure Arranged in Straight Line and Method for Manufacturing Optical Means") discloses an optical device for augmented reality having an optical structure which is arranged in a straight line. U.S. patent application 20230360567 (Yang, Nov. 9, 2023, "Virtual Reality Display System") discloses a near-eye display device with a camera to track the location of an eye pupil, a projection light source to provide a collimated beam, and a micromirror array with adjustable micromirror pixels.

U.S. patent application 20230367073 (Landig et al., Nov. 16, 2023, "Waveguide with Tunable Bulk Reflectors") discloses a waveguide, an input coupler for propagating image light along a zigzag light path, and a plurality of slanted bulk mirrors along the light path. U.S. patent application 20230367123 (Amirsolaimani, Nov. 16, 2023, "Field of View Expansion by Image Light Redirection") discloses a beam redirector which is downstream of a lightguide for controllably redirecting the image light in coordination with displaying different field of view portions by an image projector. U.S. patent application 20230367128 (Ha, Nov. 16, 2023, "Compact Optical Device for Augmented Reality Having Straightly-Arranged Optical Structure, and Method for Manufacturing Optical Means") discloses a compact optical device with an optical means to transmit at least part of real object image light therethrough toward the pupil of a user's eye, a first reflective means, and a second reflective means with a plurality of reflective units.

U.S. patent application 20230368477 (Moskalev, Nov. 16, 2023, "Augmented and Mixed Reality Screen") discloses reusing image rays incoupled into a waveguide from projectors from different directions around the perimeter of an outcoupling diffractive element. U.S. patent application 20230393309 (Rao et al., Dec. 7, 2023, "Fresnel Lens with Organic Solid Crystals") discloses a Fresnel lens with a lens body having a structured surface with a plurality of facets, wherein the lens body includes an organic solid crystal having mutually-orthogonal refractive indices. U.S. patent application 20230400690 (Marsh et al., Dec. 14, 2023, "Mixed Reality Eyewear with Deformable Beam Combiner") discloses eyewear with a frame, a lens, a display panel which renders an image not aligned with an eye of the wearer, and a deformable beam combiner.

U.S. patent application 20230400748 (Valentine et al., Dec. 14, 2023, "Display System with Tunable Wavelength Conversion in a Nanophotonic Periodically Poled Lithium Niobate Waveguide") discloses a tunable light source with a periodically-poled lithium niobate waveguide and a control mechanism. U.S. patent application 20230408826 (Oh et al., Dec. 21, 2023, "Near-Eye Display Architectures") discloses kaleidoscopic waveguide display architectures, geometrical waveguide displays with improved pupil replication density, liquid crystal displays with improved brightness uniformity, tiled display panels for field of view expansion, and display modules including over-molded frame with integrated heat sink fins. U.S. Pat. No. 11,885,968 (Hua et al., Jan. 30, 2024, "Pupil Matched Occlusion-Capable Optical See-Through Head-Mounted Display") discloses see-through head mounted displays with a double-wrapped path which can render per-pixel mutual occlusion.

The relevant art does not appear to disclose augmented reality eyewear which can transition between a first mode which provides a person with a clear, bright, wide-angle view of the environment when needed and a second mode which displays a virtual object in the person's field of view when needed.

SUMMARY OF THE INVENTION

This invention is augmented reality (AR) eyewear with an environment-only viewing mode and an augmented reality viewing mode. This eyewear can transition between a first mode which provides a person with a clear, bright, wide-angle view of the environment when needed and a second mode which displays a virtual object in the person's field of view when needed. This augmented reality eyewear can comprise at least one virtual-object-display component which pivots between a first configuration along an eyewear sidepiece (e.g. temple) and a second configuration in front of the person's eye. The eyewear can also comprise at least one light emitter, on either an eyewear sidepiece or an eyewear front piece, wherein the virtual-object-display component reflects and/or refracts light from the at least one light emitter toward the person's eye when the virtual-object-display component is in its second configuration.

BRIEF INTRODUCTION TO THE FIGURES

FIG. 33 shows a virtual-object-display component with a horizontal parallel array of optical elements.

FIG. 34 shows a virtual-object-display component with a vertical parallel array of optical elements.

FIG. 35 shows a virtual-object-display component with an upwardly-concave nested array of optical elements.

FIG. 36 shows a virtual-object-display component with an laterally-concave nested array of optical elements.

DETAILED DESCRIPTION OF THE FIGURES

Figure 1:
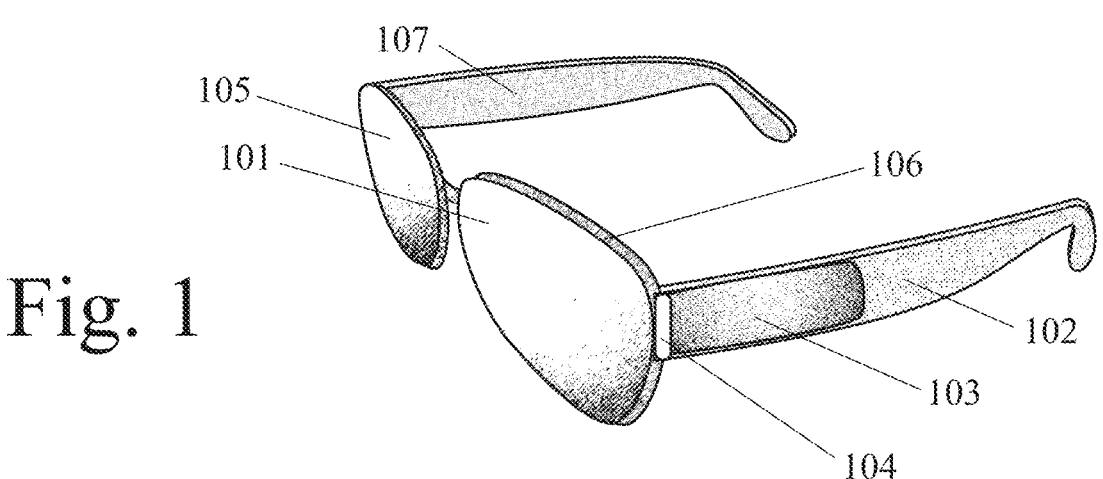
FIGS. 1 through 3 show three sequential views of eyewear with a virtual-object-display component which pivots from a location on a sidepiece to a location in front of a person's eye.

Before discussing the specific embodiments of this invention which are shown in FIGS. 1 through 38, this disclosure provides an introductory section which covers some of the general concepts, components, and methods which comprise this invention. Where relevant, these concepts, components, and methods can be applied as variations to the examples shown in FIGS. 1 through 38 which are discussed afterwards.

This invention is augmented reality (AR) eyewear with an environment-only viewing mode and an augmented reality viewing mode. This eyewear which can transition between a first mode which provides a person with a clear, bright, wide-angle view of the environment when needed and a second mode which displays a virtual object in the person's field of view when needed.

In an example, this augmented reality eyewear can comprise: a first-side see-through optical component which is configured to be in front of a person's first-side eye; a second-side see-through optical component which is configured to be in front of the person's second-side eye; an eyewear front piece which holds the first-side see-through optical component and the second-side see-through optical component in front of the person's first-side eye and second-side eye, respectively; a first-side eyewear sidepiece which connects the eyewear front piece to the person's first-side ear; a second-side eyewear sidepiece which connects the eyewear front piece to the person's second-side ear; and a first-side virtual-object-display component which displays a virtual object in the person's field of view; wherein the first-side virtual-object-display component has a first configuration along the first-side eyewear sidepiece and the first-side virtual-object-display component does not display a virtual object in the person's field of view; and wherein the first-side virtual-object-display component has a second configuration along the first-side see-through optical component and the first-side virtual-object-display component displays a virtual object in the person's field of view.

In an example, augmented reality eyewear can comprise: a first-side see-through optical component which is configured to be in front of a person's first-side eye; a second-side see-through optical component which is configured to be in front of the person's second-side eye; an eyewear front piece which holds the first-side see-through optical component and the second-side see-through optical component in front of the person's first-side eye and second-side eye, respectively; a first-side eyewear sidepiece which connects the eyewear front piece to the person's first-side ear; a second-side eyewear sidepiece which connects the eyewear front piece to the person's second-side ear; and a first-side virtual-object-display component which displays a virtual object in the person's field of view; wherein the first-side virtual-object-display component has a first configuration on the first-side eyewear sidepiece and the first-side virtual-object-display component does not display a virtual object in the person's field of view; and wherein the first-side virtual-object-display component has a second configuration in front of the first-side eye and the first-side virtual-object-display component displays a virtual object in the person's field of view.

In an example, augmented reality eyewear can comprise: a first-side see-through optical component which is configured to be in front of a person's first-side eye; a second-side see-through optical component which is configured to be in front of the person's second-side eye; an eyewear front piece which holds the first-side see-through optical component and the second-side see-through optical component in front of the person's first-side eye and second-side eye, respectively; a first-side eyewear sidepiece which connects the eyewear front piece to the person's first-side ear; a second-side eyewear sidepiece which connects the eyewear front piece to the person's second-side ear; and a first-side virtual-object-display component which displays a virtual object in the person's field of view; wherein the first-side virtual-object-display component has a first configuration on the first-side eyewear sidepiece and the first-side virtual-object-display component does not display a virtual object in the person's field of view; wherein the first-side virtual-objectdisplay component has a second configuration in front of the first-side eye and the first-side virtual-object-display component displays a virtual object in the person's field of view, and wherein the first-side virtual-object-display component is pivoted between 240 and 300 degrees from the first configuration to the second configuration.

In an example, the first-side see-through optical component can be a lens. In an example, the eyewear can further comprise at least one light emitter on the first-side eyewear sidepiece, wherein the first-side virtual-object-display component reflects and/or refracts light from the at least one light emitter toward the person's first-side eye when the first-side virtual-object-display component is in its second configuration. In an example, the eyewear can further comprise at least one light emitter on the eyewear front piece, wherein the first-side virtual-object-display component reflects and/or refracts light from the at least one light emitter toward the person's first-side eye when the first-side virtual-object-display component is in its second configuration. In an example, the at least one light emitter can be on a portion of the eyewear front piece which is above the person's first-side eye.

In an example, the first-side virtual-object-display component can be recessed, housed, and/or inserted in an opening, housing, and/or indentation in the first-side eyewear sidepiece in its first configuration. In an example, the first-side virtual-object-display component can be connected to the rest of the eyewear by a hinge or joint.

In an example, the first-side virtual-object-display component can be moved from its first configuration to its second configuration by pivoting from a location on the first-side eyewear sidepiece to a location in front of the person's first-side eye. In an example, the first-side virtual-object-display component can be pivoted between 240 and 300 degrees from its first configuration to its second configuration.

In an example, the first-side virtual-object-display component can be moved from its first configuration to its second configuration by first sliding out from a location on the first-side eyewear sidepiece and then pivoting to a location in front of the person's first-side eye. In an example, the eyewear can further comprise a sheath, housing, or cover, wherein the first-side virtual-object-display component is within the sheath, housing, or cover in its first configuration and comes out from the sheath, housing, or cover in its second configuration.

In an example, there can be a reversible connection mechanism on the eyewear front piece to which the first-side virtual-object-display component is reversibly connected in its second configuration. In an example, this connection mechanism can be selected from the group consisting of: latch, snap, clip, clasp, clamp, hook, pin, and magnet. In an example, this eyewear can further comprise a second-side virtual-object-display component which is laterally (e.g. right-to-left or left-to-right) symmetric to the first-side virtual-object-display component.

In an example, a method for changing eyewear from a first mode with a clear, bright, wide-angle view of the environment to a second mode which displays a virtual object in a person's field of view can comprise pivoting a first-side virtual-object-display component from a first configuration which is on a first-side eyewear sidepiece to a second configuration which is in front of the person's first-side eye. In an example, the first-side virtual-object-display can be pivoted between 240 and 300 degrees from the first configuration to the second configuration.

In an example, a method for changing eyewear from a first mode with a clear, bright, wide-angle view of the environment to a second mode which displays a virtual object in a person's field of view can comprise moving a first-side virtual-object-display component downward from a first configuration in a portion of an eyewear front piece which is above a person's first-side eye to a second configuration which is in front of the person's first-side eye.

In an example, the first-side virtual-object-display component can be pivoted downward from its first configuration to its second configuration. In an example, the first-side virtual-object-display component can be slid downward from its first configuration to its second configuration. In an example, the first-side virtual-object-display component can be rotated downward from its first configuration to its second configuration.

In an example, augmented reality eyewear can comprise: a first-side (e.g. left side) see-through optical component (e.g. lens) which is configured to be in front of a person's first-side (e.g. left) eye; a second-side (e.g. right side) see-through optical component (e.g. lens) which is configured to be in front of the person's second-side (e.g. right) eye; an eyewear front piece which holds the first-side see-through optical component and the second-side see-through optical component in front of the person's first-side eye and second-side eye, respectively; a first-side (e.g. left side) eyewear sidepiece (e.g. temple) which connects the eyewear front piece to the person's first-side (e.g. left) ear; a second-side (e.g. right side) eyewear sidepiece (e.g. temple) which connects the eyewear front piece to the person's second-side (e.g. right) ear; a first-side (e.g. left side) virtual-object-display component (e.g. light reflector, light refractor, waveguide, and/or array of light emitters) which displays a virtual object in the person's field of view; wherein the first-side virtual-object-display component has a first configuration along (e.g. aligned with, parallel to, recessed into, and/or inserted into) the first-side eyewear sidepiece and the first-side virtual-object-display component does not display a virtual object in the person's field of view; and wherein the first-side virtual-object-display component has a second configuration along (e.g. aligned with, parallel to, recessed into, and/or inserted into) the first-side see-through optical component and the first-side virtual-object-display component displays a virtual object in the person's field of view.

In an example, a method for transitioning eyewear from a non-augmented-reality (e.g. clear view) mode to an augmented-reality mode (e.g. displaying virtual objects in a person's field of view) can comprise: pivoting and/or rotating a virtual-object-display component from a first configuration which is aligned with an eyewear sidepiece to a second configuration which is aligned with a see-through optical component of the eyewear which is in front of a person's eye. In an example, a method for transitioning eyewear from a non-augmented-reality (e.g. clear view) mode to an augmented-reality mode (e.g. displaying virtual objects in a person's field of view) can comprise: pivoting and/or rotating (e.g. clockwise) a virtual-object-display component (between 260 and 280degrees) from a first configuration which is aligned with (e.g. parallel to and/or recessed into) an eyewear sidepiece to a second configuration which is aligned with (e.g. parallel to, in front of, and/or inserted into) a see-through optical component of the eyewear which is in front of a person's eye.

In an example, augmented reality eyewear can transition between a clear-view mode and an augmented-reality mode. In an example, augmented reality eyewear can have three modes: (1) a clear mode in which a virtual-object-display area is completely recessed into the eyewear front piece; (2) a peripheral augmented reality mode in which the virtual-object display area is located in a peripheral area of a person's field of view (e.g. upper-outer quadrant of field of view); and (3) a central augmented reality mode in which the virtual-object display area is located in the center of the person's field of view.

In an example, at a first time, a virtual-object-display component can have a first configuration in which it is aligned with an eyewear sidepiece. In an example, at a second time, the virtual-object-display component can be pivoted and/or rotated out from the sidepiece and extend out in front of the sidepiece. In an example, at a third time, the virtual-object-display component can be further pivoted and/or rotated into a second configuration which is aligned with a see-through optical component in front of the person's eye. These steps can be reversed to transition the virtual-object-display component back from its second configuration to its first configuration. In an example, augmented reality eyewear can include a flexible strip which moves (e.g. pivots and/or bends) outward from an eyewear sidepiece. This strip can be connected to one end of a virtual-object-display component. This flexible strip can help to prevent the virtual-object-display component from being accidentally hit and snapped off while it extends outward from the eyewear sidepiece.

In an example, augmented reality eyewear can be changed from a clear-view mode to an augmented-reality mode by first pivoting (or rotating) and then sliding a virtual-object-display component from a first configuration (which is aligned with an eyewear sidepiece) to a second configuration (which is aligned with a see-through optical component, such as a lens, in front of a person's eye).

In an example, a virtual-object-display component can be protected by a sheath (or housing) when it extends outward from the eyewear during transition between its first and second configurations. In an example, a sheath (or housing) which contains a virtual-object-display component can pivot and/or rotate between 80 and 100 degrees (in a clockwise direction) around a hinge (or joint) as the sheath (or housing) moves from a first configuration on (e.g. substantially parallel with) an eyewear sidepiece to a second configuration sticking out from (e.g. substantially perpendicular to) the eyewear sidepiece.

In an example, a virtual-object-display can comprise telescoping sections, wherein the sections telescope into a sheath (or housing) in a first configuration and telescope out from the sheath (or housing) in a second configuration. In an example, a virtual-object-display component can be held within a protective sheath (or housing) when the virtual-object-display component is in its first configuration to protect it from being scratched, hit, and/or broken.

In an example, augmented reality eyewear can include a protective sheath (or housing) which houses a virtual-object-display component, wherein the sheath (or housing) is along (e.g. aligned with) an eyewear sidepiece when the virtual-object-display component is in its first configuration. In an example, augmented reality eyewear can include a protective sheath (or housing) which houses a virtual-object-display component when the virtual-object-display component is in its first configuration aligned with an eyewear sidepiece, wherein the sheath (or housing) has a first end which is connected to an eyewear sidepiece by a hinge (or joint) and a second end which is free to rotate and/or pivot out from the sidepiece in order to move the virtual-object-display component into its second configuration in front of a person's eye.

In an example, augmented reality eyewear can include a protective sheath (or housing); wherein there is a recess, opening, slot, and/or chamber in the sheath (or housing); wherein a virtual-display-object component is inserted (e.g. slid and/or telescoped) within this recess, opening, slot, and/or chamber when the virtual-display-object component is in its first configuration; and wherein the virtual-display-object component is extended (e.g. slid and/or telescoped) out from this recess, opening, slot, and/or chamber when the virtual-display-object component is in its second configuration.

In an example, augmented reality eyewear can include a protective sheath (or housing), wherein a virtual-object-display component is telescoped into the protective sheath (or housing) when the component is in its first configuration, and wherein the virtual-object-display component is telescoped out from the protective sheath (or housing) when the component is in its second configuration. In an example, a hinge (or joint) can be connected to a sheath (or housing) into which the virtual-object-display component is withdrawn in the first configuration.

In an example, augmented reality eyewear can transition between a clear-view mode and an augmented-reality mode. In an example, augmented reality eyewear can be changed from a clear-view mode to an augmented-reality mode by first sliding and then pivoting (or rotating) a virtual-object-display component from a first configuration (which is aligned with an eyewear sidepiece) to a second configuration (which is aligned with a see-through optical component, such as a lens, in front of the person's eye).

In an example, an eyewear sidepiece can comprise a full-length component which spans from the eyewear front piece and a sliding component which can slide along a track, in a posterior-to-anterior direction, along the full-length component, wherein a virtual-object-display component is attached to the sliding component by a hinge (or joint), and wherein the sliding component is slid forward before the virtual-object-display component is pivoted and/or rotated onto the see-through optical component.

In an example, a virtual-object-display component can be pivoted automatically (e.g. by an electromagnetic actuator). In an example, an virtual-object-display component can be manually moved from its first configuration to its second configuration, or vice versa. In an example, the eyewear can further comprise an actuator, wherein the virtual-object-display component is automatically pivoted and/or rotated from its first configuration to its second configuration, or vice versa.

In an example, a virtual-object-display component can have a first configuration wherein it is recessed within a portion of the eyewear front piece which is above the person's eye. In an example, the virtual-object-display component can have a second configuration in which it has been pivoted downward over a portion of a see-through optical component in front of the person's eye, thereby displaying a virtual object in the center of person's field of view. This step can be reversed to transition the virtual-object-display component back from its second configuration to its first configuration. In an example, augmented reality eyewear can be changed from a clear-view mode to an augmented-reality mode by pivoting a virtual-object-display component downward from a portion (e.g. upper rim) of an eyewear front piece.

In an example, a virtual-object-display component can be in front of a see-through optical component in its second configuration. In an example, a virtual-object-display component has a second configuration which is aligned with (e.g. parallel to) the first-side see-through optical component and displays a virtual object in the person's field of view by emitting, reflecting, and/or refracting light. In an example, a virtual-object-display component can span the center of a person's field of view. In an example, a virtual-object-display component can comprise three or more telescoping sections. In an example, a virtual-object-display component can have telescoping sections, wherein it can be extended across the front of a see-through optical component by extending these telescoping sections.

In an example, a virtual-object-display component can comprise a section of a Fresnel lens. In an example, a virtual-object-display component can comprise a diffraction grating. In an example, a virtual-object-display component can comprise a horizontal parallel array of (partially) reflective optical elements. In an example, a virtual-object-display component can comprise a vertical parallel array of (partially) reflective optical elements.

In an example, a virtual-object-display component can comprise a centrally-nested (e.g. concentric) array of (partially) reflective optical elements. In an example, a virtual-object-display component can comprise an laterally-concave nested (e.g. concentric) array of refractive optical elements. In an example, a virtual-object-display component can comprise an array of mirrors.

In an example, a virtual-object-display component can comprise one or more waveguides. In an example, a virtual-object-display component can have a vertical parallel array of optical (e.g. reflective and/or refractive) elements. In an example, a virtual-object-display component with a horizontal parallel array of optical elements can be used in combination with a light emitter (or array of light emitters) located in a portion of an eyewear front piece (e.g. upper rim) which is above a person's eye to display a virtual object in the person's field of view.

In an example, a virtual-object-display component with a horizontal parallel array of optical elements can reflect and/or refract light from a light emitter (or array of light emitters) located in a portion of an eyewear front piece (e.g. lower rim) which is below the person's eye to display a virtual object in the person's field of view.

In an example, a virtual-object-display component with a vertical parallel array of optical elements can reflect and/or refract light from a light emitter (or array of light emitters) located in a portion of an eyewear front piece (e.g. right-side rim) which is to the right of a person's eye to display a virtual object in the person's field of view. In an example, a virtual-object-display component with a centrally-nested (e.g. concentric) array of optical elements can reflect and/or refract light from a plurality of light emitters (or arrays of light emitters) at different locations (on an eyewear front piece rim) around a person's eye in order to display a virtual object in the person's field of view.

In an example, a virtual-object-display component with an upwardly-concave nested (e.g. concentric) array of optical elements can be used in combination with a light emitter (or array of light emitters) located in a portion of an eyewear front piece (e.g. upper rim) which is above a person's eye to display a virtual object in the person's field of view. In an example, the virtual-object-display component can be a mirror. In an example, the virtual-object-display component can be an array of light emitters.

In an example, the virtual-object-display component can reflect or refract light. In an example, there can be variation in the density and/or proximity of micro-mirrors in a virtual-object-display component between different areas of the component. In an example, a virtual-object-display can be opaque to light from the environment. In an example, a virtual-object-display can partly-transmit light from the environment.

In an example, a virtual-object-display component can have a convex (e.g. circular or elliptical) perimeter. In an example, a virtual-object-display component can have a rounded rectangular or rounded trapezoidal shape (e.g. perimeter shape). In an example, a virtual-object-display component can have a first width and an eyewear sidepiece can have a second width, wherein the first width is less than the second width. In an example, an virtual-object-display component can span between 25% and 75% of the left-to-right width of a see-through optical component when it is in its second configuration. In an example, the length of the virtual-object-display component can be between 30% and 60% of the length of an eyewear sidepiece.

In an example, left and right side virtual-object-display components can be symmetric to each other with respect to a central vertical plane through the center of the eyewear (e.g. center of the nose bridge). In an example, a see-through optical component can be a compound lens. In an example, a see-through optical component can be a electro-fluidic lens whose focal distance can be changed by the application of electrical energy. In an example, a see-through optical component can be a lens with a variable focal distance. In an example, a see-through optical component can be a prescription lens.

In an example, a see-through optical component can be arcuate. In an example, a see-through optical component can comprise: an inner piece with optical power (e.g. a convex or concave lens); and an outer piece without optical power (e.g. a flat or disk-shaped piece to protect other components from being hit or scratched). In an example, the focal distance of a see-through optical component can be changed by changing the distance between two co-axial pieces in the component.

In an example, a first plane which best fits a see-through optical component can be substantially parallel to a second plane which is tangential to the front of a person's eye pupil. In an example, a first plane which best fits a see-through optical component can intersect a second plane which is tangential to the front of a person's eye pupil at an angle which is between 10 and 30 degrees. In an example, a see-through optical component can be substantially parallel to a plane which is tangential to the front of a person's eye.

In an example, a see-through optical component can comprise a proximal optical piece (which is closer to a person's eye) and a distal optical piece (which is farther from the person's eye). In an example, there can be a gap and/or opening between the proximal optical piece and the distal optical piece. In an example, a virtual-object-display component can be inserted (e.g. slid) into this gap and/or opening its second configuration. In an example, a see-through optical component can comprise at least two lenses which are separated by an air gap, wherein the virtual-object-display component is inserted (e.g. slid) into this gap between the two lenses in its second configuration.

In an example, a see-through optical component can comprise two axially-aligned lenses. In an example, a see-through optical component can comprise two or more axially-aligned pieces, wherein there is a gap and/or opening between two of the pieces, and wherein a virtual-objectdisplay component is inserted into this gap and/or opening in its second configuration. In an example, the see-through optical component can comprise an opening and/or gap into which the virtual-object-display component can be inserted. In an example, the see-through optical component can comprise an opening and/or gap which is configured to receive the virtual-object-display component in its second configuration.

In an example, a see-through optical component can comprise an array of movable reflective elements, wherein a sub-set of these movable elements is moved from a first configuration to a second configuration, wherein elements allow transmission of light from the environment through the component in the first configuration, and wherein the elements block transmission of light from environment through the component and reflect light from a display toward a person's eye in the second configuration. In an example, a see-through optical component can further comprise an electrochromic layer and/or filter.

In an example an eyewear sidepiece can be tapered from front to back. In an example, an anterior portion of an eyewear sidepiece can be wider than a posterior portion of the sidepiece. In an example, an eyewear sidepiece can be bifurcated. In an example, the anterior half of an eyewear sidepiece can be flared and wider than the posterior portion of the sidepiece. In an example, the middle third of an eyewear sidepiece be concave with a downward-facing opening.

In an example, there can be a recess or opening in an eyewear sidepiece into which a virtual-object-display component is withdrawn so that the component does not protrude out from the sidepiece in the first configuration. In an example, there can be a recess, groove, channel, opening, or hole on the outer surface of an eyewear sidepiece into which an virtual-object-display component fits in its first configuration.

In an example, there can be a recess, groove, channel, opening, or hole in an eyewear sidepiece into which an virtual-object-display component fits can span between 30% and 60% of the anterior-to-posterior axis of the sidepiece. In an example, there can be a rectangular recess or opening in an eyewear sidepiece into which a virtual-object-display component is withdrawn so that the component does not stick out from the sidepiece in the first configuration. In an example, an eyewear front piece can comprise two rounded-rectangular or rounded-trapezoidal rims which hold two see-through optical components in place.

In an example, a hinge (or joint) which connects a virtual-object-display component to an eyewear sidepiece can be slid, extended, or otherwise moved forward from the rest of an eyewear sidepiece before the virtual-object-display is pivoted or rotated from its first configuration to its second configuration. In an example, a virtual-object-display component and an eyewear sidepiece can be connected to each other by a hinge (or joint). In an example, a virtual-object-display component pivots and/or rotates between 260 and 280 degrees (in a clockwise direction) around a hinge (or joint) as the component moves from a first configuration on an eyewear sidepiece to a second configuration in front of a see-through optical component.

In an example, an axle (or hinge) around which a virtual-object-display component pivots can be to one side (e.g. right or left) of a see-through optical component. In an example, an eyewear front piece and an eyewear sidepiece can be connected to each other by a first hinge (or joint) and a virtual-object-display component and an eyewear sidepiece can be connected to each other by a second hinge (or joint). In an example, an eyewear front piece can further comprise first-side (e.g. left side) and second-side (e.g. right side) hinges (or joints) which connect the front piece to first-side and second-side eyewear sidepieces, respectively.

In an example, an eyewear front piece can further comprise: a first-side (e.g. left side) hinge (or joint) on part of its perimeter which is farthest to the left from its center (e.g. nose bridge), wherein this first-side hinge (or joint) connects the eyewear front piece to a first-side eyewear sidepiece; and a second-side (e.g. right side) hinge (or joint) on part of its perimeter which is farthest to the right from its center (e.g. nose bridge), wherein this second-side hinge (or joint) connects the eyewear front piece to a second-side eyewear sidepiece. In an example, augmented reality eyewear can include a hinge (or joint) which connects a virtual-object-display component to the rest of the eyewear. The virtual-object-display pivots and/or rotates around this hinge (or joint).

In an example, augmented reality eyewear can include at least one hinge (or joint) which connects an eyewear sidepiece to a virtual-object-display component. In an example, this hinge (or joint) can be in the anterior half of the longitudinal span of the eyewear sidepiece. In an example, the anterior end of the virtual-object-display component can be connected to the sidepiece by the hinge (or joint) and the posterior end of the virtual-object-display component can be free to pivot and/or rotate out from the sidepiece to a position in front of a person's eye.

In an example, one end of a virtual-object-display component can be connected to an eyewear sidepiece and the other end of the virtual-object-display component is free to pivot and/or rotate, wherein pivoting and/or rotating the free end moves the virtual-object-display component from a first configuration aligned with the eyewear sidepiece to a second configuration aligned with a see-through optical component in front of a person's eye.

In an example, the anterior end of a virtual-object-display component can be attached to an eyewear sidepiece by a hinge (or joint) in its first configuration and the posterior end of the component is not attached, wherein the posterior end of the component swings out from the sidepiece as the component moves from its first configuration aligned with the sidepiece to its second configuration aligned with the see-through optical component.

In an example, there can be a hinge (or joint) on an eyewear sidepiece. In an example, there can be a hinge (or joint) on the anterior end of an eyewear sidepiece, wherein the virtual-object-display component is connected to the eyewear sidepiece by this hinge (or joint). In an example, there can be a hinge (or joint) on the perimeter of an eyewear front piece which is farthest from the center of the front piece, wherein an eyewear sidepiece is connected to the eyewear front piece by this hinge (or joint). In this example, the axle (or hinge) is on the side of a see-through optical component which is closest to the center of the eyewear front piece. In an example, the eyewear can further comprise a spring or other tensile member which compels the virtual-object-display component into either its first configuration or its second configuration.

In an example, a connection mechanism on an eyewear front piece (to which a virtual-object-display component is reversibly connected in its second configuration) can be located on the rim of the eyewear front piece to one side of a see-through optical component. In an example, an eyewear front piece can comprise a connection mechanism which is located on the nose bridge of the eyewear front piece. In an example, attachment of the free end of an virtual-objectdisplay component to an attachment mechanism (e.g. latch, snap, or clip) can help to hold the virtual-object-display component steady at a specified distance from the see-through optical component.

In an example, augmented reality eyewear can include a connection mechanism (e.g. a latch, clip, snap, clasp, hook, pin, or magnet) to which one side (e.g. one end) of a virtual-object-display component can be reversibly attached when the virtual-object-display component is in its second configuration in front of a person's eye. In an example, the eyewear can further comprise an attachment mechanism which receives the free edge of the virtual-object-display component which moves pivots or rotates around a hinge (or joint).

In an example, there can be a connecting mechanism (e.g. a latch, clip, clasp, clamp, snap, hook, pin, or magnet) on the nose bridge of an eyewear front piece, wherein this connecting mechanism reversibly connects a side of a virtual-object-display component to the eyewear front piece, and wherein this connecting mechanism holds the virtual-object-display component at a selected distance and/or angle from the see-through optical component.

In an example, there can be a connecting mechanism (e.g. a latch, clip, clasp, clamp, snap, hook, pin, or magnet) on an eyewear front piece which reversibly connects the free-moving side (e.g. the side opposite the hinge (or joint)) of a virtual-object-display component to the eyewear front piece, thereby holding the virtual-object-display component at a selected distance and/or angle from the see-through optical component.

In an example, one end of a virtual-object-display component can be permanently connected to an eyewear sidepiece by a hinge (or joint) and the other end of the virtual-object-display component can be reversibly connected to the eyewear sidepiece by a reversible connection mechanism selected from the group consisting of: latch, clip, snap, clamp, hook, pin, or magnet. In an example, there can be a connecting mechanism (e.g. a latch, clip, clasp, clamp, snap, hook, pin, or magnet) on an eyewear sidepiece which reversibly connects the free-moving side (e.g. the side opposite the hinge (or joint)) of a virtual-object-display component to the eyewear sidepiece. In an example, there can be a connection mechanism (e.g. latch, clip, clasp, snap, or magnet) on an eyewear sidepiece which reversibly connects the pivoting and/or rotating end of an virtual-object-display component to the sidepiece when the component is in its first configuration.

In an example, when a virtual-object-display component is in its first configuration (aligned with an eyewear sidepiece), then a first end of a virtual-object-display component is connected to an eyewear sidepiece by a hinge (or joint) and a second end of the virtual-object-display component is (reversibly) connected to the eyewear sidepiece by a first connection mechanism; and when the virtual-object-display component is in its second configuration (aligned with a see-through optical component in front of an eye), then the first end remains connected to the eyewear sidepiece by the hinge (or joint), but the second end is (reversibly) connected to the eyewear front piece by a second connection mechanism. In an example, the eyewear can be transitioned between these three modes by rotating the upper optical component. In an example, the virtual-object-display area can be recessed within a portion of the eyewear front piece above a person's eye (e.g. over their eyebrow and/or lower forehead) when the upper optical component is in its first configuration.

In an example, an eyewear sidepiece can further comprise a light emitter and/or display which emits light toward the virtual-object-display component which, in turn, reflects and/or refracts that light toward an eye. In an example, augmented reality eyewear can include a display (e.g. array of light emitters) on an eyewear sidepiece which emits light beams toward a virtual-object-display component when the component is in its second configuration in front of a person's eye, wherein these light beams are reflected by the virtual-object-display component toward the person's eye to display a virtual object in the person's field of view.

In an example, a portion of an eyewear front piece (e.g. eyeglasses rim) which is above (e.g. vertically higher than) a see-through optical component can be configured to extend upward in an arcuate manner over a person's eyebrows and/or lower forehead, enabling this portion of the front piece to house optical and/or electronic components such as a light-emitting display or an electromagnetic actuator. In an example, a portion of an eyewear front piece which is above (e.g. vertically higher than) a see-through optical component and/or a person's eye can be configured extend upward over a person's eyebrows and/or lower forehead.

In an example, this extension enables sufficient space in the front piece to house optical and/or electronic components such as a light-emitting display or an electromagnetic actuator. In an example, a light-emitting display whose light beams form a virtual image in a person's field of view can be located in front of a person's eyebrow. In an example, a light-emitting display whose light beams form a virtual image in a person's field of view can be located in front of a lower portion of a person's forehead.

In an example, a portion of an eyewear front piece which is above a see-through optical component can house a light-emitting display (e.g. array of light emitters). In an example, a portion of the rim of eyeglasses which is above a person's eye can comprise an array of light emitters which emit light beams toward a virtual-object-display component in front of the person's eye, wherein the virtual-object-display component redirects these light beams toward the person's eye to display a virtual object in the person's field of view. In an example, the virtual-object-display component can comprise an array of reflective surfaces.

In an example, a virtual-object-display component can reflect light toward a person's eye from an array of light emitters which is above the person's eye, thereby displaying a virtual object in the person's field of view. In an example, the virtual-object-display component can comprise an array of micro-mirrors or other reflective surfaces. In an example, an eyewear front piece can include a housing on a part of a rim above a person's eye, wherein this housing holds a concave (downward-opening) array of light emitters which project light toward the virtual-object-display component when the virtual-object-display component is in its second configuration.

In an example, an eyewear front piece can include a housing on a part of a rim above a person's eye, wherein this housing holds an arcuate (e.g. semi-circular, half-oval, or half-elliptical) array of light emitters. In an example, augmented reality eyewear can include a display (e.g. array of light emitters) on an eyewear front piece which emits light beams toward a virtual-object-display component when the component is in its second configuration in front of a person's eye, wherein these light beams are reflected by the virtual-object-display component toward the person's eye to display a virtual object in the person's field of view.

In an example, the rim of an eyewear front piece which goes around the perimeter of a see-through optical component in front of a person's eye (e.g. a lens) can house one or more light emitters or light-emitter arrays. In an example, these light emitters or light-emitter arrays can direct beams of light toward a reflective and/or refractive virtual-object-display component when the virtual-object-display component is in a second configuration along the see-through optical component. In an example, different light emitters or different light-emitter arrays can direct light toward different areas or sections of the virtual-object-display component to form a composite image of a virtual object.

In an example, a portion of an eyewear front piece which is to one side (e.g. to the right or left) of a see-through optical component can house a light-emitting display (e.g. array of light emitters) which directs light toward a virtual-object-display component when the virtual-object-display component is in its second configuration.

In an example, an eyewear front piece can comprise a rim around a see-through optical component, wherein the rim holds a convex array of light emitters around a person's eye, and wherein these light emitters project beams of light toward a virtual-object-display component in front of the person's eye in its second configuration. In an example, the array can be circular array of light emitters. In an example, the array can be an elliptical array of light emitters. In an example, the array can be an oval array of light emitters. In an example, the array can be a rounded-rectangular array of light emitters. In an example, the array can be a rounded-trapezoidal array of light emitters.

In an example, an eyewear front piece can include a first housing on a left side of a rim around a person's eye and a second housing on a right side of the rim, wherein the first housing holds a first array of light emitters and the second housing holds a second array of light emitters, and wherein both arrays direct light toward a virtual-object-display component which is in front of the person's eye in its second configuration.

In an example, augmented reality eyewear can comprise a Bragg grating. In an example, augmented reality eyewear can comprise a Fresnel reflector. In an example, augmented reality eyewear can comprise a lenticular pattern. In an example, augmented reality eyewear can comprise a vertical parallel array of (partially) reflective optical elements. In an example, augmented reality eyewear can comprise a centrally-nested (e.g. concentric) array of refractive optical elements.

In an example, augmented reality eyewear can comprise an upwardly-concave nested (e.g. concentric) array of (partially) reflective optical elements. In an example, augmented reality eyewear can have a laterally-concave nested (e.g. concentric) array of optical (e.g. reflective and/or refractive) elements. In an example, augmented reality eyewear can have an upwardly-concave nested (e.g. concentric) array of optical (e.g. reflective and/or refractive) elements.

In an example, an eyewear front piece can further comprise (e.g. house) one or more components selected from the group consisting of: array of light emitters, camera, data processor, data transmitter, EEG sensor, EMG sensor, microphone, motion sensor, power source (e.g. battery), scanning laser, speaker, and spectroscopic sensor. In an example, augmented reality eyewear can be in wireless communication with a cell phone. In an example, augmented reality eyewear can further comprise (e.g. house) one or more components selected from the group consisting of: array of light emitters, camera, data processor, data transmitter, EEG sensor, EMG sensor, microphone, motion sensor, power source (e.g. battery), scanning laser, speaker, and spectroscopic sensor.

In an example, augmented reality eyewear can comprise: a first-side (e.g. left side) see-through optical component (e.g. lens) which is configured to be in front of a person's first-side (e.g. left) eye; a second-side (e.g. right side) see-through optical component (e.g. lens) which is configured to be in front of the person's second-side (e.g. right) eye; an eyewear front piece which holds the first-side see-through optical component and the second-side see-through optical component in front of the person's first-side eye and second-side eye, respectively; a first-side (e.g. left side) eyewear sidepiece (e.g. temple) which connects the eyewear front piece to the person's first-side (e.g. left) ear; a second-side (e.g. right side) eyewear sidepiece (e.g. temple) which connects the eyewear front piece to the person's second-side (e.g. right) ear; a first-side (e.g. left side) virtual-object-display component (e.g. light reflector, light refractor, waveguide, and/or array of light emitters) which displays an virtual object in the person's field of view; wherein the first-side virtual-object-display component has a first configuration which is recessed within the first-side virtual-object-display component does not display a virtual object in the person's field of view; and wherein the first-side virtual-object-display component has a second configuration which is in front of the first-side see-through optical component and the first-side virtual-object-display component displays a virtual object in the person's field of view.

In an example, a method for transitioning eyewear from a non-augmented-reality (e.g. clear view) mode to an augmented-reality mode (e.g. displaying virtual objects in a person's field of view) can comprise: (a) pivoting and/or rotating (e.g. clockwise) a sheath (or housing) containing a virtual-object-display component (between 80 and 100 degrees) from a first configuration which is aligned with (e.g. parallel to and/or recessed into) an eyewear sidepiece to a second configuration which is substantially perpendicular to the eyewear side piece and/or substantially coplanar with a see-through optical component (e.g. lens) which is in front of a person's eye; (b) extending, sliding, and/or telescoping the virtual-object-display component out from the sheath (or housing) so that the virtual-object-display component is aligned with (e.g. parallel to, in front of, and/or inserted into) the see-through optical component; and then (c) pivoting and/or rotating (e.g. counter-clockwise) the sheath (or housing) (between 80 and 100 degrees) back from the second configuration to the first configuration.

In an example, a method for transitioning eyewear from a non-augmented-reality (e.g. clear view) mode to an augmented-reality mode (e.g. displaying virtual objects in a person's field of view) can comprise: sliding, extending, and/or telescoping a virtual-object-display component out from a first configuration in (e.g. recessed within) an eyewear sidepiece to a second configuration which overlaps (e.g. is in front of) a see-through optical component of the eyewear which is in front of a person's eye.

In an example, augmented reality eyewear which can transition between a clear-view mode and an augmented-reality mode. When the eyewear is in the augmented-reality mode, the person sees virtual objects displayed in their field of view. When the eyewear is in the clear-view mode, the person does not see virtual objects, but does see their environment without distortion and/or limitation of their field of view. Such eyewear can be better than augmented reality eyewear which distorts and/or limits a person's field of view of their environment when the person is not using the augmented reality function of their eyewear. This design is especially advantageous at times when a clear view of a person's environment is critical for the person's safety and/or activity.

In an example, a virtual-object-display component can have a first configuration in which it is aligned with an eyewear sidepiece. In an example, the virtual-object-display component can have a second configuration in which it is pivoted and/or rotated to be aligned with a see-through optical component in front of the person's eye. This pivoting can be reversed to transition the virtual-object-display component back from its second configuration to its first configuration. In an example, augmented reality eyewear can be changed from a clear-view mode to an augmented-reality mode by pivoting (and/or rotating) a virtual-object-display component from a first configuration (aligned with an eyewear sidepiece) to a second configuration (aligned with a see-through optical component in front of a person's eye).

In an example, augmented reality eyewear which can transition between a clear-view mode and an augmented-reality mode. In an example, augmented reality eyewear can change from a clear-view mode to an augmented-reality mode by first pivoting (or rotating) and then sliding a virtual-object-display component from a first configuration (which is aligned with an eyewear sidepiece) to a second configuration (which is aligned with a see-through optical component, such as a lens, in front of the person's eye). In an example, the virtual-object-display component is protected by a sheath (or housing) when it extends outward from the eyewear during transition between its first and second configurations.

In an example, at a second time, the sheath (or housing) and the virtual-object-display component can pivot outward from the sidepiece and extend out (e.g. perpendicularly) from the sidepiece. In an example, augmented reality eyewear can include an eyewear sidepiece, a virtual-object-display component, and a sheath (or housing) into which the virtual-object-display component is inserted. In an example, at a first time, the virtual-object-display component is in a first configuration in the sheath (or housing) which is aligned with the eyewear sidepiece. In an example, at a second time, the sheath (or housing) and the virtual-object-display component is pivoted outward from the sidepiece and extends out (e.g. perpendicularly) from the sidepiece. In an example, at a third time, the virtual-object-display component is in a second configuration in which it has slid out from the sheath (or housing) and is aligned with a see-through optical component in front of the person's eye. In an example, at a fourth time, the sheath (or housing) can be pivoted back to alignment with the eyewear sidepiece.

In an example, a sheath (or housing) which contains a virtual-object-display component can pivot and/or rotate between 80 and 100 degrees (in a clockwise direction) around a hinge (or joint) as the sheath (or housing) and then the virtual-object-display component can be extended out from the sheath (or housing) onto (or into) a see-through optical component. In an example, a virtual-object-display component can be held within a protective sheath (or housing). In an example, augmented reality eyewear can include a protective sheath (or housing) which houses a virtual-object-display component when the virtual-object-display component is in its first configuration.

In an example, augmented reality eyewear can include a protective sheath (or housing) which houses a virtual-object-display component when the virtual-object-display component is in its first configuration, wherein the sheath (or housing) has a first end which is connected to an eyewear sidepiece by a hinge (or joint) and a second end which is free to rotate and/or pivot out from the sidepiece. In an example, augmented reality eyewear can include a protective sheath (or housing); wherein there is a recess, opening, slot, and/or chamber in the sheath (or housing); and wherein a virtual-display-object component is housed within this recess, opening, slot, and/or chamber when the virtual-display-object component is in its first configuration.

In an example, augmented reality eyewear can include a protective sheath (or housing), wherein a virtual-object-display component is recessed within the protective sheath (or housing) when the component is in its first configuration, and wherein the virtual-object-display component is extended out from the protective sheath (or housing) when the component is in its second configuration.

In an example, augmented reality eyewear can include a protective sheath (or housing); wherein the sheath (or housing) is aligned with an eyewear sidepiece and a virtual-object-display component is recessed within the protective sheath (or housing) when the component is in its first configuration; and wherein the sheath (or housing) extends out from the eyewear sidepiece and the virtual-object-display component is extended out from the protective sheath (or housing) in order to move the component into in its second configuration.

An augmented reality eyewear design that enables a virtual-object-display component to slide into a gap or opening in see-through optical component has potential advantages. With this design, a virtual-object-display component can slide laterally into a gap and/or opening between two pieces in a compound see-through optical component, instead of pivoting to a location in front of the see-through optical component. This can help to hold the virtual-object-display securely in place in its second configuration and also protect it from being hit or scratched in its second configuration. In an example, at a third time, the virtual-object-display component can pivot (rotate) into a second configuration which is aligned with a see-through optical component in front of the person's eye.

In an example, a virtual-object-display component can be moved from its first configuration to its second configuration by the following steps: first, the virtual-object-display component is slid forward along an eyewear sidepiece (e.g. along a track or groove) until it sticks out from the sidepiece in an anterior direction; and second, the virtual-object-display component is pivoted and/or rotated (e.g. 90 degrees) around a hinge and/or joint to be aligned with a see-through optical component. In an example, a virtual-object-display component can be moved automatically (e.g. by an electromagnetic actuator). In an example, a virtual-object-display component can be slid automatically (e.g. by an electromagnetic actuator). In an example, an virtual-object-display component can be manually pivoted and/or rotated from its first configuration to its second configuration, or vice versa.

In an example, a virtual-object-display component ca move from its first configuration to its second configuration by pivoting downward, out from a portion of the eyewear front piece (e.g. upper rim) which is above the person's eye. In an example, a virtual-object-display component can have a first configuration wherein it is recessed within a portion of an eyewear front piece which is above a person's eye. In an example, the virtual-object-display component can have a second configuration in which it has slid downward over a portion of a see-through optical component in front of the person's eye, thereby displaying a virtual object in the center of person's field of view. This step can be reversed to transition the virtual-object-display component back from its second configuration to its first configuration. In this example, augmented reality eyewear can be changed from a clear-view mode to an augmented-reality mode by sliding a virtual-object-display component downward from a portion (e.g. upper rim) of an eyewear front piece.

In an example, a virtual-object-display component can be in the center of a person's field of view in its second configuration. In an example, the virtual-object-display component can be between ¼ inch and ¾ inch away from the see-through optical component when the virtual-object display component is in its second configuration. In an example, there can be a ¼ inch to ½ inch gap between virtual-object-display component and the see-through optical component when the virtual-object display component is in its second configuration. In an example, a virtual-object-display component can comprise two telescoping sections. In an example, a virtual-object-display component can have a telescoping sections, wherein it can be extended out by telescoping out sections in its second configuration and can be retracted in by telescoping in sections in its first configuration.

In an example, a virtual-object-display component can comprise a section of a Fresnel reflector. In an example, a virtual-object-display component can comprise a Fresnel lens. In an example, a virtual-object-display component can comprise a horizontal parallel array of refractive optical elements. In an example, a virtual-object-display component can comprise a vertical parallel array of refractive optical elements. In an example, a virtual-object-display component can comprise a centrally-nested (e.g. concentric) array of refractive optical elements. In an example, a virtual-object-display component can comprise an upwardly-concave nested (e.g. concentric) array of (partially) reflective optical elements.

In an example, a virtual-object-display component can comprise an array of mirrors which are moved by microscale actuators. In an example, a virtual-object-display component can have a horizontal parallel array of optical (e.g. reflective and/or refractive) elements. In an example, a virtual-object-display component can have a centrally-nested (e.g. concentric) array of optical (e.g. reflective and/or refractive) elements. In an example, a virtual-object-display component with a horizontal parallel array of optical elements can be used in combination with a light emitter (or array of light emitters) located in a portion of an eyewear front piece (e.g. lower rim) which is below the person's eye to display a virtual object in the person's field of view.

In an example, a virtual-object-display component with a vertical parallel array of optical elements can be used in combination with a light emitter (or array of light emitters) located in a portion of an eyewear front piece (e.g. right side rim) which is to the right of a person's eye to display a virtual object in the person's field of view. In an example, a virtual-object-display component with a vertical parallel array of optical elements can reflect and/or refract light from a light emitter (or array of light emitters) located in a portion of an eyewear front piece (e.g. left-side rim) which is to the left of the person's eye to display a virtual object in the person's field of view.

In an example, a virtual-object-display component with an laterally-concave nested (e.g. concentric) array of optical elements can be used in combination with a light emitter (or array of light emitters) located to one side of a person's eye (e.g. on an eyewear sidepiece) to display a virtual object in the person's field of view. In an example, a virtual-object-display component with an upwardly-concave nested (e.g. concentric) array of optical elements can reflect and/or refract light from a light emitter (or array of light emitters) located in a portion of an eyewear front piece (e.g. upper rim) which is above a person's eye to display a virtual object in the person's field of view.

In an example, the virtual-object-display component can be a partly-transmissive and partly-reflective (e.g. transflective) mirror. In an example, the virtual-object-display component can be an array of mirrors. In an example, there can be variation in the density and/or proximity of light emitters in a virtual-object-display component between different areas of the component. In an example, there can be variation in the density and/or proximity of micro-mirrors in a virtual-object-display component between different areas of the component, wherein there is a higher density and/or closer proximity of micro-mirrors in a central portion of the component. In an example, a virtual-object-display can comprise an adjustable (e.g. electrochromic) layer which can selectively block environmental light in areas (e.g. pixels) where a virtual object is displayed in a person's field of view.

In an example, there can be a stem (e.g. narrow portion) which connects a virtual-object-display to the rest of the eyewear. In an example, a stem which connects a virtual-object-display component to an axle (or hinger) can be transparent and narrower than the virtual-object-display component. In an example, a virtual-object-display component can have a non-optical (e.g. stem) portion which connects an optical portion to the hinge (or joint), wherein non-optical portion plays a structural role in holding the optical portion in place but does not play a role in displaying a virtual object. In an example, a virtual-object-display component can have a trapezoidal or rounded-trapezoidal perimeter.

In an example, a virtual-object-display component can have a first width and an eyewear sidepiece can have a second width, wherein the first width is between 50% and 90% of the second width. In an example, an virtual-object-display component can span the entire left-to-right width of a see-through optical component when it is in its second configuration. In an example, augmented reality eyewear can comprise two virtual-object-display components, one on each side (e.g. left and right) of the eyewear. In an example, there can be a left-side virtual-object-display component on the left side (e.g. left sidepiece in first configuration) of the eyewear and a right-side virtual-object-display component on the right side (e.g. right sidepiece in the first configuration) of the eyewear.

In an example, a see-through optical component can be a concave lens. In an example, a see-through optical component can be a homogenous polymer or glass structure without any electronic components. In an example, a see-through optical component can be a lens. In an example, a see-through optical component can be a varifocal lens. In an example, a see-through optical component can comprise a single continuous piece of material. In an example, a see-through optical component can have a circular, oval, or elliptical shape.

In an example, the optical power of a see-through optical component can be changed by changing the distance between two co-axial pieces in the component. In an example, a first plane which best fits a see-through optical component can intersect a second plane which is tangential to the front of a person's eye pupil at an acute angle. In an example, a first plane which best fits a see-through optical component can intersect a second plane which is tangential to the front of a person's eye pupil at an angle which is between 20 and 45 degrees.

In an example, a see-through optical component can comprise a plurality of axially-aligned pieces, wherein a virtual-object-display component is laterally inserted (e.g. slid) into a gap and/or opening between two of the pieces when the virtual-object-display component is in its second configuration. In an example, a see-through optical component can comprise a proximal optical piece (which is closer to a person's eye) and a distal optical piece (which is farther from the person's eye). In an example, there can be a gap and/or opening between the proximal optical piece and the distal optical piece. In an example, a virtual-object-display component can be inserted (e.g. slid) into this gap and/or opening its second configuration. In an example, the proximal optical piece has optical power (e.g. be an optical lens) and the distal optical piece does not have optical power (e.g. just serves to protect the virtual-object display component from being hit or scratched).

In an example, a see-through optical component can comprise two axially-aligned pieces. In an example, a see-through optical component can comprise two lenses which are separated by an air gap. In an example, a see-through optical component can comprise two or more lenses which are separated by air gaps. In an example, the see-through optical component can comprise an opening and/or gap into which the virtual-object-display component can be inserted laterally (e.g. left to right, or vice versa). In an example, the see-through optical component can comprise an opening and/or gap into which the virtual-object-display component is inserted in its second configuration.

In an example, a see-through optical component can comprise an array of movable reflective elements, wherein a sub-set of these movable elements is moved from a first configuration to a second configuration, wherein elements allow transmission of light from the environment through the component in the first configuration, wherein the elements block transmission of light from environment through the component and reflect light from a display toward a person's eye in the second configuration, and wherein the sub-set of movable elements collectively align with (the perimeter of) a virtual object displayed in the person's field of view.

In an example, a see-through optical component (e.g. lens) in front of a person's eye can be conceptually divided into different areas. In an example, the lateral width of a see-though optical component can be divided into thirds comprising: a lateral inner third (closest to the person's nose); a lateral outer third (farthest from the person's nose); and a lateral central third (between the inner and outer thirds). In an example, the vertical width of a see-though optical component can be divided into thirds comprising: a vertical central third (closest to the center of the component); a vertical lower third (below the central third); and a vertical upper third (above the central third). Combining these lateral and vertical divisions defines nine sections of the see-through optical component.

In an example an eyewear sidepiece can be tapered, wherein an anterior portion (e.g. end) is wider than a posterior portion (e.g. end). In an example, an anterior portion of an eyewear sidepiece can be flared and wider than an posterior portion of the sidepiece. In an example, an eyewear sidepiece can be bifurcated. This can help to accommodate a wider virtual-object-display component without being too bulky. In an example, a first portion (e.g. first half) of the virtual-object-display component which is closest to a hinge can be narrower than a second portion (e.g. second half) of the virtual-object-display component which is farthest from the hinge. This can help to reduce disruption of the person's peripheral vision when the virtual-object-display component is moved into its second configuration. In an example, the anterior half of an eyewear sidepiece can be wider than the posterior half of the sidepiece.

In an example, there can be a recess and/or opening in an eyewear sidepiece into which a virtual-object-display component can fit and/or be inserted when in its first configuration. In an example, there can be a recess, groove, channel, opening, or hole in an eyewear sidepiece into which an virtual-object-display component fits in its first configuration. In an example, there can be a recess, groove, channel, opening, or hole in the anterior half of an eyewear sidepiece into which an virtual-object-display component fits in its first configuration.

In an example, there can be a recess, groove, channel, opening, or hole in an eyewear sidepiece into which an virtual-object-display component fits can be on an anterior portion of the sidepiece, wherein this anterior portion spans between 20% and 40% of the length of the sidepiece. In an example, an eyewear front piece can comprise two circular rims which hold two see-through optical components in place. In an example, an eyewear front piece can comprise: two convex (e.g. circular, oval, elliptical, rounded-rectangular, or rounded trapezoidal) rims which hold the two see-through optical components in place; and a nose bridge which between (e.g. connecting) the two convex rims.

In an example, a hinge (or joint) which connects a virtual-object-display component to an eyewear sidepiece can be slid, extended, or otherwise moved forward before the virtual-object-display is pivoted or rotated from its first configuration to its second configuration. In an example, a virtual-object-display component is moved from the first configuration to the second configuration by pivoting or rotating around a hinge (or joint) on the front piece or the first-side sidepiece. In an example, an anterior end of a virtual-object-display component can be connected to an eyewear sidepiece by a hinge (or joint) and a posterior end of the virtual-object-display component can be free to pivot and/or rotate out from the eyewear sidepiece to a position in front of a see-through optical component in front of a person's eye.

In an example, an axle (or hinge) around which a virtual-object-display component pivots can be to one side (e.g. right or left) of a see-through optical component. In an example, an eyewear front piece and an eyewear sidepiece can be connected to each other by a first hinge (or joint) and the eyewear front piece and a virtual-object-display component can be connected to each other by a second hinge (or joint). In an example, an eyewear front piece can further comprise hinges (or joints) which connect the eyewear front piece to the two sidepieces. In an example, an virtual-object-display component on a left sidepiece can be pivoted counter-clockwise (from a top-down perspective) between 260 and 280 degrees around a hinge (or joint) as it is moved from its first configuration to its second configuration.

In an example, augmented reality eyewear can include a hinge (or joint) on an eyewear sidepiece. In an example, one end of a virtual-object-display component can be connected to an eyewear front piece and the other end of the virtual-object-display component is free to pivot and/or rotate, wherein pivoting and/or rotating the free end moves the virtual-object-display component from a first configuration aligned with the eyewear sidepiece to a second configuration aligned with a see-through optical component in front of a person's eye.

In an example, one end of a virtual-object-display component can be connected to an eyewear sidepiece by hinge (or joint) and the other end of the virtual-object-display component is free to pivot and/or rotate, wherein pivoting and/or rotating the free end moves the virtual-object-display component from a first configuration aligned with the eyewear sidepiece to a second configuration aligned with a see-through optical component in front of a person's eye.

In an example, the anterior end of a virtual-object-display component can be attached to an eyewear sidepiece by a hinge (or joint) in its first configuration and the posterior end of the component is not attached, wherein the posterior end of the component pivot and/or rotates out from the sidepiece as the component moves from its first configuration aligned with the sidepiece to its second configuration aligned with the see-through optical component. In an example, there can be a hinge (or joint) on the anterior end of an eyewear sidepiece, wherein both the eyewear front piece and a virtual-object-display component are connected to the eyewear sidepiece by this hinge (or joint).

In an example, there can be a hinge (or joint) on the perimeter of an eyewear front piece which is farthest from the center of the front piece, wherein a virtual-object-display component is connected to the eyewear front piece by this hinge (or joint). In an example, there can be a left-side hinge (or joint) and a right-side hinge (or joint) on the left end and the end, respectively, of an eyewear front piece. In an example: the left-side hinge connects the eyewear front piece to a left sidepiece and a left-side virtual-object-display component; and the right-side hinge connects the eyewear front piece to a right sidepiece and a right-side virtual-object-display component. In an example, augmented reality eyewear can further comprise a spring or other tensile member which exerts force on a virtual-object-display to compel it toward its either its first configuration (e.g. on a sidepiece) or its second configuration (e.g. on a see-through optical component).

In an example, a connection mechanism (e.g. latch, clasp, clip, clamp, hook, pin, or magnet) on an eyewear front piece can reversibly connect to one end of a virtual-object-display component in its second configuration (in front of a see-through optical component) to hold the virtual-object-display securely in place (e.g. at a selected distance and/or angle relative to the see-through optical component. In an example, a first end of a virtual-object-display component can be connected to an eyewear sidepiece by a hinge (or joint). A second end (e.g. opposite the first end) of the virtual-object-display component can be free to pivot and/or rotate. The second end can be in contact with the eyewear sidepiece when the virtual-object-display component is in its first configuration (e.g. aligned with the sidepiece) and can reversibly connect to a connection mechanism (e.g. a latch, snap, clip, clasp, pin, or magnet) on the eyewear front piece when the virtual-object-display component is in its second configuration (e.g. aligned with a see-through optical component on the front piece).

In an example, an eyewear front piece can further comprise a connection mechanism (e.g. a latch, snap, clip, clasp, hook, pin, lock, or magnet) which reversibly connects an edge of virtual-object-display component to the eyewear front piece, wherein this connection securely holds the virtual-object-display component at a selected distance and/or angle with respect to a see-through optical component.

In an example, augmented reality eyewear can include a connection mechanism (e.g. a latch, clip, snap, clasp, hook, pin, or magnet) to which one side (e.g. one end) of a virtual-object-display component can be reversibly attached when the virtual-object-display component is in its second configuration. In an example, this connection mechanism can be located on the nose bridge of an eyewear front piece. In an example, this connection mechanism can be located on a rim of an eyewear front piece which encircles a see-through optical component (e.g. lens) in front of a person's eye.

In an example, augmented reality eyewear can include a connection mechanism (e.g. a latch, clip, snap, clasp, hook, pin, or magnet) to which one side (e.g. one end) of a virtual-object-display component can be reversibly attached when the virtual-object-display component is in its second configuration aligned with a see-through optical component in front of a person's eye. In an example, the non-hinged edge of the virtual-object-display component latches, snaps, or clips onto the attachment mechanism when the virtual-object-display component is in its second configuration.

In an example, there can be a connecting mechanism (e.g. a latch, clip, clasp, clamp, snap, hook, pin, or magnet) on the nose bridge of an eyewear front piece, wherein this connecting mechanism reversibly connects a side of a virtual-object-display component to the eyewear front piece in its second configuration, and wherein this connecting mechanism holds the virtual-object-display component at a selected distance and/or angle from the see-through optical component in its second configuration. In an example, this connection mechanism can be located on a side of a rim of the eyewear front piece around a see-through optical component.

In an example, the virtual-object-display component can snap, latch, or clip onto a sidepiece in its first configuration. In an example, there can be a connecting mechanism (e.g. a latch, clip, clasp, clamp, snap, hook, pin, or magnet) on an eyewear sidepiece which reversibly connects the free-moving side (e.g. the side opposite the hinge (or joint)) of a virtual-object-display component to the eyewear sidepiece when the virtual-object-display component is in its first configuration.

In an example, when a virtual-object-display component is in its first configuration (aligned with an eyewear sidepiece), then an anterior end of a virtual-object-display component is connected to an eyewear sidepiece by a hinge (or joint) and a posterior end of the virtual-object-display component is (reversibly) connected to the eyewear sidepiece by a connection mechanism selected from the group consisting of: latch, clip, snap, clamp, hook, pin, or magnet.

In an example, augmented reality eyewear can be changed from a clear-view mode to an augmented-reality mode by rotating an upper optical component. This this upper optical component has a virtual-object-display area which displays a virtual object in the person's field of view. The upper optical component is rotated from a first configuration (in which the virtual-object-display area is not within the person's field of view) to a second configuration (in which the virtual-object-display area is in the person's field of view). This changes from the eyewear from a clear-view mode to an augmented-reality mode. In an example, the rest of an upper optical component other than the virtual-object-display area can be completely transparent. In an example, the virtual-object-display area can span the center of the person's field of view when the upper optical component is in its second configuration.

In an example, an eyewear sidepiece can further comprise a light emitter and/or display which emits light toward the virtual-object-display component which, in turn, guides that light toward an eye. In an example, augmented reality eyewear can include a display (e.g. array of light emitters) on the person-facing side of an eyewear sidepiece, wherein this display emits light beams toward a virtual-objectdisplay component when the component is in its second configuration in front of a person's eye, and wherein these light beams are reflected by the virtual-object-display component toward the person's eye to display a virtual object in the person's field of view.

In an example, a portion of an eyewear front piece (e.g. glasses rim) which is above a person's eye can have a downward-opening concave shape. In an example, this concave-shaped portion can house a light emitter or light-emitter array. In an example, this concave-shaped portion can have vertical width between ¼ and ¾ of an inch. In an example, this concave-shaped portion can have vertical width between ½ inch and 2 inches. In an example, a portion of an eyewear front piece which is above (e.g. vertically higher than) a see-through optical component can have an arcuate (e.g. conic section) shape which extend upwards over a person's eyebrows and/or lower forehead, enabling this portion of the front piece to house optical and/or electronic components such as a light-emitting display or an electromagnetic actuator.

In an example, a portion of an eyewear front piece which is located above a see-through optical component in front of a person's eye can house a light-emitting display (e.g. array of light emitters). In an example, this light-emitting display can direct beams of light toward a virtual-object-display component when the virtual-object-display component is in its second configuration in front of the person's eye. In an example, reflection of these light beams toward the person's eye by the virtual-object-display component causes a virtual object to be displayed in the person's field of view.

In an example, a portion of the rim of eyeglasses which is above a person's eye can comprise an array of light emitters which emit light beams toward a virtual-object-display component in front of the person's eye, wherein the virtual-object-display component redirects these light beams toward the person's eye to display a virtual object in the person's field of view. In an example, the virtual-object-display component can comprise a section of a Fresnel reflector. In an example, an eyewear front piece can include a housing on a part of a rim above a person's eye, wherein this housing holds a concave array of light emitters (e.g. light emitting diodes) which project light toward the virtual-object-display component when the virtual-object-display component is in its second configuration.

In an example, an eyewear front piece can include a housing on a part of a rim above a person's eye, wherein this housing holds an arcuate (e.g. semi-circular, half-oval, or half-elliptical) array of light emitters which project light toward the virtual-object-display component when the virtual-object-display component is in its second configuration. In an example, an eyewear front piece can include a housing on a part of a rim above a person's eye, wherein this housing holds an array of light emitters which project light (along downward and forward vectors) toward the virtual-object-display component when the virtual-object-display component is in its second configuration.

In an example, augmented reality eyewear can include a display (e.g. array of light emitters) on the person-facing side of an eyewear front piece, wherein this display emits light beams toward a virtual-object-display component when the component is in its second configuration in front of a person's eye, and wherein these light beams are reflected by the virtual-object-display component toward the person's eye to display a virtual object in the person's field of view.

In an example, a portion of an eyewear front piece which is to one side (e.g. to the right or left) of a see-through optical component can house a light-emitting display (e.g. array of light emitters), wherein the light-emitting display directs light toward a virtual-object-display component when the virtual-object-display component is in its second configuration, and wherein reflection of this light toward the person's eye by the virtual-object-display component causes a virtual object to be displayed in the person's field of view. In an example, a virtual-object-display component can reflect light toward a person's eye from an array of light emitters which is to one side (e.g. left or right) of the person's eye, thereby displaying a virtual object in the person's field of view.

In an example, an eyewear front piece can comprise a rim around a see-through optical component, wherein the rim holds a convex (e.g. circular, elliptical, oval, rounded rectangular, or rounded trapezoidal) array of light emitters around a person's eye, and wherein these light emitters project beams of light toward a virtual-object-display component in front of the person's eye. In an example, an eyewear front piece can include a first housing on an upper portion of a rim which is above a person's eye and a second housing on a lower portion of a rim which is below the person's eye, wherein the first housing holds a first array of light emitters which projects light in a downward (and forward) direction toward the virtual-display-object component, and wherein the second housing holds a second array of light emitters which projects light in an upward (and forward) direction toward the virtual-display-object component.

In an example, augmented reality eyewear can comprise a diffraction grating. In an example, augmented reality eyewear can comprise a horizontal parallel array of (partially) reflective optical elements. In an example, augmented reality eyewear can comprise a section of a Fresnel lens. In an example, augmented reality eyewear can comprise a vertical parallel array of refractive optical elements. In an example, augmented reality eyewear can comprise an laterally-concave nested (e.g. concentric) array of (partially) reflective optical elements. In an example, augmented reality eyewear can comprise an upwardly-concave nested (e.g. concentric) array of refractive optical elements. In an example, augmented reality eyewear can have a vertical parallel array of optical (e.g. reflective and/or refractive) elements.

In an example, augmented reality eyewear can automatically activate (e.g. turn on) the display of a virtual object when a virtual-object-display component is moved from its first configuration (e.g. along the eyewear sidepiece) to its second configuration (e.g. along a see-through optical component in front of an eye) and can automatically deactivate (e.g. turn off) the virtual-object-display component is moved from its second configuration back to its first configuration.

In an example, an eyewear sidepiece can further comprise (e.g. house) one or more components selected from the group consisting of: array of light emitters, camera, data processor, data transmitter, EEG sensor, EMG sensor, microphone, motion sensor, power source (e.g. battery), scanning laser, speaker, and spectroscopic sensor. In an example, augmented reality eyewear can be part of a system which includes a smart watch, smart ring, or other wearable device with which the eyewear is in wireless communication.

In an example, augmented reality eyewear can comprise: a first-side (e.g. left side) see-through optical component (e.g. lens) which is configured to be in front of a person's first-side (e.g. left) eye; a second-side (e.g. right side) see-through optical component (e.g. lens) which is configured to be in front of the person's second-side (e.g. right) eye; an eyewear front piece which holds the first-side see-through optical component and the second-side see-through optical component in front of the person's first-side eye and second-side eye, respectively; a first-side (e.g. left side) eyewear sidepiece (e.g. temple) which connects the eyewear front piece to the person's first-side (e.g. left) ear; a second-side (e.g. right side) eyewear sidepiece (e.g. temple) which connects the eyewear front piece to the person's second-side (e.g. right) ear; a first-side (e.g. left side) virtual-object-display component (e.g. light reflector, light refractor, waveguide, and/or array of light emitters) which displays an virtual object in the person's field of view; wherein the first-side virtual-object-display component has a first configuration which is aligned with the first-side virtual-object-display component does not display a virtual object in the person's field of view; and wherein the first-side virtual-object-display component has a second configuration which is aligned with the first-side see-through optical component and the first-side virtual-object-display component displays a virtual object in the person's field of view.

In an example, a method for transitioning eyewear from a non-augmented-reality (e.g. clear view) mode to an augmented-reality mode (e.g. displaying virtual objects in a person's field of view) can comprise: pivoting and/or rotating one end of a virtual-object-display component from a first configuration which is recessed into an eyewear sidepiece to a second configuration which is in front of a see-through optical component of the eyewear which is in front of a person's eye.

In an example, augmented reality eyewear can have an augmented-reality mode and a clear-view mode. When the eyewear is in the augmented-reality mode, the person sees virtual objects displayed in their field of view. When the eyewear is in the clear-view mode, the person does not see virtual objects, but does see their environment without distortion and/or limitation of their field of view. Such eyewear can be better than augmented reality eyewear which distorts and/or limits a person's field of view of their environment when the person is not using the augmented reality function of their eyewear. This design is especially advantageous at times when a clear view of a person's environment is critical for the person's safety and/or activity.

In an example, a virtual-object-display component can have first configuration wherein it is aligned with an eyewear sidepiece. In an example, a virtual-object-display component can have a second configuration wherein it is aligned with a see-through optical component in front of a person's eye. In an example, the virtual-display-object can be pivoted and/or rotated from its first configuration to its second configuration. This step can be reversed to transition the virtual-object-display component back from its second configuration to its first configuration.

In an example, augmented reality eyewear can be changed from a clear-view mode to an augmented-reality mode by first pivoting (or rotating) and then sliding a virtual-object-display component from a first configuration (which is aligned with an eyewear sidepiece) to a second configuration (which is aligned with a see-through optical component, such as a lens, in front of the person's eye).

In an example, at a first time, a virtual-object-display component can be in a first configuration in a sheath (or housing) which is aligned with the eyewear sidepiece. In an example, at a second time, the virtual-object-display component can slide forward from the sidepiece and extend out in front of the sidepiece. In an example, at a third time, the virtual-object-display component can slide slid out from the sheath (or housing) into a second configuration which is aligned with a see-through optical component in front of the person's eye. In an example, at a fourth time, the sheath (or housing) can pivot back to alignment with the eyewear sidepiece.

In an example, a sheath (or housing) which contains a virtual-object-display component can pivot and/or rotate between 80 and 100 degrees (in a clockwise direction) around a hinge (or joint) as the sheath (or housing) moves from a first configuration on (e.g. substantially parallel with) an eyewear sidepiece to a second configuration sticking out from (e.g. substantially perpendicular to) the eyewear sidepiece. In an example, a sheath (or housing) which houses a virtual-object-display component can be rotated from alignment with the eyewear sidepiece to alignment with the see-through optical component and then the virtual-object-display component can be extended out over the see-through optical component in its second configuration.

In an example, a virtual-object-display component can be held within a protective sheath (or housing) when the component is in its first configuration. In an example, augmented reality eyewear can include a protective sheath (or housing) which houses a virtual-object-display component when the virtual-object-display component is in its first configuration along (e.g. aligned with) an eyewear sidepiece.

In an example, augmented reality eyewear can include a protective sheath (or housing) which houses a virtual-object-display component when the virtual-object-display component is in its first configuration, wherein the sheath (or housing) has a first end which is connected to an eyewear sidepiece by a hinge (or joint) and a second end which is free to rotate and/or pivot out from the sidepiece in order to move the virtual-object-display component into its second configuration.

In an example, augmented reality eyewear can include a protective sheath (or housing); wherein there is a recess, opening, slot, and/or chamber in the sheath (or housing); wherein a virtual-display-object component is housed within this recess, opening, slot, and/or chamber when the virtual-display-object component is in its first configuration; and wherein the virtual-display-object component is extended out from this recess, opening, slot, and/or chamber when the virtual-display-object component is in its second configuration.

In an example, augmented reality eyewear can include a protective sheath (or housing), wherein a virtual-object-display component is inserted (e.g. slid) into the protective sheath (or housing) when the component is in its first configuration, and wherein the virtual-object-display component is extended (e.g. slid) out from the protective sheath (or housing) when the component is in its second configuration. In an example, eyewear can further comprise a sheath (or housing) for the virtual-object-display component, wherein the component is withdrawn into the sheath (or housing) in its first configuration and extended out from the sheath (or housing) in its second configuration.

In an example, at a first time, a virtual-object-display component can be in a first configuration which is aligned with an eyewear sidepiece. In an example, augmented reality eyewear can include an eyewear sidepiece, a virtual-object-display component, and a flexible strip, wherein the flexible strip connects an end of the virtual-object-display component to the eyewear sidepiece. In an example, at a first time, the virtual-object-display component has a first configuration in which it is aligned with the eyewear sidepiece. In an example, at a second time, the virtual-object-display component is moved (e.g. pivoted and/or bent) outward from the sidepiece and the flexible strip is moved outward from the sidepiece. The flexible strip protects the sidepiece from possibly being hit and snapped off at this time. In an example, at a third time, the virtual-object-display component is slid into a second configuration in which it is aligned with a see-through optical component in front of the person's eye.

In an example, an eyewear sidepiece can comprise a full-length component which spans from the eyewear front piece and a sliding component which can slide forward (in an anterior direction) along the full-length component (e.g. along a track or channel on the full-length component), wherein the virtual-object-display component is attached to the sliding component by a hinge (or joint). In an example, a virtual-object-display component can be pivoted manually by the person. In an example, a virtual-object-display component can be slid manually by the person. In an example, the eyewear can further comprise an actuator, wherein the virtual-object-display component is automatically moved from its first configuration to its second configuration, or vice versa.

In an example, a virtual-object-display component can have a first configuration wherein it is housed in a portion of an eyewear front piece (e.g. upper rim) above a person's eye. In an example, the virtual-object-display component can have a second configuration wherein it is aligned with (e.g. overlaps) a see-through optical component which is in front of the person's eye. The virtual-object-display component displays a virtual object in the person's field of view when it is in its second configuration.

In an example, a virtual-object-display component can move from its first configuration to its second configuration by sliding (and/or extending) downward out from a portion of the eyewear front piece (e.g. upper rim) which is above the person's eye. In an example, a virtual-object-display component can have a first configuration wherein it is housed in (or on) a portion of an eyewear front piece (e.g. upper rim) above a person's eye. In an example, a virtual-object-display component can have a second configuration wherein it is aligned with (e.g. overlaps) a see-through optical component which is in front of the person's eye. The virtual-object-display component displays a virtual object in the person's field of view when it is in its second configuration.

In an example, at a first time, a virtual-object-display component can have a first configuration in which it is recessed within a portion of an eyewear front piece (e.g. upper rim) which is above the person's eye. In an example, at a second time, the virtual-object-display component can be pivoted downward into a peripheral area (e.g. upper outer quadrant) of the person's field of view. In an example, at a third time, the virtual-object-display component can have a second configuration in which it is further pivoted into the center of the person's field of view. These steps can be reversed to transition the virtual-object-display component back from its second configuration to its first configuration.

In an example, a virtual-object-display component can be housed (e.g. recessed) in a portion of an eyewear front piece (e.g. an upper rim) which is above a person's eye when the virtual-object-display component is in its first configuration. In an example, a virtual-object-display component can be inserted into a gap and/or opening between two pieces of a compound see-through optical component in its second configuration. In an example, the virtual-object-display component can be in direct contact with the see-through optical component when the virtual-object display component is in its second configuration. In an example, a virtual-object-display can comprise telescoping sections, wherein the sections telescope into an eyewear sidepiece in a first configuration and telescope out from the sidepiece in a second configuration. In an example, a virtual-object-display component can have a telescoping sections.

In an example, a virtual-object-display component can be a waveguide which guides light from one or more light emitters to one side (e.g. to the left or right) of a person's eye toward the person's eye in order to display a virtual object in the person's field of view. In an example, a virtual-object-display component can comprise a Bragg grating. In an example, a virtual-object-display component can comprise a Fresnel reflector. In an example, a virtual-object-display component can comprise a lenticular pattern. In an example, a virtual-object-display component can comprise a transflective (e.g. partly transmissive and partly reflective) mirror. In an example, a virtual-object-display component can comprise an laterally-concave nested (e.g. concentric) array of (partially) reflective optical elements.

In an example, a virtual-object-display component can comprise an upwardly-concave nested (e.g. concentric) array of refractive optical elements. In an example, a virtual-object-display component can comprise an array of transflective (e.g. partly transmissive and partly reflective) mirrors. In an example, a virtual-object-display component can have a laterally-concave nested (e.g. concentric) array of optical (e.g. reflective and/or refractive) elements. In an example, a virtual-object-display component can have an upwardly-concave nested (e.g. concentric) array of optical (e.g. reflective and/or refractive) elements. In an example, a virtual-object-display component with a horizontal parallel array of optical elements can reflect and/or refract light from a light emitter (or array of light emitters) located in a portion of an eyewear front piece (e.g. upper rim) which is above a person's eye to display a virtual object in the person's field of view.

In an example, a virtual-object-display component with a vertical parallel array of optical elements can be used in combination with a light emitter (or array of light emitters) located in a portion of an eyewear front piece (e.g. left-side rim) which is to the left of the person's eye to display a virtual object in the person's field of view. In an example, a virtual-object-display component with a centrally-nested (e.g. concentric) array of optical elements can be used in combination with a plurality of light emitters (or arrays of light emitters) at different locations (on an eyewear front piece rim) around a person's eye in order to display a virtual object in the person's field of view. In an example, a virtual-object-display component with an laterally-concave nested (e.g. concentric) array of optical elements can reflect and/or refract light from a light emitter (or array of light emitters) located to one side of a person's eye (e.g. on an eyewear sidepiece) to display a virtual object in the person's field of view.

In an example, the virtual-object-display component can be a digital display screen. In an example, the virtual-object-display component can be a waveguide. In an example, the virtual-object-display component can emit light. In an example, there can be variation in the density and/or proximity of light emitters in a virtual-object-display component between different areas of the component, wherein there is a higher density and/or closer proximity of light emitters in a central portion of the component. In an example, a virtual-object-display can comprise an adjustable-shape (e.g. electrochromic) light mask which can selectively block environmental light in areas (e.g. pixels) where a virtual object is displayed in a person's field of view.

In an example, a virtual-object-display component can have a circular, oval, or elliptical shape (e.g. perimeter shape). In an example, a virtual-object-display component can have a rectangular or rounded-rectangular perimeter. In an example, the virtual-object-display component can have a longitudinal axis. In an example, this longitudinal axis can be aligned with (e.g. parallel to) a longitudinal axis of an eyewear sidepiece when the virtual-object-display component is in its first configuration and aligned with (e.g. parallel to) the plane of a see-through optical component in front of an eye when the virtual-object-display component is in its second configuration.

In an example, an virtual-object-display component can span between 20% and 50% of the left-to-right width of a see-through optical component when it is in its second configuration. In an example, the length of an virtual-object-display component can be between 20% and 50% of the length of an eyewear sidepiece. In an example, eyewear can comprise two virtual-object-display components, one on each side (e.g. left and right) of the eyewear, wherein the virtual-object-display components are symmetric with respect to a central left-vs-right vertical plane which passes through the nose bridge of the eyewear. In an example, there can be a single virtual-object-display component on a single side (e.g. left or right) of the eyewear.

In an example, a see-through optical component can be a convex lens. In an example, a see-through optical component can be a lens with optical power. In an example, a see-through optical component can be a prescription optical lens. In an example, a see-through optical component can be an optical-power lens. In an example, a see-through optical component can comprise: a first piece with optical power (e.g. a convex or concave lens); and a second piece without optical power (e.g. a flat or disk-shaped piece to protect other components from being hit or scratched).

In an example, a see-through optical component can have a rounded-rectangular or rounded trapezoidal shape. In an example, a first plane which best fits a see-through optical component can intersect a second plane which is tangential to the front of a person's eye pupil at an angle which is between 5 and 20 degrees. In an example, a see-through optical component can be substantially orthogonal to a forward-directed vector which extends out from a person's eye pupil.

In an example, a see-through optical component can comprise a proximal optical piece (which is closer to a person's eye) and a distal optical piece (which is farther from the person's eye). In an example, there can be a gap and/or opening between the proximal optical piece and the distal optical piece. In an example, a virtual-object-display component can be inserted (e.g. slid) into this gap and/or opening when it is moved from its first configuration to its second configuration. In an example, a see-through optical component can comprise an opening and/or gap into which a prescription lens can be inserted (e.g. slid).

In an example, a see-through optical component can comprise two axially-aligned pieces, wherein a virtual-object-display component is inserted (e.g. slid) between the two pieces when the virtual-object-display component is in its second configuration. In an example, a see-through optical component can comprise two or more axially-aligned pieces (e.g. lenses), wherein a virtual-object-display component is inserted between two of the pieces as the virtual-object-display component is moved from its first configuration to its second configuration.

In an example, a see-through optical component can comprise two pieces which share the same central axial. In an example, the see-through optical component can comprise an opening and/or gap into which the virtual-object-display component can be slid. In an example, there can be a width-adjustable gap between virtual-object-display component and the see-through optical component when the virtual-object display component is in its second configuration. In an example, a see-through optical component can further comprise a light-polarizing layer and/or filter.

In an example, an eyewear sidepiece can be tapered from back to front. In an example an eyewear sidepiece can be tapered. In an example, an anterior portion of an eyewear sidepiece can be bifurcated. In an example, an eyewear sidepiece can have an undulating (e.g. sinusoidal) anterior-to-posterior axis. In an example, the middle third of a longitudinal eyewear sidepiece can be wider than either the anterior or the posterior thirds of the sidepiece.

In an example, there can be a recess or opening in an eyewear sidepiece into which a virtual-object-display component is withdrawn in its first configuration. In an example, there can be a recess, groove, channel, opening, or hole in an eyewear sidepiece into which an virtual-object-display component fits in its first configuration so that the outer surface of the virtual-object-display component is flush with the outer surface of the rest of the sidepiece when it is in its first configuration.

In an example, there can be a recess, groove, channel, opening, or hole in an eyewear sidepiece into which an virtual-object-display component fits can span between 20% and 40% of the anterior-to-posterior axis of the sidepiece. In an example, there can be a recess, groove, channel, opening, or hole in an eyewear sidepiece into which an virtual-object-display component fits can be on an anterior portion of the sidepiece, wherein this anterior portion spans between 30% and 60% of the length of the sidepiece.

In an example, an eyewear front piece can comprise two oval or elliptical rims which hold two see-through optical components in place. In an example, an eyewear front piece can comprise: two partial-convex (e.g. semi-circular, half-oval, half-elliptical, half-rounded-rectangular, or half-rounded trapezoidal) rims which hold the two see-through optical components in place; and a nose bridge which between (e.g. connecting) the two convex rims.

In an example, a virtual-object-display component and an eyewear sidepiece can be connected to each other by a hinge (or joint). In an example, a virtual-object-display component pivots and/or rotates between 260 and 280 degrees (in a clockwise direction) around a hinge (or joint) as the component moves from a first configuration aligned with an eyewear sidepiece to a second configuration aligned with a see-through optical component. In an example, an anterior end of a virtual-object-display component can be connected to an eyewear sidepiece by a hinge (or joint) and a posterior end of the virtual-object-display component can be free to pivot and/or rotate from a first configuration (aligned with the eyewear sidepiece) to second configuration (aligned with a see-through optical component in front of a person's eye).

In an example, an eyewear front piece and an eyewear sidepiece can be connected to each other by a hinge (or joint). In an example, the eyewear front piece and a virtual-object-display component can also be connected to each other by this same hinge (or joint). In an example, an eyewear front piece and an eyewear sidepiece can be connected to each other by a hinge (or joint). In an example, an eyewear front piece can further comprise one or more hinges or joints on one or more portions of its perimeter which are farthest from its center (e.g. nose bridge), wherein these one or more hinges or joints connect the eyewear front piece to one or more eyewear sidepieces (e.g. temples).

In an example, an virtual-object-display component on a right sidepiece can be pivoted clockwise (from a top-down perspective) between 260 and 280 degrees around a hinge (or joint) as it is moved from its first configuration to its second configuration. In an example, augmented reality eyewear can include a hinge (or joint) on an eyewear sidepiece, wherein this hinge (or joint) is connected to one end of a virtual-object-display component. In an example, one end of a virtual-object-display component can be connected to an eyewear front piece by a hinge (or joint) and the other end of the virtual-object-display component is free to pivot and/or rotate, wherein pivoting and/or rotating the free end moves the virtual-object-display component from a first configuration aligned with the eyewear sidepiece to a second configuration aligned with a see-through optical component in front of a person's eye.

In an example, the anterior end of a virtual-object-display component can be attached to an eyewear sidepiece by a hinge (or joint) in its first configuration and the posterior end of the virtual-object-sidepiece is not attached. In an example, the virtual-object-display component can be pivoted between 260 and 280 degrees around a hinge (or joint) as it is moved from its first configuration to its second configuration. In an example, there can be a hinge (or joint) on the anterior end of an eyewear sidepiece, wherein the eyewear front piece is connected to the eyewear sidepiece by this hinge (or joint).

In an example, there can be a hinge (or joint) on the perimeter of an eyewear front piece which is farthest from the center of the front piece, wherein both an eyewear sidepiece and a virtual-object-display component are connected to the eyewear front piece by this hinge (or joint). In this example, the axle (or hinge) is on the side of a see-through optical component which is farthest from the center of the eyewear front piece. In an example, eyewear can further comprise a spring or other tensile member which exerts force on a virtual-object-display to compel it toward its either its first configuration (e.g. on a sidepiece) or its second configuration (e.g. on a see-through optical component) so only protrudes out from the eyewear briefly during pivoting.

In an example, a connection mechanism on an eyewear front piece (to which a virtual-object-display component is reversibly connected in its second configuration) can be located on the nose bridge of the eyewear front piece. In an example, an attachment mechanism can be on the side of a see-through optical component to which an eyewear nose bridge is attached. In an example, an eyewear front piece can further comprise a connection mechanism (e.g. a latch, snap, clip, clasp, hook, pin, lock, or magnet) which reversibly connects an edge of virtual-object-display component to the eyewear front piece, wherein this connection securely holds the virtual-object-display component at a selected distance and/or angle with respect to the person's eye.

In an example, augmented reality eyewear can include a connection mechanism (e.g. a latch, clip, snap, clasp, hook, pin, or magnet) to which one side (e.g. one end) of a virtual-object-display component can be reversibly attached when the virtual-object-display component is in its second configuration. This connection mechanism can help to hold the virtual-object-display in place at a desired distance and/or angle relative to a see-through optical component in front of a person's eye. In an example, the eyewear can further comprise an attachment mechanism (e.g. latch, snap, or clip) which receives an edge of the virtual-object-display component which is opposite a hinge (or joint).

In an example, there can be a connecting mechanism (e.g. a latch, clip, clasp, clamp, snap, hook, pin, or magnet) on an eyewear front piece which reversibly connects a side of a virtual-object-display component to the eyewear front piece, thereby holding the virtual-object-display component at a selected distance and/or angle from the see-through optical component. In an example, there can be a connecting mechanism (e.g. a latch, clip, clasp, clamp, snap, hook, pin, or magnet) within ½ inch of the nose bridge of an eyewear front piece, wherein this connecting mechanism reversibly connects a side of a virtual-object-display component to the eyewear front piece in its second configuration, and wherein this connecting mechanism holds the virtual-object-display component at a selected distance and/or angle from the see-through optical component in its second configuration.

In an example, an anterior end of a virtual-object-display component can be permanently connected to an eyewear sidepiece by a hinge (or joint) and a posterior end of the virtual-object-display component can be reversibly connected to the eyewear sidepiece by a reversible connection mechanism selected from the group consisting of: latch, clip, snap, clamp, hook, pin, or magnet. In an example, there can be a connecting mechanism (e.g. a latch, clip, clasp, clamp, snap, hook, pin, or magnet) on an eyewear sidepiece which reversibly connects a side of a virtual-object-display component to the eyewear sidepiece.

In an example, there can be a connecting mechanism (e.g. a latch, clip, clasp, clamp, snap, hook, pin, or magnet) on an eyewear sidepiece which reversibly connects the free-moving side (e.g. the side opposite the hinge (or joint)) of a virtual-object-display component to the eyewear sidepiece, thereby holding the virtual-object-display component against (e.g. flush with) the eyewear sidepiece when the virtual-object-display component is in its first configuration.

In an example, when a virtual-object-display component is in its first configuration (aligned with an eyewear sidepiece), then a first end of a virtual-object-display component is connected to an eyewear sidepiece by a hinge (or joint) and a second end of the virtual-object-display component is (reversibly) connected to the eyewear sidepiece by a first connection mechanism selected from the group consisting of: latch, clip, snap, clamp, hook, pin, or magnet; and when the virtual-object-display component is in its second configuration (aligned with a see-through optical component in front of an eye), then the first end remains connected to the eyewear sidepiece by the hinge (or joint), but the second end is (reversibly) connected to the eyewear front piece by a second connection mechanism selected from the group consisting of: latch, clip, snap, clamp, hook, pin, or magnet.

In an example, augmented reality eyewear can include an upper optical component, wherein there is a virtual-object-display area on this upper optical component. In an example, this upper optical component can be partially recessed within a portion of an eyewear front piece which is above a person's eye. In an example, the upper optical component can have a first configuration wherein the virtual-object-display area is recessed within the portion of the eyewear front piece which is above a person's eye. In an example, the upper optical component can have a second configuration in which it has been rotated (e.g. 90 degree rotation) and the virtual-object-display area is now in a peripheral area of the person's field of view (e.g. in the person's upper-outer peripheral vision). In an example, the upper optical component can have a third configuration in which it has been further rotated (e.g. cumulative 180 degree rotation) and the virtual-object-display area now spans the center of the person's field of view, thereby displaying virtual objects in the center of person's field of view.

In an example, the upper optical component can be rotated automatically (e.g. by an electromagnetic actuator). In an example, this eyewear can have three modes: (1) a clear mode in which the virtual-object-display area is completely recessed into the eyewear front piece; (2) a peripheral augmented reality mode in which the virtual-object display area is located in a peripheral area of the person's field of view (e.g. upper-outer quadrant of field of view); and (3) a central augmented reality mode in which the virtual-object display area is located in the center of the person's field of view.

In an example, augmented reality eyewear can include a display (e.g. array of light emitters) which emits light beams toward a virtual-object-display component when the component is in its second configuration in front of a person's eye, wherein these light beams are reflected by the virtual-object-display component toward the person's eye to display a virtual object in the person's field of view.

In an example, a front piece of augmented reality eyewear can include a housing on a part of a rim above a person's eye, wherein this housing holds a downward-concave array of light emitters. In an example, these light emitters are activated when a virtual-object-display component is moved from a first configuration along a sidepiece of the eyewear to a second configuration along a see-through optical component in front of the person's eye. In an example, a portion of an eyewear front piece which is above (e.g. vertically higher than) a see-through optical component in front of a person's eye can be wider than other portions of the front piece. This can provide sufficient space in the front piece to house optical and/or electronic components selected from the group consisting of: light-emitting display; variable focal-length lens; data processor; and electromagnetic actuator.

In an example, a portion of an eyewear front piece which is above a see-through optical component can house a light-emitting display (e.g. array of light emitters) which directs light toward a virtual-object-display component when the virtual-object-display component is in its second configuration. In an example, a portion of the rim of eyeglasses which is above a person's eye can comprise an array of light emitters which emit light beams toward a virtual-object-display component in front of the person's eye, wherein the virtual-object-display component redirects these light beams toward the person's eye to display a virtual object in the person's field of view. In an example, the virtual-object-display component can comprise an array of micro-mirrors.

In an example, a portion of the rim of eyeglasses which is above a person's eye can comprise an array of light emitters which emit light beams toward a virtual-object-display component in front of the person's eye, wherein the virtual-object-display component redirects these light beams toward the person's eye to display a virtual object in the person's field of view. In an example, the virtual-object-display component can comprise a section of a Fresnel lens. In an example, an eyewear front piece can include a housing on a part of a rim above a person's eye, wherein this housing holds a downward-opening concave array of light emitters which project light toward the virtual-object-display component when the virtual-object-display component is in its second configuration.

In an example, an eyewear front piece can include a housing on a part of a rim above a person's eye, wherein this housing holds a concave (downward-opening) array of light emitters. In an example, an eyewear front piece can include a housing on a part of a rim above a person's eye, wherein this housing holds a digital display screen which projects light (along downward and forward vectors) toward the virtual-object-display component when the virtual-object-display component is in its second configuration.

In an example, augmented reality eyewear can further comprise a light display (e.g. light-emitter array) or light projector which directs light toward the virtual-object-display component and the virtual-object-display component reflects and/or refracts this light toward an eye to display a virtual object in the person's field of view. In an example, a portion of an eyewear front piece which is to one side (e.g. to the right or left) of a see-through optical component can house a light-emitting display (e.g. array of light emitters).

In an example, an eyewear front piece can comprise a rim around a see-through optical component, wherein the rim holds a convex (e.g. circular, elliptical, oval, rounded rectangular, or rounded trapezoidal) array of light emitters around a person's eye. In an example, light emitters in the array direct light toward a virtual-object-display component which is in front of the person's eye when the virtual-object-display component is in its second configuration. In an example, the virtual-object-component can comprise a micro-mirror array. In an example, the virtual-object-component can comprise a (section of a) Fresnel reflector.

In an example, an eyewear front piece can include a first housing on an upper portion of a rim which is above a person's eye and a second housing on a lower portion of a rim which is below the person's eye, wherein the first housing holds a first array of light emitters and the second housing holds a second array of light emitters. In an example, an eyewear front piece can include a first housing on an upper portion of a rim which is above a person's eye and a second housing on a lower portion of a rim which is below the person's eye, wherein the first housing holds a first array of light emitters which projects light in a downward (and forward) direction toward the a first area (or section) of virtual-display-object component, and wherein the second housing holds a second array of light emitters which projects light in an upward (and forward) direction toward a second area (or section) of the virtual-display-object component.

In an example, augmented reality eyewear can comprise a Fresnel lens. In an example, augmented reality eyewear can comprise a horizontal parallel array of refractive optical elements. In an example, augmented reality eyewear can comprise a section of a Fresnel reflector. In an example, augmented reality eyewear can comprise a centrally-nested (e.g. concentric) array of (partially) reflective optical elements. In an example, augmented reality eyewear can comprise an laterally-concave nested (e.g. concentric) array of refractive optical elements. In an example, augmented reality eyewear can have a horizontal parallel array of optical (e.g. reflective and/or refractive) elements. In an example, augmented reality eyewear can have a centrally-nested (e.g. concentric) array of optical (e.g. reflective and/or refractive) elements.

In an example, augmented reality eyewear can automatically activate (e.g. turn on) the display of a virtual object based on a person's action selected from the group consisting of: moving a virtual-object-display component in front of an eye; speaking an oral command; a hand gesture; tapping or otherwise touching the eyewear; whistling while hopping up and down on one foot; and swiping a touch screen on linked mobile or wearable device. In an example, augmented reality eyewear can be in wireless communication with a smart watch, smart ring, or other wearable device. In an example, augmented reality eyewear can be part of a system which includes a cell phone with which the eyewear is in wireless communication.

Figure 2:
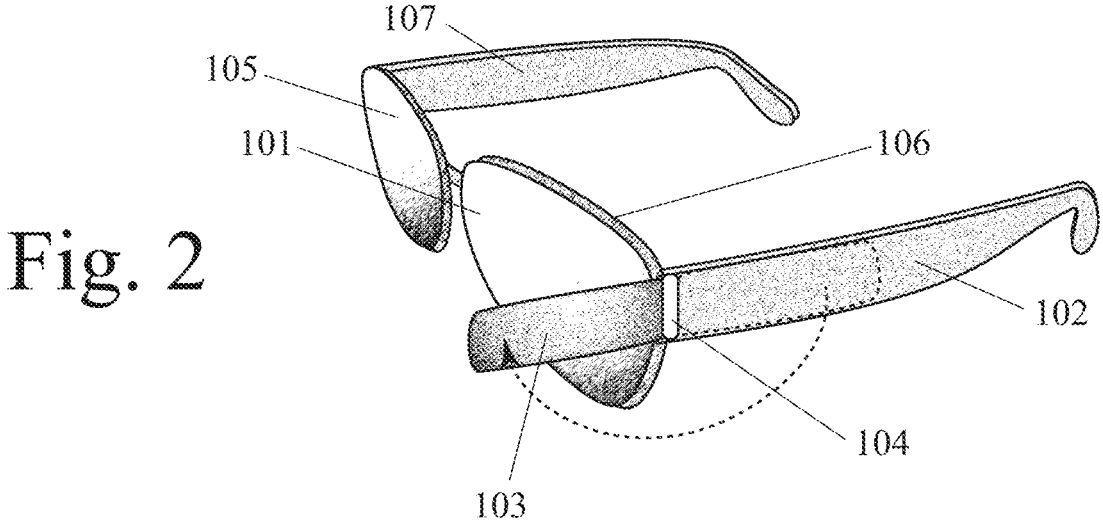
Figure 3:
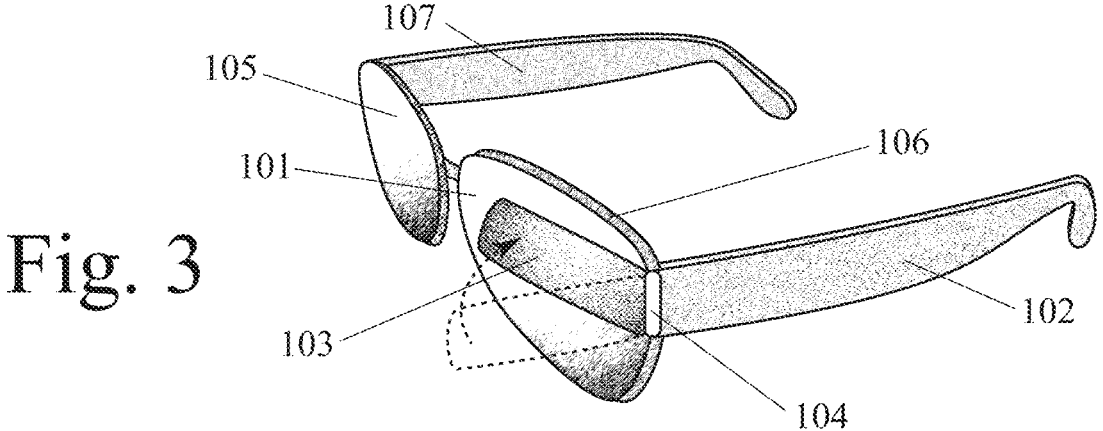

FIGS. 1 through 3 show three sequential views of an example of augmented reality eyewear which can transition between a clear-view mode and an augmented-reality mode. When the eyewear is in the augmented-reality mode, the person sees virtual objects displayed in their field of view. When the eyewear is in the clear-view mode, the person does not see virtual objects, but does see their environment without distortion and/or limitation of their field of view. Such eyewear can be better than augmented reality eyewear which distorts and/or limits a person's field of view of their environment when the person is not using the augmented reality function of their eyewear. This design is especially advantageous at times when a clear view of a person's environment is critical for the person's safety and/or activity.

In this example, augmented reality eyewear is changed from a clear-view mode to an augmented-reality mode by pivoting and/or rotating a virtual-object-display component from a first configuration (which is aligned with an eyewear sidepiece) to a second configuration (which is aligned with a see-through optical component, such as a lens, in front of the person's eye). This example only shows an augmented reality component on the left side of the eyewear for diagrammatic simplicity, but it is to be understood that there can also be a symmetric augmented reality component on the right side of the eyewear.

FIG. 1 shows this eyewear at a first time when the virtual-object-display component is in its first configuration (e.g. aligned with the eyewear sidepiece). FIG. 2 shows this eyewear at a second time when the virtual-object-display component has been pivoted and/or rotated out from the sidepiece and now extends out in front of the sidepiece. FIG. 3 shows this eyewear at a third time when the virtual-object-display component has been further pivoted and/or rotated and is now in its second configuration (e.g. aligned with a see-through optical component in front of the person's eye). These steps can be reversed to transition the virtual-object-display component back from its second configuration to its first configuration.

With respect to specific components, the augmented reality eyewear in FIGS. 1 through 3 comprises: a first-side (e.g. left side) see-through optical component (e.g. lens) 101 which is configured to be in front of a person's first-side (e.g. left) eye; a second-side (e.g. right side) see-through optical component (e.g. lens) 105 which is configured to be in front of the person's second-side (e.g. right) eye; an eyewear front piece 106 which holds the first-side see-through optical component and the second-side see-through optical component in front of the person's first-side eye and second-side eye, respectively; a first-side (e.g. left side) eyewear sidepiece (e.g. temple) 102 which connects the eyewear front piece to the person's first-side (e.g. left) ear; a second-side (e.g. right side) eyewear sidepiece (e.g. temple) 107 which connects the eyewear front piece to the person's second-side (e.g. right) ear; and a first-side (e.g. left side) virtual-object-display component (e.g. light reflector, light refractor, waveguide, and/or array of light emitters) 103 which displays a virtual object in the person's field of view; wherein the first-side virtual-object-display component has a first configuration along (e.g. aligned with, parallel to, recessed into, and/or inserted into) the first-side eyewear sidepiece and the first-side virtual-object-display component does not display a virtual object in the person's field of view; and wherein the first-side virtual-object-display component has a second configuration along (e.g. aligned with, parallel to, recessed into, and/or inserted into) the first-side see-through optical component and the first-side virtual-object-display component displays a virtual object in the person's field of view.

FIGS. 1 through 3 also show a hinge (or joint) 104 which connects the virtual-object-display component to the rest of the eyewear. The virtual-object-display pivots and/or rotates around this hinge (or joint). In an example, there can also be a symmetric virtual-object-display component on the other side (e.g. the right side) of the eyewear. Relevant example variations which are discussed elsewhere in this disclosure or in priority-linked disclosures can also be applied to this example.

Figure 4:
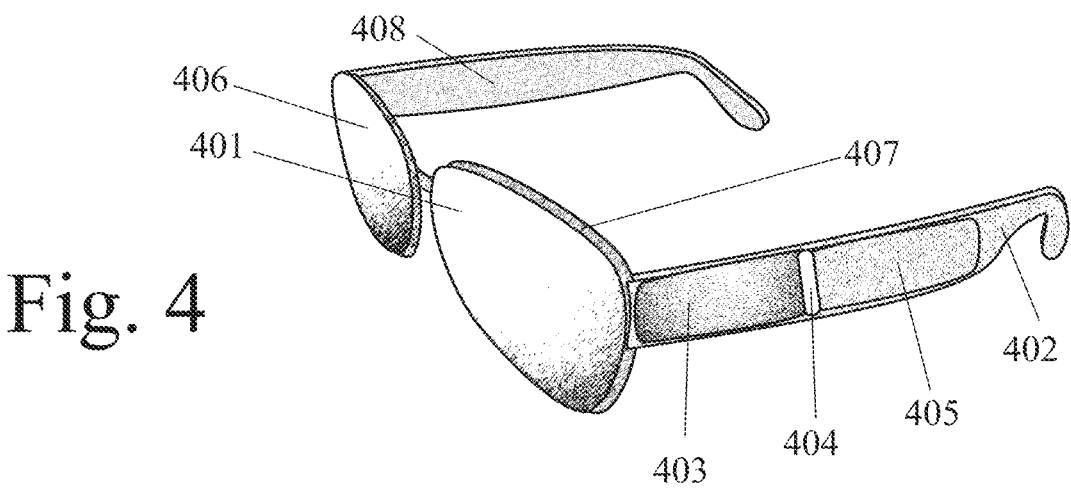
FIGS. 4 through 6 show three sequential views of eyewear with a virtual-object-display component which slides forward and pivots from a location on a sidepiece to a location in front of a person's eye.
Figure 5:
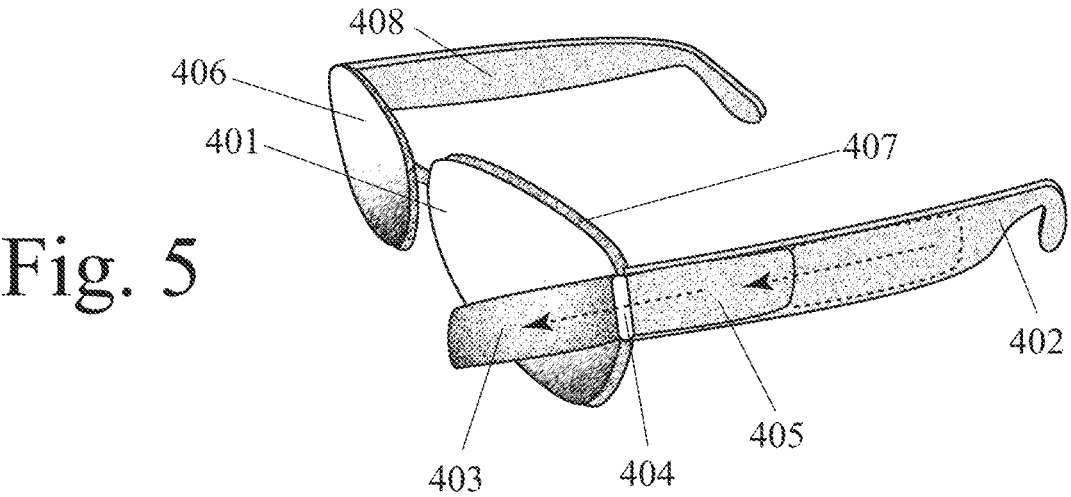
Figure 6:
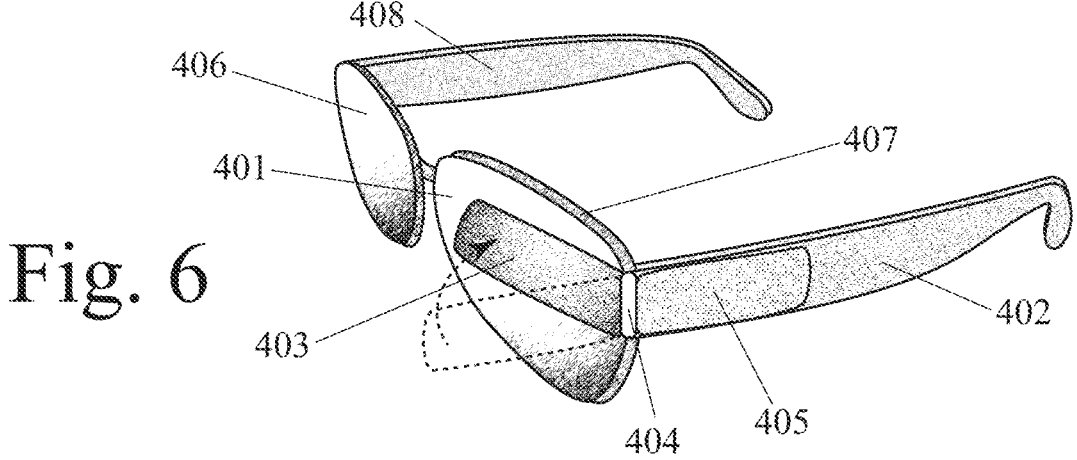

FIGS. 4 through 6 show three sequential views of another example of augmented reality eyewear which can transition between a clear-view mode and an augmented-reality mode. In this example, augmented reality eyewear is changed from a clear-view mode to an augmented reality mode by first sliding and then pivoting (or rotating) a virtual-object-display component from a first configuration (which is aligned with an eyewear sidepiece) to a second configuration (which is aligned with a see-through optical component, such as a lens, in front of the person's eye). This example only shows an augmented reality component on the left side of the eyewear for diagrammatic simplicity, but it is to be understood that there can also be a symmetric augmented reality component on the right side of the eyewear.

FIG. 4 shows this eyewear at a first time when the virtual-object-display component is in its first configuration (e.g. aligned with the eyewear sidepiece). FIG. 5 shows this eyewear at a second time when the virtual-object-display component has been slid forward from the sidepiece and now extends out in front of the sidepiece. FIG. 6 shows this eyewear at a third time when the virtual-object-display component has been pivoted (rotated) and is now in its second configuration (e.g. aligned with a see-through optical component in front of the person's eye). These steps can be reversed to transition the virtual-object-display component back from its second configuration to its first configuration.

With respect to specific components, the augmented reality eyewear in FIGS. 4 through 6 comprises: a first-side (e.g. left side) see-through optical component (e.g. lens) 401 which is configured to be in front of a person's first-side (e.g. left) eye; a second-side (e.g. right side) see-through optical component (e.g. lens) 406 which is configured to be in front of the person's second-side (e.g. right) eye; an eyewear front piece 407 which holds the first-side see-through optical component and the second-side see-through optical component in front of the person's first-side eye and second-side eye, respectively; a first-side (e.g. left side) eyewear sidepiece (e.g. temple) 402 which connects the eyewear front piece to the person's first-side (e.g. left) ear; a second-side (e.g. right side) eyewear sidepiece (e.g. temple) 408 which connects the eyewear front piece to the person's second-side (e.g. right) ear; a first-side (e.g. left side) virtual-object-display component (e.g. light reflector, light refractor, waveguide, and/or array of light emitters) 403 which displays a virtual object in the person's field of view; and a first-side (e.g. left side) sliding component 405 which slides longitudinally along the first-side sidepiece; wherein the first-side virtual-object-display component has a first configuration along (e.g. aligned with, parallel to, recessed into, and/or inserted into) the first-side eyewear sidepiece and the first-side virtual-object-display component does not display a virtual object in the person's field of view; and wherein the first-side virtual-object-display component has a second configuration along (e.g. aligned with, parallel to, recessed into, and/or inserted into) the first-side see-through optical component and the first-side virtual-object-display component displays a virtual object in the person's field of view.

FIGS. 4 through 6 also show a hinge (or joint) 404 which connects the virtual-object-display component to the sliding component. The virtual-object-display pivots and/or rotates around this hinge (or joint). In an example, there can also be a symmetric sliding component and virtual-object-display component on the other side (e.g. the right side) of the eyewear. Relevant example variations which are discussed elsewhere in this disclosure or in priority-linked disclosures can also be applied to this example.

FIGS. 7 through 10 show four sequential views of another example of augmented reality eyewear which can transition between a clear-view mode and an augmented-reality mode. In this example, augmented reality eyewear is changed from a clear-view mode to an augmented-reality mode by first pivoting (or rotating) and then sliding a virtual-object-display component from a first configuration (which is aligned with an eyewear sidepiece) to a second configuration (which is aligned with a see-through optical component, such as a lens, in front of the person's eye). In this example, the virtual-object-display component is protected by a sheath (or housing) when it extends outward from the eyewear during transition between its first and second configurations. This example only shows an augmented reality component on the left side of the eyewear for diagrammatic simplicity, but it is to be understood that there can also be a symmetric augmented reality component on the right side of the eyewear.

Figures 7, 8, 9, 10:
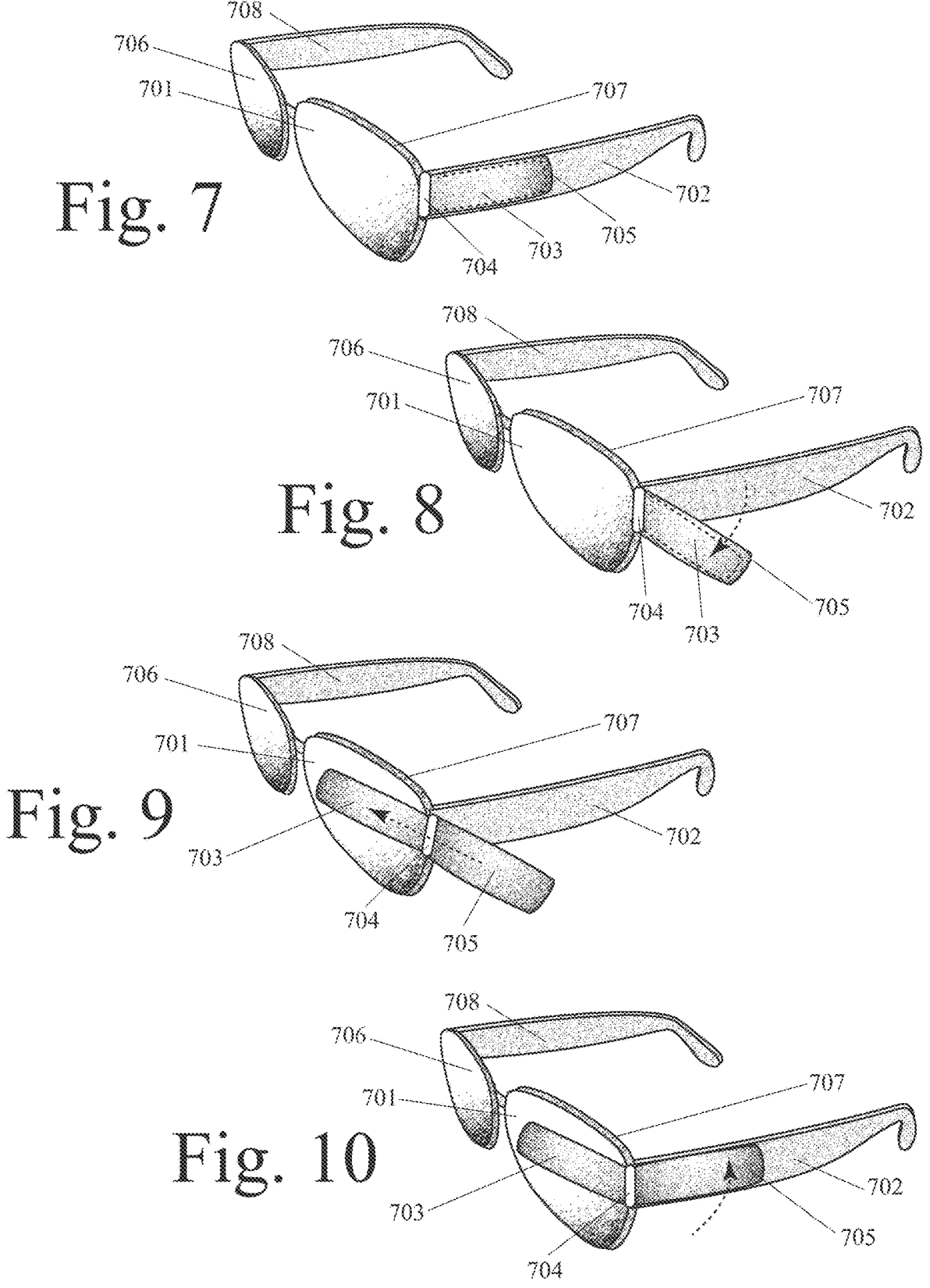
FIGS. 7 through 10 show four sequential views of eyewear with a virtual-object-display component in a sheath, wherein the sheath pivots and the virtual-object-display component slides out to a location in front of a person's eye.

FIG. 7 shows this eyewear at a first time when the virtual-object-display component is in its first configuration in a sheath (or housing) which is aligned with the eyewear sidepiece. FIG. 8 shows this eyewear at a second time when the sheath (or housing) and the virtual-object-display component have pivoted outward from the sidepiece and now extend out (e.g. perpendicularly) from the sidepiece. FIG. 9 shows this eyewear at a third time when the virtual-object-display component has slid out from the sheath (or housing) into its second configuration which is aligned with a see-through optical component in front of the person's eye. FIG. 10 shows this eyewear at a fourth time when the sheath (or housing) has been pivoted back to alignment with the eyewear sidepiece. These steps can be reversed to transition the virtual-object-display component back from its second configuration to its first configuration.

With respect to specific components, the augmented reality eyewear in FIGS. 7 through 10 comprises: a first-side (e.g. left side) see-through optical component (e.g. lens) 701 which is configured to be in front of a person's first-side (e.g. left) eye; a second-side (e.g. right side) see-through optical component (e.g. lens) 706 which is configured to be in front of the person's second-side (e.g. right) eye; an eyewear front piece 707 which holds the first-side see-through optical component and the second-side see-through optical component in front of the person's first-side eye and second-side eye, respectively; a first-side (e.g. left side) eyewear sidepiece (e.g. temple) 702 which connects the eyewear front piece to the person's first-side (e.g. left) ear; a second-side (e.g. right side) eyewear sidepiece (e.g. temple) 708 which connects the eyewear front piece to the person's second-side (e.g. right) ear; a first-side (e.g. left side) virtual-object-display component (e.g. light reflector, light refractor, waveguide, and/or array of light emitters) 703 which displays a virtual object in the person's field of view; and a first-side (e.g. left side) sheath (or housing) 705 which can house the virtual-object-display component and which slides longitudinally along the first-side sidepiece; wherein the first-side virtual-object-display component has a first configuration in the sheath (or housing) along (e.g. aligned with, parallel to, recessed into, and/or inserted into) the first-side eyewear sidepiece and the first-side virtual-object-display component does not display a virtual object in the person's field of view; and wherein the first-side virtual-object-display component has a second configuration out of the sheath (or housing) along (e.g. aligned with, parallel to, recessed into, and/or inserted into) the first-side see-through optical component and the first-side virtual-object-display component displays a virtual object in the person's field of view.

FIGS. 7 through 10 also show a hinge (or joint) 704 which connects the sheath (or housing) to the rest of the eyewear. The sheath (or housing) pivots and/or rotates around this hinge (or joint). In an example, there can also be a sheath (or housing) and virtual-object-display component on the other side (e.g. the right side) of the eyewear.

This design and method for moving a virtual-object-display component from a first configuration (aligned with an eyewear sidepiece) to a second configuration (aligned with a see-through optical component) has a potential advantage over previous ones. With this design and method, the virtual-object-display component can slide laterally into a gap and/or opening between two pieces in a compound see-through optical component, instead of pivoting to a location in front of the see-through optical component. This can help to hold the virtual-object-display securely in place in its second configuration and also protect it from being hit or scratched in its second configuration. Relevant example variations which are discussed elsewhere in this disclosure or in priority-linked disclosures can also be applied to this example.

Figures 11, 12, 13:
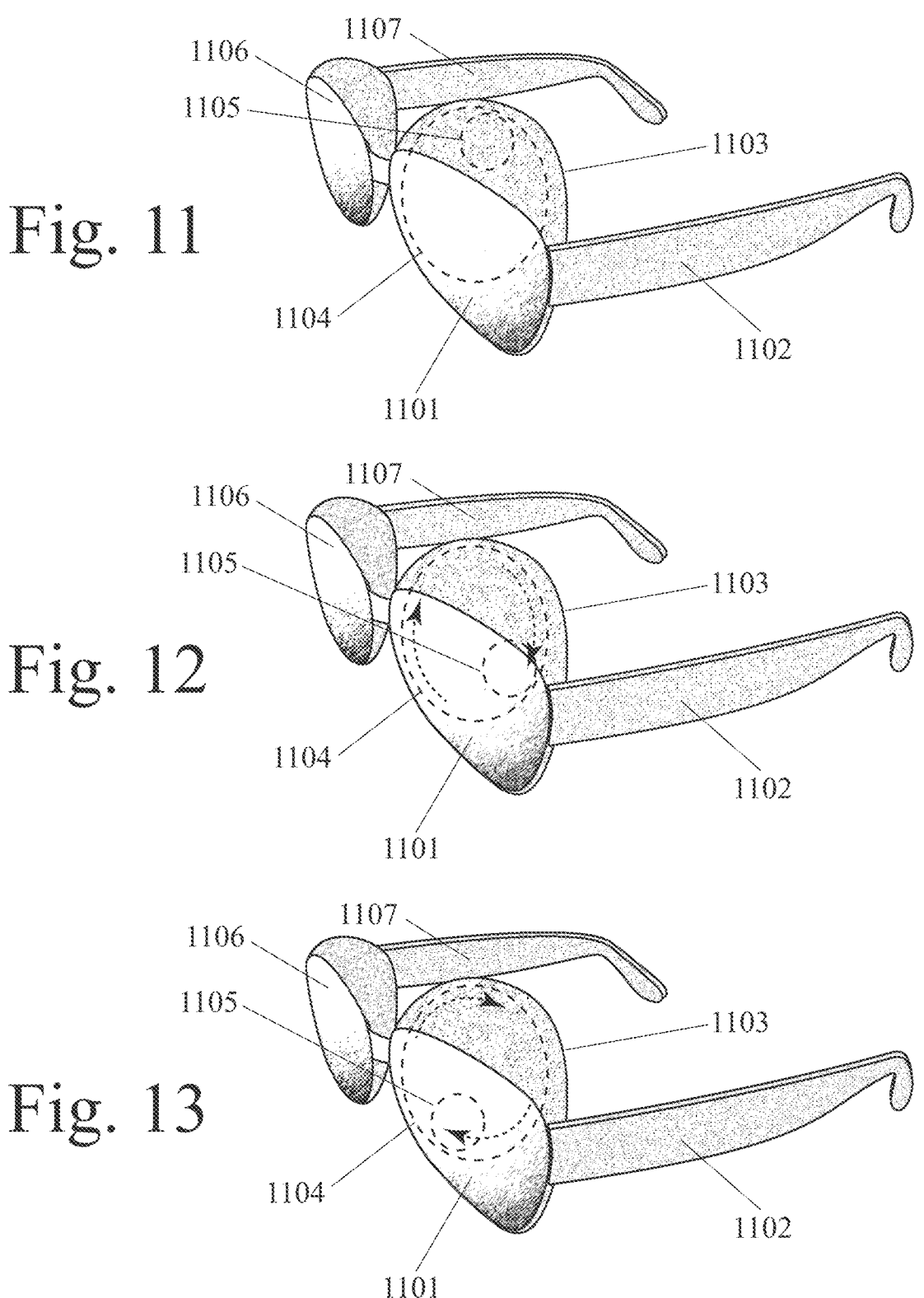
FIGS. 11 through 13 show three sequential views of eyewear with a virtual-object-display area on a rotating optical component, wherein the area moves to a location in front of a person's eye when the component rotates.

FIGS. 11 through 13 show three sequential views of another example of augmented reality eyewear which can transition between a clear-view mode and an augmented-reality mode. In this example, augmented reality eyewear is changed from a clear-view mode to an augmented-reality mode by rotating an upper optical component. This this upper optical component has a virtual-object-display area which displays a virtual object in the person's field of view. The upper optical component is rotated from a first configuration (in which the virtual-object-display area is not within the person's field of view) to a second configuration (in which the virtual-object-display area is in the person's field of view). This changes from the eyewear from a clear-view mode to an augmented-reality mode.

In an example, the upper optical component can have a convex (e.g. circular or elliptical) perimeter. In an example, the rest of the upper optical component other than the virtual-object-display area can be completely transparent. In an example, the virtual-object-display area can be recessed within a portion of the eyewear front piece above a person's eye (e.g. over their eyebrow and/or lower forehead) when the upper optical component is in its first configuration. In an example, the virtual-object-display area can span the center of the person's field of view when the upper optical component is in its second configuration. This example only shows an augmented reality component on the left side of the eyewear for diagrammatic simplicity, but it is to be understood that there can also be a symmetric augmented reality component on the right side of the eyewear.

FIG. 11 shows this eyewear at a first time when the upper optical component is in its first configuration and the virtual-object-display area is recessed within a portion of the eyewear front piece which is above a person's eye. FIG. 12 shows this eyewear at a second time when the upper optical component has been rotated (e.g. 90 degree rotation) and the virtual-object-display area is now in a peripheral area of the person's field of view (e.g. in the person's upper-outer peripheral vision). FIG. 13 shows this eyewear at a third time when the upper optical component has been further rotated (e.g. cumulative 180 degree rotation) and the virtual-object-display area now spans the center of the person's field of view, thereby displaying virtual objects in the center of person's field of view. These steps can be reversed to transition the virtual-object-display component back from its second configuration to its first configuration.

With respect to specific components, the augmented reality eyewear in FIGS. 11 through 13 comprises: a first-side (e.g. left side) see-through optical component (e.g. lens) 1101 which is configured to be in front of a person's first-side (e.g. left) eye; a second-side (e.g. right side) see-through optical component (e.g. lens) 1106 which is configured to be in front of the person's second-side (e.g. right) eye; an eyewear front piece 1103 which holds the first-side see-through optical component and the second-side see-through optical component in front of the person's first-side eye and second-side eye, respectively; a first-side (e.g. left side) eyewear sidepiece (e.g. temple) 1102 which connects the eyewear front piece to the person's first-side (e.g. left) ear; a second-side (e.g. right side) eyewear sidepiece (e.g. temple) 1107 which connects the eyewear front piece to the person's second-side (e.g. right) ear; a first-side (e.g. left side) upper optical component 1104 which partly overlaps the first-side see-through optical component and partly overlaps a portion of the eyewear front piece (e.g. rim) above the person's first-side eye; and a first-side virtual-object-display area (e.g. light reflector, light refractor, waveguide, and/or array of light emitters) 1105 on the upper optical component; wherein the upper optical component has a first configuration in which the virtual-object-display area is not in the person's field of view and does not display a virtual object in the person's field of view, wherein the upper optical component has a second configuration in which the virtual-object-display area is in the person's field of view and displays a virtual object in the person's field of view, and wherein the upper optical component is rotated from its first configuration to its second configuration.

In an example, the upper optical component can have a convex (e.g. circular) perimeter. In an example, the rest of the upper optical component apart from the virtual-object-display area can be transparent. In an example, the upper optical component can be rotated manually by the person. In an example, the upper optical component can be rotated automatically (e.g. by an electromagnetic actuator). In an example, this eyewear can have three modes: (1) a clear mode in which the virtual-object-display area is completely recessed into the eyewear front piece; (2) a peripheral augmented reality mode in which the virtual-object display area is located in a peripheral area of the person's field of view (e.g. upper-outer quadrant of field of view); and (3) a central augmented reality mode in which the virtual-object display area is located in the center of the person's field of view. In an example, the eyewear can be transitioned between these three modes by rotating the upper optical component. Relevant example variations which are discussed elsewhere in this disclosure or in priority-linked disclosures can also be applied to this example.

Figure 14:
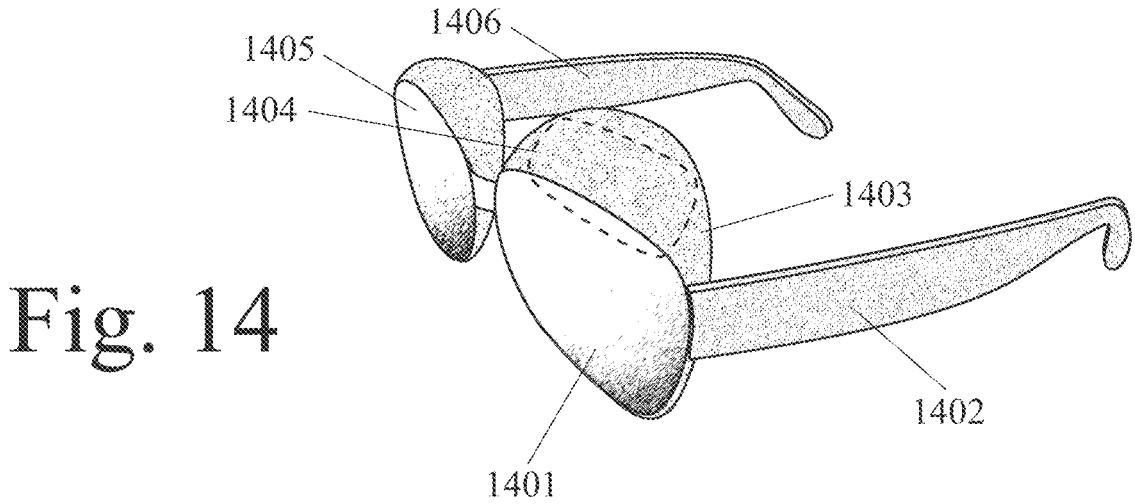
FIGS. 14 and 15 show two sequential views of eyewear with a virtual-object-display component which slides downward from a front piece rim to a location in front of a person's eye.
Figure 15:
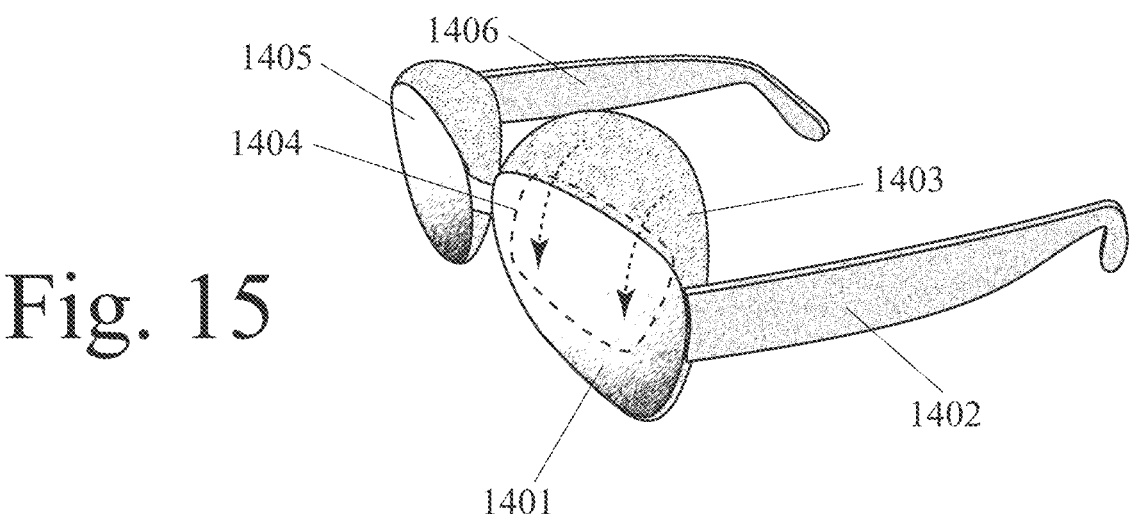

FIGS. 14 and 15 show two sequential views of another example of augmented reality eyewear which can transition between a clear-view mode and an augmented-reality mode. In this example, augmented reality eyewear is changed from a clear-view mode to an augmented-reality mode by sliding a virtual-object-display component downward from a portion (e.g. upper rim) of an eyewear front piece.

In this example, a virtual-object-display component has a first configuration wherein it is housed in a portion of an eyewear front piece (e.g. upper rim) above a person's eye. In this example, the virtual-object-display component has a second configuration wherein it is aligned with (e.g. overlaps) a see-through optical component which is in front of the person's eye. The virtual-object-display component displays a virtual object in the person's field of view when it is in its second configuration. In this example, the virtual-object-display component moves from its first configuration to its second configuration by sliding (and/or extending) downward out from a portion of the eyewear front piece (e.g. upper rim) which is above the person's eye.

FIG. 14 shows this eyewear at a first time when the virtual-object-display component is in its first configuration, recessed within a portion of the eyewear front piece which is above the person's eye. FIG. 15 shows this eyewear at a second time when the virtual-object-display component has slid downward over a portion of a see-through optical component in front of the person's eye, thereby displaying a virtual object in the center of person's field of view. This step can be reversed to transition the virtual-object-display component back from its second configuration to its first configuration.

With respect to specific components, the augmented reality eyewear in FIGS. 14 and 15 comprises: a first-side (e.g. left side) see-through optical component (e.g. lens) 1401 which is configured to be in front of a person's first-side (e.g. left) eye; a second-side (e.g. right side) see-through optical component (e.g. lens) 1405 which is configured to be in front of the person's second-side (e.g. right) eye; an eyewear front piece 1403 which holds the first-side see-through optical component and the second-side see-through optical component in front of the person's first-side eye and second-side eye, respectively; a first-side (e.g. left side) eyewear sidepiece (e.g. temple) 1402 which connects the eyewear front piece to the person's first-side (e.g. left) ear; a second-side (e.g. right side) eyewear sidepiece (e.g. temple) 1406 which connects the eyewear front piece to the person's second-side (e.g. right) ear; and a first-side (e.g. left side) virtual-object-display component 1404; wherein the virtual-object-display component has a first configuration which is not in the person's field of view and does not display a virtual object in the person's field of view, wherein the virtual-object-display component has a second configuration which is in the person's field of view and displays a virtual object in the person's field of view, and wherein the virtual-object-display component slides downward from its first configuration to its second configuration. This example only shows an augmented reality component on the left side of the eyewear for diagrammatic simplicity, but it is to be understood that there can also be a symmetric augmented reality component on the right side of the eyewear.

In an example, a virtual-object-display component can have a rectangular or rounded-rectangular perimeter. In an example, a virtual-object-display component can have a trapezoidal or rounded-trapezoidal perimeter. In an example, a virtual-object-display component can be slid manually by the person. In an example, a virtual-object-display component can be slid automatically (e.g. by an electromagnetic actuator). In an example, a virtual-object-display component can be in front of the see-through optical component in its second configuration. In an example, a virtual-object-display component can be inserted into a gap and/or opening between two pieces of a compound see-through optical component in its second configuration. Relevant example variations which are discussed elsewhere in this disclosure or in priority-linked disclosures can also be applied to this example.

Figure 16:
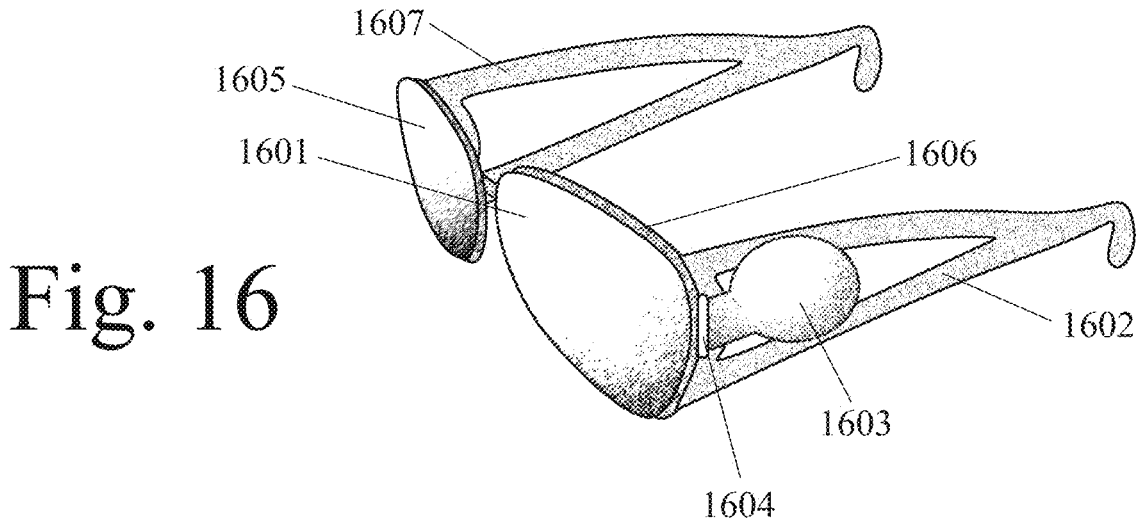
FIGS. 16 and 17 show two sequential views of eyewear with a virtual-object-display component which pivots from a location on a bifurcated sidepiece to a location in front of a person's eye.
Figure 17:
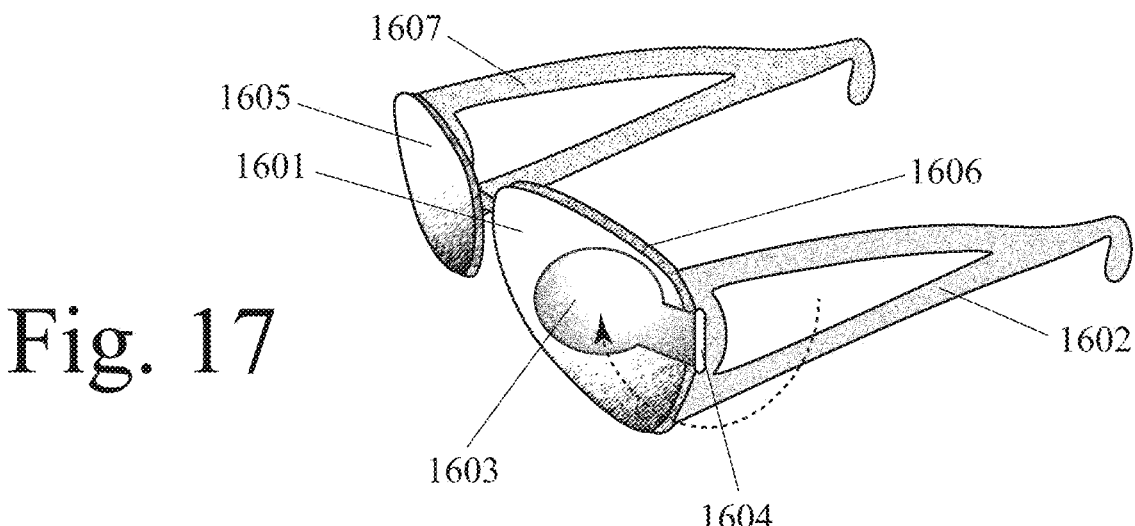

FIGS. 16 and 17 show two sequential views of another example of augmented reality eyewear which can transition between a clear-view mode and an augmented-reality mode. In this example, augmented reality eyewear is changed from a clear-view mode to an augmented-reality mode by pivoting (and/or rotating) a virtual-object-display component from a first configuration (aligned with an eyewear sidepiece) to a second configuration (aligned with a see-through optical component in front of a person's eye).

In this example, an eyewear sidepiece is bifurcated. This can help to accommodate a wider virtual-object-display component without being too bulky. In this example, a first portion (e.g. first half) of the virtual-object-display component which is closest to a hinge is narrower than a second portion (e.g. second half) of the virtual-object-display component which is farthest from the hinge. This can help to reduce disruption of the person's peripheral vision when the virtual-object-display component is moved into its second configuration.

FIG. 16 shows this eyewear at a first time when the virtual-object-display component is in its first configuration, aligned with an eyewear sidepiece. FIG. 17 shows this eyewear at a second time when the virtual-object-display component is in its second configuration, aligned with a see-through optical component in front of the person's eye. In this example, the virtual-display-object is pivoted and/or rotated from its first configuration to its second configuration. This step can be reversed to transition the virtual-object-display component back from its second configuration to its first configuration.

With respect to specific components, the augmented reality eyewear in FIGS. 16 and 17 comprises: a first-side (e.g. left side) see-through optical component (e.g. lens) 1601 which is configured to be in front of a person's first-side (e.g. left) eye; a second-side (e.g. right side) see-through optical component (e.g. lens) 1605 which is configured to be in front of the person's second-side (e.g. right) eye; an eyewear front piece 1606 which holds the first-side see-through optical component and the second-side see-through optical component in front of the person's first-side eye and second-side eye, respectively; a first-side (e.g. left side) bifurcated eyewear sidepiece (e.g. temple) 1602 which connects the eyewear front piece to the person's first-side (e.g. left) ear; a second-side (e.g. right side) bifurcated eyewear sidepiece (e.g. temple) 1607 which connects the eyewear front piece to the person's second-side (e.g. right) ear; and a first-side (e.g. left side) virtual-object-display component 1603; wherein the virtual-object-display component has a first configuration which is not in the person's field of view and does not display a virtual object in the person's field of view, wherein the virtual-object-display component has a second configuration which is in the person's field of view and displays a virtual object in the person's field of view, and wherein the virtual-object-display component slides downward from its first configuration to its second configuration. This example only shows an augmented reality component on the left side of the eyewear for diagrammatic simplicity, but it is to be understood that there can also be a symmetric augmented reality component on the right side of the eyewear.

FIGS. 16 and 17 also show a hinge (or joint) 1604 which connects the virtual-object-display component to the rest of the eyewear. The virtual-object-display pivots and/or rotates around this hinge (or joint). In an example, there can also be a symmetric virtual-object-display component on the other side (e.g. the right side) of the eyewear. In an example, a virtual-object-display component can be slid manually by the person. In an example, a virtual-object-display component can be slid automatically (e.g. by an electromagnetic actuator). In an example, a virtual-object-display component can be in front of the see-through optical component in its second configuration. Relevant example variations which are discussed elsewhere in this disclosure or in priority-linked disclosures can also be applied to this example.

Figures 18, 19, 20:
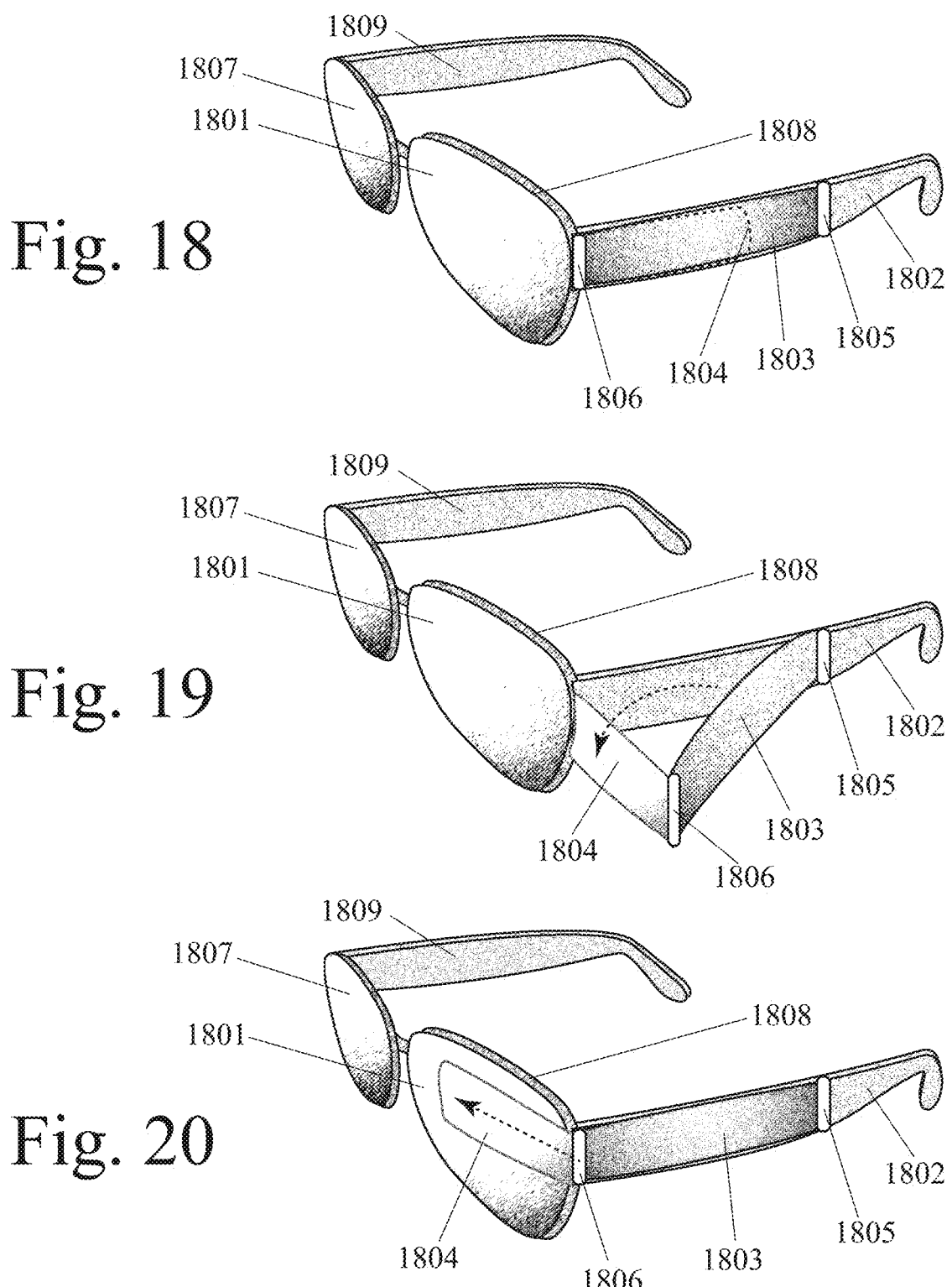
FIGS. 18 through 20 show three sequential views of eyewear with a virtual-object-display component which pivots out from a sidepiece and then slides onto a location in front of a person's eye.

FIGS. 18 through 20 show three sequential views of another example of augmented reality eyewear which can transition between a clear-view mode and an augmented-reality mode. In this example, augmented reality eyewear is changed from a clear-view mode to an augmented-reality mode by first pivoting (or rotating) and then sliding a virtual-object-display component from a first configuration (which is aligned with an eyewear sidepiece) to a second configuration (which is aligned with a see-through optical component, such as a lens, in front of the person's eye).

In this example, augmented reality eyewear also includes a flexible strip which moves (e.g. pivots and/or bends) outward from an eyewear sidepiece. This strip is connected to one end of the virtual-object-display component. This flexible strip helps to prevent the virtual-object-display component from being accidentally hit and snapped off while it extends outward from the eyewear sidepiece. This example only shows an augmented reality component on the left side of the eyewear for diagrammatic simplicity, but it is to be understood that there can also be a symmetric augmented reality component on the right side of the eyewear.

FIG. 18 shows this eyewear at a first time when the virtual-object-display component is in its first configuration, aligned with the eyewear sidepiece. FIG. 19 shows this eyewear at a second time when the virtual-object-display component has moved (e.g. pivoted and/or bent) outward from the sidepiece and the flexible strip has moved outward from the sidepiece. The flexible strip protects the sidepiece from possibly being hit and snapped off at this time. FIG. 20 shows this eyewear at a third time when the virtual-object-display component has slid into its second configuration, aligned with a see-through optical component in front of the person's eye. These steps can be reversed to transition the virtual-object-display component back from its second configuration to its first configuration.

With respect to specific components, the augmented reality eyewear in FIGS. 18 through 20 comprises: a first-side (e.g. left side) see-through optical component (e.g. lens) 1801 which is configured to be in front of a person's first-side (e.g. left) eye; a second-side (e.g. right side) see-through optical component (e.g. lens) 1807 which is configured to be in front of the person's second-side (e.g. right) eye; an eyewear front piece 1808 which holds the first-side see-through optical component and the second-side see-through optical component in front of the person's first-side eye and second-side eye, respectively; a first-side (e.g. left side) eyewear sidepiece (e.g. temple) 1802 which connects the eyewear front piece to the person's first-side (e.g. left) ear; a second-side (e.g. right side) eyewear sidepiece (e.g. temple) 1809 which connects the eyewear front piece to the person's second-side (e.g. right) ear; a first-side (e.g. left side) virtual-object-display component (e.g. light reflector, light refractor, waveguide, and/or array of light emitters) 1804 which displays a virtual object in the person's field of view; and a first-side (e.g. left side) flexible strip 1803 which is connected to the first-side eyewear sidepiece by a first hinge 1805 and connected to the first-side virtual-object-display component by a second hinge 1806; wherein the first-side virtual-object-display component has a first configuration along (e.g. aligned with, parallel to, recessed into, and/or inserted into) the first-side eyewear sidepiece and the first-side virtual-object-display component does not display a virtual object in the person's field of view; and wherein the first-side virtual-object-display component has a second configuration along (e.g. aligned with, parallel to, recessed into, and/or inserted into) the first-side see-through optical component and the first-side virtual-object-display component displays a virtual object in the person's field of view.

This design and method for moving a virtual-object-display component from a first configuration (aligned with an eyewear sidepiece) to a second configuration (aligned with a see-through optical component) has some advantages. For example, with this design and method, the virtual-object-display component can slide laterally into a gap and/or opening between two pieces in a compound see-through optical component, instead of pivoting to a location in front of the see-through optical component. This can help to hold the virtual-object-display securely in place in its second configuration and also protect it from being hit or scratched in its second configuration. Relevant example variations which are discussed elsewhere in this disclosure or in priority-linked disclosures can also be applied to this example.

Figure 21:
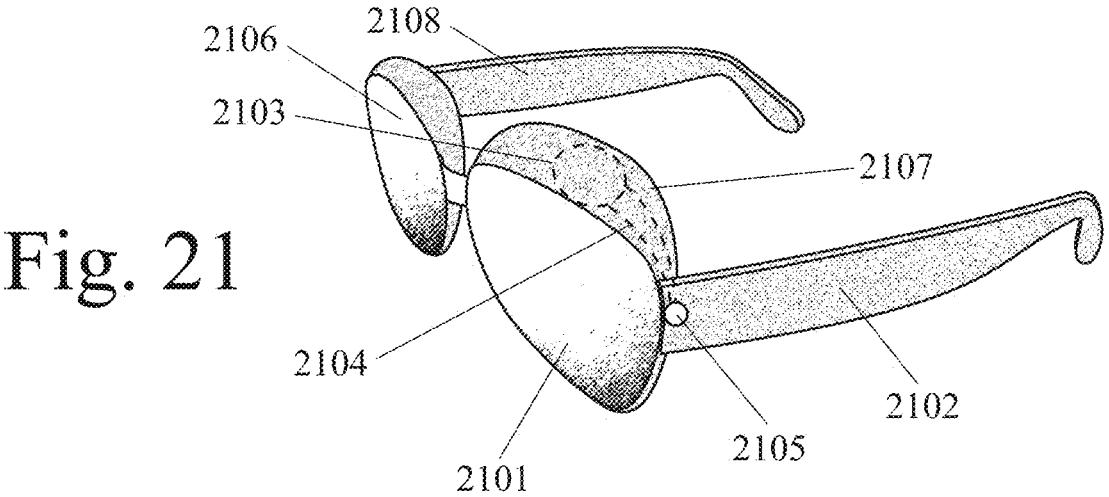
FIGS. 21 and 22 show two sequential views of a first example of eyewear with a virtual-object-display component which pivots down from a front piece rim to a location in front of a person's eye.
Figure 22:
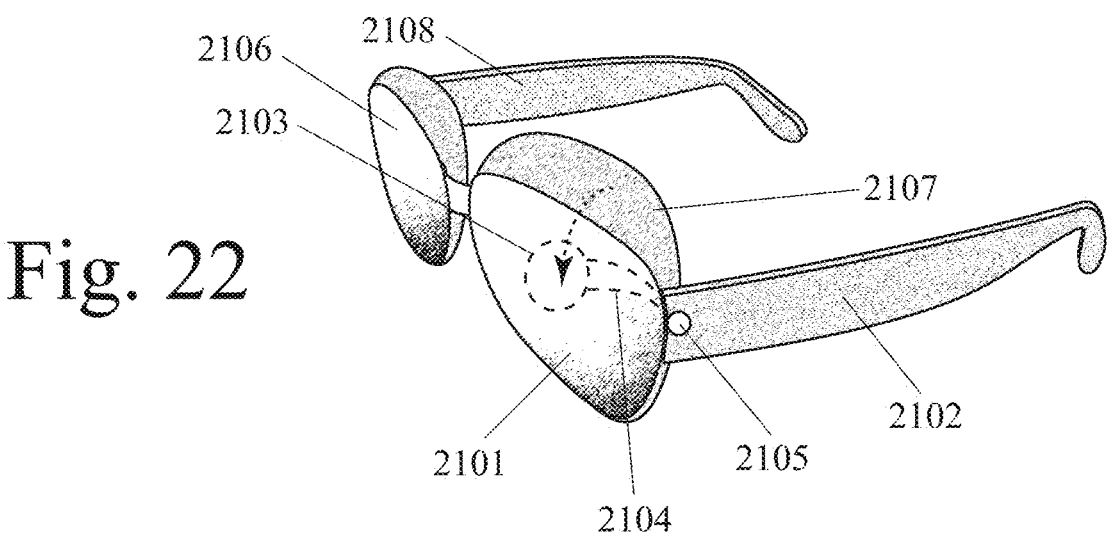

FIGS. 21 and 22 show two sequential views of another example of augmented reality eyewear which can transition between a clear-view mode and an augmented-reality mode. In this example, augmented reality eyewear is changed from a clear-view mode to an augmented-reality mode by pivoting a virtual-object-display component downward from a portion (e.g. upper rim) of an eyewear front piece.

In this example, a virtual-object-display component has a first configuration wherein it is housed in (or on) a portion of an eyewear front piece (e.g. upper rim) above a person's eye. In this example, the virtual-object-display component has a second configuration wherein it is aligned with (e.g. overlaps) a see-through optical component which is in front of the person's eye. The virtual-object-display component displays a virtual object in the person's field of view when it is in its second configuration. In this example, the virtual-object-display component moves from its first configuration to its second configuration by pivoting downward, out from a portion of the eyewear front piece (e.g. upper rim) which is above the person's eye.

FIG. 21 shows this eyewear at a first time when the virtual-object-display component is in its first configuration, recessed within a portion of the eyewear front piece which is above the person's eye. FIG. 22 shows this eyewear at a second time when the virtual-object-display component has pivoted downward over a portion of a see-through optical component in front of the person's eye, thereby displaying a virtual object in the center of person's field of view. This step can be reversed to transition the virtual-object-display component back from its second configuration to its first configuration.

With respect to specific components, the augmented reality eyewear in FIGS. 21 and 22 comprises: a first-side (e.g. left side) see-through optical component (e.g. lens) 2101 which is configured to be in front of a person's first-side (e.g. left) eye; a second-side (e.g. right side) see-through optical component (e.g. lens) 2106 which is configured to be in front of the person's second-side (e.g. right) eye; an eyewear front piece 2107 which holds the first-side see-through optical component and the second-side see-through optical component in front of the person's first-side eye and second-side eye, respectively; a first-side (e.g. left side) eyewear sidepiece (e.g. temple) 2102 which connects the eyewear front piece to the person's first-side (e.g. left) ear; a second-side (e.g. right side) eyewear sidepiece (e.g. temple) 2108 which connects the eyewear front piece to the person's second-side (e.g. right) ear; an axle (or hinge) 2105; a first-side (e.g. left side) virtual-object-display component 2103; and a stem 2104 which connects the first-side virtual-object-display component to the axle (or hinge); wherein the virtual-object-display component has a first configuration which is not in the person's field of view and does not display a virtual object in the person's field of view, wherein the virtual-object-display component has a second configuration which is in the person's field of view and displays a virtual object in the person's field of view, and wherein the virtual-object-display component pivots downward around the axle (or hinge) from its first configuration to its second configuration. This example only shows an augmented reality component on the left side of the eyewear for diagrammatic simplicity, but it is to be understood that there can also be a symmetric augmented reality component on the right side of the eyewear.

In an example, an axle (or hinge) around which a virtual-object-display component pivots can be to one side (e.g. right or left) of a see-through optical component. In this example, the axle (or hinge) is on the side of a see-through optical component which is farthest from the center of the eyewear front piece. In an example, a virtual-object-display component can be housed (e.g. recessed) in a portion of an eyewear front piece (e.g. an upper rim) which is above a person's eye when the virtual-object-display component is in its first configuration. In an example, a virtual-object-display component can be in the center of a person's field of view in its second configuration. In an example, a virtual-object-display component can have a convex (e.g. circular or elliptical) perimeter. In a stem which connects a virtual-object-display component to an axle (or hinger) can be transparent and narrower than the virtual-object-display component.

In an example, a virtual-object-display component can be pivoted manually by the person. In an example, a virtual-object-display component can be pivoted automatically (e.g. by an electromagnetic actuator). In an example, a virtual-object-display component can be in front of the see-through optical component in its second configuration. In an example, a virtual-object-display component can be inserted into a gap and/or opening between two pieces of a compound see-through optical component in its second configuration. Relevant example variations which are discussed elsewhere in this disclosure or in priority-linked disclosures can also be applied to this example.

Figures 23, 24, 25:
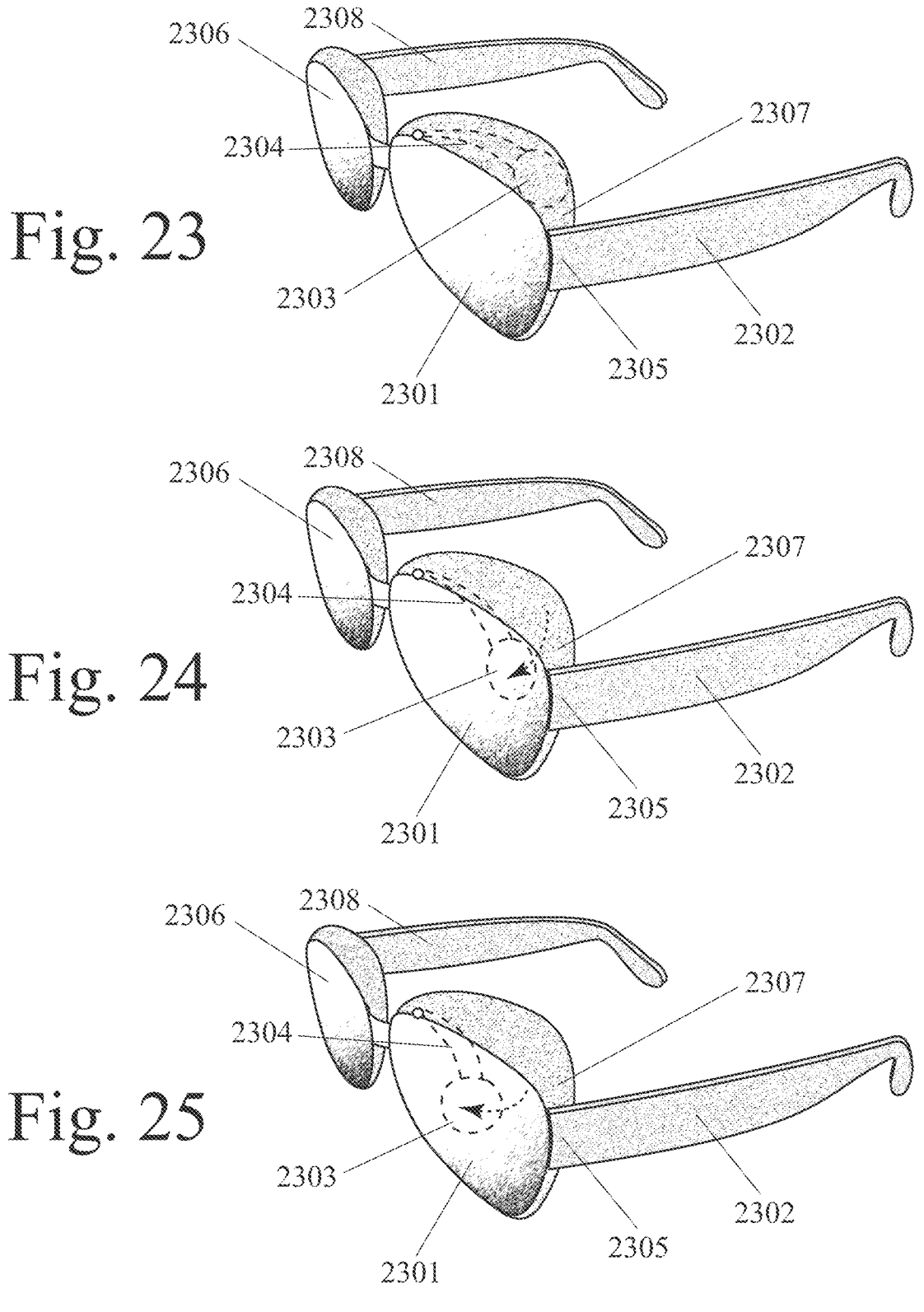
FIGS. 23 and 25 show three sequential views of a second example of eyewear with a virtual-object-display component which pivots down from a front piece rim to a location in front of a person's eye.

FIGS. 23 through 25 show three sequential views of another example of augmented reality eyewear which can transition between a clear-view mode and an augmented-reality mode. In this example, augmented reality eyewear is changed from a clear-view mode to an augmented-reality mode by pivoting a virtual-object-display component downward from a portion (e.g. upper rim) of an eyewear front piece.

In this example, a virtual-object-display component has a first configuration wherein it is housed in (or on) a portion of an eyewear front piece (e.g. upper rim) above a person's eye. In this example, the virtual-object-display component has a second configuration wherein it is aligned with (e.g. overlaps) a see-through optical component which is in front of the person's eye. The virtual-object-display component displays a virtual object in the person's field of view when it is in its second configuration. In this example, the virtual-object-display component moves from its first configuration to its second configuration by pivoting downward, out from a portion of the eyewear front piece (e.g. upper rim) which is above the person's eye.

FIG. 23 shows this eyewear at a first time when the virtual-object-display component is recessed within a portion of the eyewear front piece (e.g. upper rim) which is above the person's eye. FIG. 24 shows this eyewear at a second time when the virtual-object-display component has been pivoted downward into a peripheral area (e.g. upper outer quadrant) of the person's field of view. FIG. 25 shows this eyewear at a third time when the virtual-object-display component has been further pivoted into the center of the person's field of view. These steps can be reversed to transition the virtual-object-display component back from its second configuration to its first configuration.

In an example, this eyewear can have three modes: (1) a clear mode in which the virtual-object-display area is completely recessed into the eyewear front piece; (2) a peripheral augmented reality mode in which the virtual-object display area is located in a peripheral area of the person's field of view (e.g. upper-outer quadrant of field of view); and (3) a central augmented reality mode in which the virtual-object display area is located in the center of the person's field of view. In an example, the eyewear can be transitioned between these three modes by pivoting the virtual-object-display around an axle (or hinge).

With respect to specific components, the augmented reality eyewear in FIGS. 23 through 25 comprises: a first-side (e.g. left side) see-through optical component (e.g. lens) 2301 which is configured to be in front of a person's first-side (e.g. left) eye; a second-side (e.g. right side) see-through optical component (e.g. lens) 2306 which is configured to be in front of the person's second-side (e.g. right) eye; an eyewear front piece 2307 which holds the first-side see-through optical component and the second-side see-through optical component in front of the person's first-side eye and second-side eye, respectively; a first-side (e.g. left side) eyewear sidepiece (e.g. temple) 2302 which connects the eyewear front piece to the person's first-side (e.g. left) ear; a second-side (e.g. right side) eyewear sidepiece (e.g. temple) 2308 which connects the eyewear front piece to the person's second-side (e.g. right) ear; an axle (or hinge) 2305; a first-side (e.g. left side) virtual-object-display component 2303; and a stem 2304 which connects the first-side virtual-object-display component to the axle (or hinge); wherein the virtual-object-display component has a first configuration which is not in the person's field of view and does not display a virtual object in the person's field of view, wherein the virtual-object-display component has a second configuration which is in the person's field of view and displays a virtual object in the person's field of view, and wherein the virtual-object-display component pivots downward around the axle (or hinge) from its first configuration to its second configuration. This example only shows an augmented reality component on the left side of the eyewear for diagrammatic simplicity, but it is to be understood that there can also be a symmetric augmented reality component on the right side of the eyewear.

In an example, an axle (or hinge) around which a virtual-object-display component pivots can be to one side (e.g. right or left) of a see-through optical component. In this example, the axle (or hinge) is on the side of a see-through optical component which is closest to the center of the eyewear front piece. In an example, a virtual-object-display component can be housed (e.g. recessed) in a portion of an eyewear front piece (e.g. an upper rim) which is above a person's eye when the virtual-object-display component is in its first configuration. In an example, a virtual-object-display component can be in the periphery or in the center of a person's field of view in its second configuration. In an example, a virtual-object-display component can have a convex (e.g. circular or elliptical) perimeter. In a stem which connects a virtual-object-display component to an axle (or hinger) can be transparent and narrower than the virtual-object-display component.

In an example, a virtual-object-display component can be pivoted manually by the person. In an example, a virtual-object-display component can be pivoted automatically (e.g. by an electromagnetic actuator). In an example, a virtual-object-display component can be in front of the see-through optical component in its second configuration. In an example, a virtual-object-display component can be inserted into a gap and/or opening between two pieces of a compound see-through optical component in its second configuration. Relevant example variations which are discussed elsewhere in this disclosure or in priority-linked disclosures can also be applied to this example.

Figure 26:
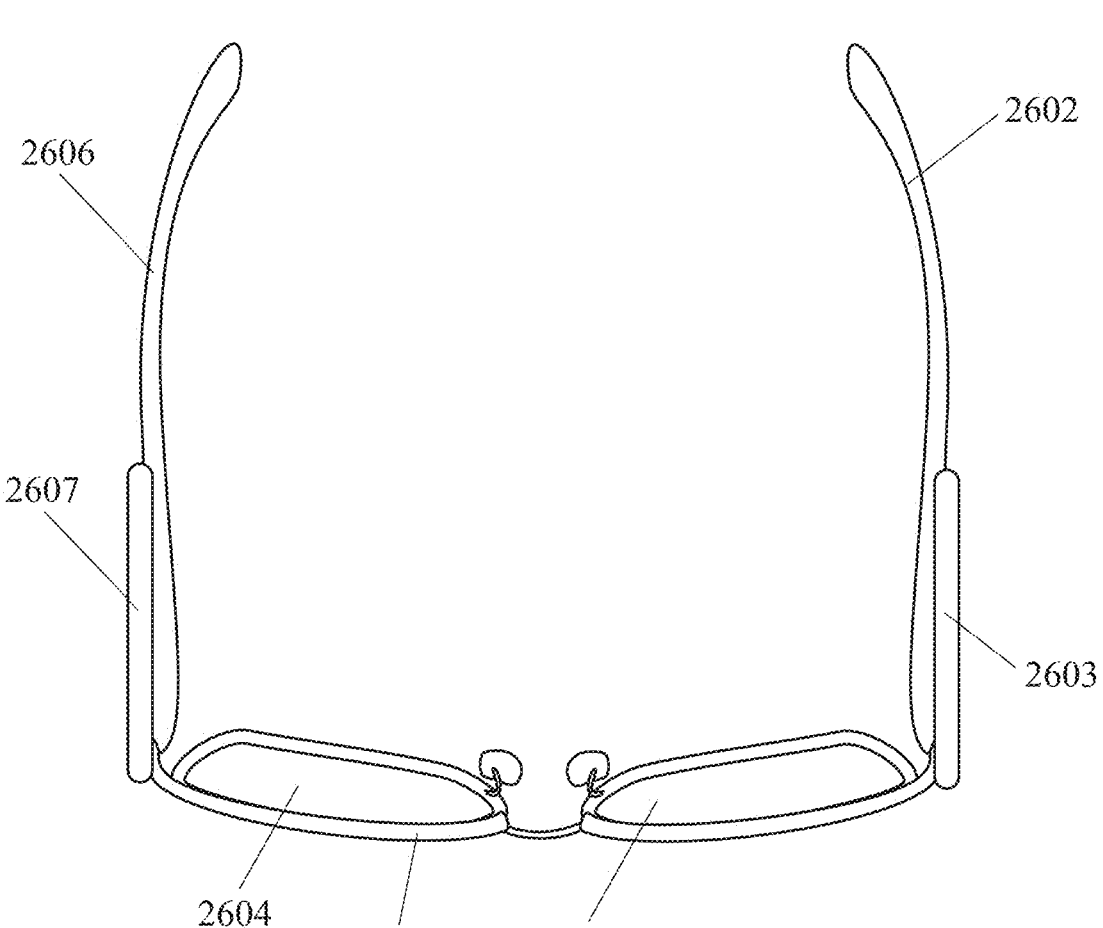
FIGS. 26 and 27 show two sequential views of eyewear with bilateral virtual-object-display components which pivot from locations on sidepieces to locations in front of a person's eyes.
Figure 26:
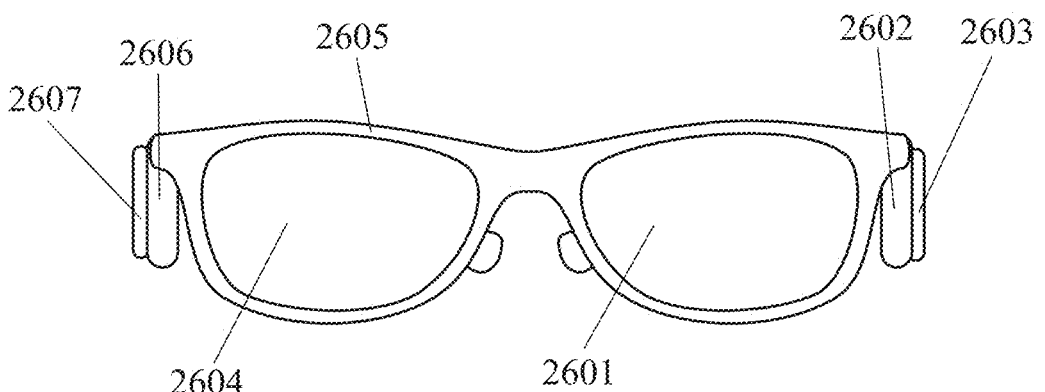
Figure 27:
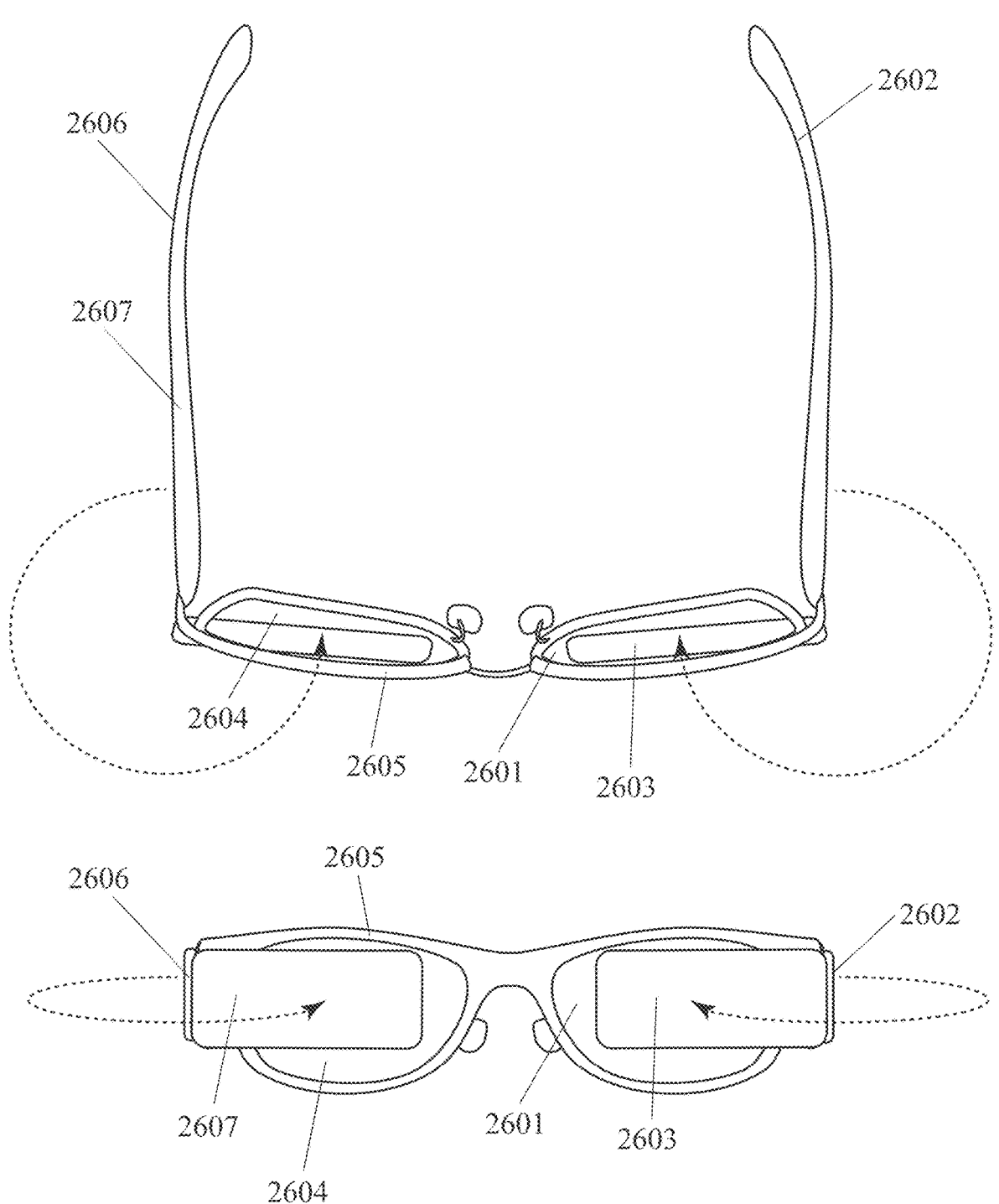

FIGS. 26 and 27 show two sequential views of an example of augmented reality eyewear which can transition between a clear-view mode and an augmented-reality mode. When the eyewear is in the augmented-reality mode, the person sees virtual objects displayed in their field of view. When the eyewear is in the clear-view mode, the person does not see virtual objects, but does see their environment without distortion and/or limitation of their field of view. Such eyewear can be better than augmented reality eyewear which distorts and/or limits a person's field of view of their environment when the person is not using the augmented reality function of their eyewear. This design is especially advantageous at times when a clear view of a person's environment is critical for the person's safety and/or activity.

In this example, augmented reality eyewear is changed from a clear-view mode to an augmented-reality mode by pivoting and/or rotating a virtual-object-display component from a first configuration (which is aligned with an eyewear sidepiece) to a second configuration (which is aligned with a see-through optical component, such as a lens, in front of the person's eye).

FIG. 26 shows this eyewear at a first time when the virtual-object-display component is in its first configuration (e.g. aligned with the eyewear sidepiece). The upper portion of FIG. 26 shows this eyewear at this time from a top-down perspective. The lower portion of FIG. 26 shows this eyewear at this time from a frontal perspective. FIG. 27 shows this eyewear at a second time after the virtual-object-display component has been pivoted and/or rotated into in its second configuration (e.g. aligned with a see-through optical component in front of the person's eye). The upper portion of FIG. 27 shows this eyewear at this time from a top-down perspective. The lower portion of FIG. 27 shows this eyewear at this time from a frontal perspective. This pivoting can be reversed to transition the virtual-object-display component back from its second configuration to its first configuration.

With respect to specific components, the augmented reality eyewear in FIGS. 26 and 27 comprises: a first-side (e.g. left side) see-through optical component (e.g. lens) 2601 which is configured to be in front of a person's first-side (e.g.

left) eye; a second-side (e.g. right side) see-through optical component (e.g. lens) 2604 which is configured to be in front of the person's second-side (e.g. right) eye; an eyewear front piece 2605 which holds the first-side see-through optical component and the second-side see-through optical component in front of the person's first-side eye and second-side eye, respectively; a first-side (e.g. left side) eyewear sidepiece (e.g. temple) 2602 which connects the eyewear front piece to the person's first-side (e.g. left) ear; a second-side (e.g. right side) eyewear sidepiece (e.g. temple) 2606 which connects the eyewear front piece to the person's second-side (e.g. right) ear; a first-side (e.g. left side) virtual-object-display component (e.g. light reflector, light refractor, waveguide, and/or array of light emitters) 2603 which displays a virtual object in the person's field of view; and a second-side (e.g. right side) virtual-object-display component (e.g. light reflector, light refractor, waveguide, and/or array of light emitters) 2607 which displays a virtual object in the person's field of view; and wherein the first-side virtual-object-display component has a first configuration along (e.g. aligned with, parallel to, recessed into, and/or inserted into) the first-side eyewear sidepiece and the first-side virtual-object-display component does not display a virtual object in the person's field of view; and wherein the first-side virtual-object-display component has a second configuration along (e.g. aligned with, parallel to, recessed into, and/or inserted into) the first-side see-through optical component and the first-side virtual-object-display component displays a virtual object in the person's field of view. Relevant example variations which are discussed elsewhere in this disclosure or in priority-linked disclosures can also be applied to this example.

FIGS. 28 through 31 show four sequential views of another example of augmented reality eyewear which can transition between a clear-view mode and an augmented-reality mode. In this example, augmented reality eyewear is changed from a clear-view mode to an augmented-reality mode by first pivoting (or rotating) and then sliding a virtual-object-display component from a first configuration (which is aligned with an eyewear sidepiece) to a second configuration (which is aligned with a see-through optical component, such as a lens, in front of the person's eye). In this example, the virtual-object-display component is protected by a sheath (or housing) when it extends outward from the eyewear during transition between its first and second configurations.

Figure 28:
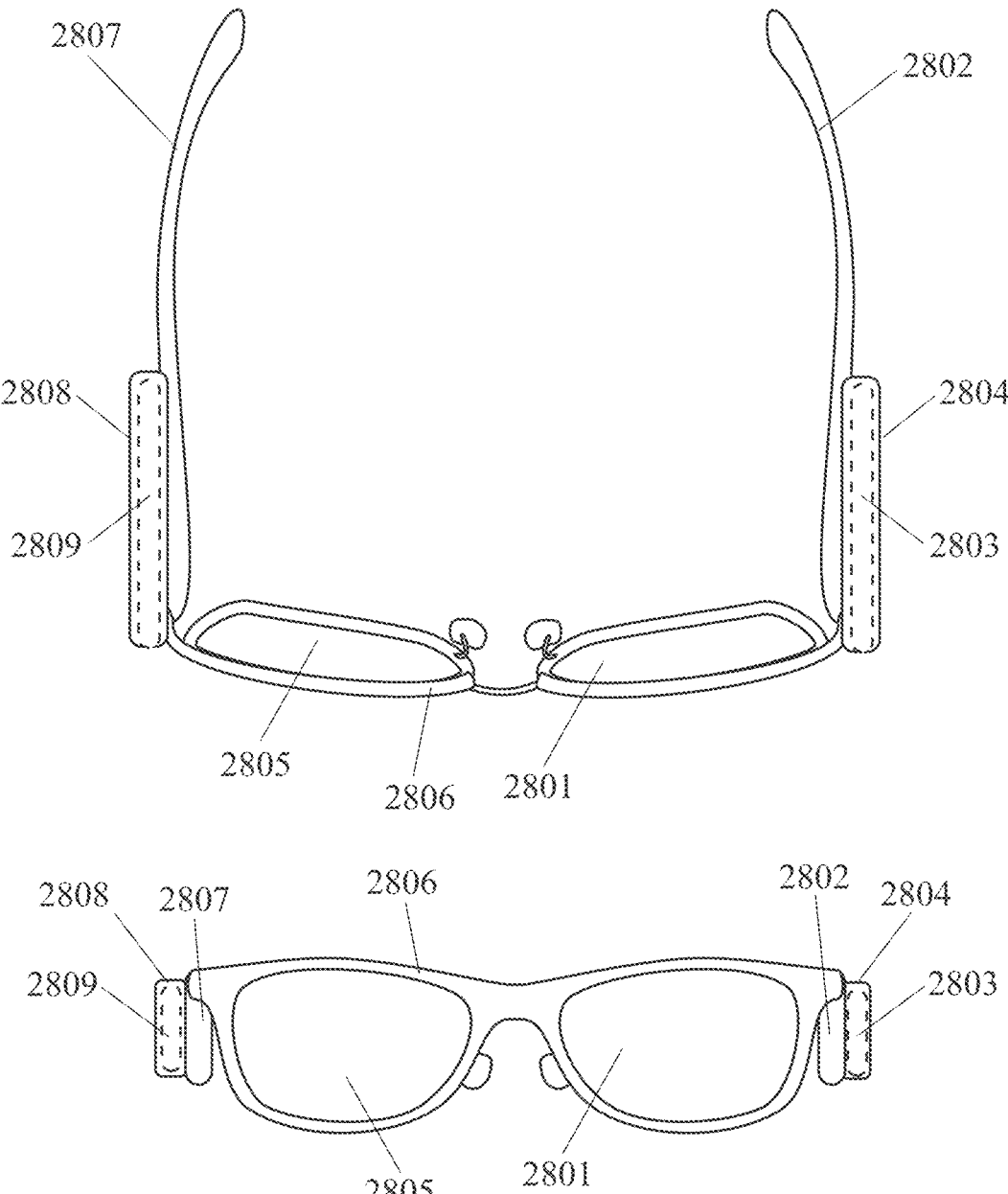
FIGS. 28 through 31 show four sequential views of eyewear with bilateral virtual-object-display components in sheaths, wherein the sheaths pivot and the virtual-object-display components slide out to locations in front of a person's eyes.

FIG. 28 shows this eyewear at a first time when a virtual-object-display component is in its first configuration in a sheath (or housing) which is aligned with the eyewear sidepiece. The upper portion of FIG. 28 shows this eyewear at this time from a top-down perspective. The lower portion of FIG. 28 shows this eyewear at this time from a frontal perspective.

Figure 29:
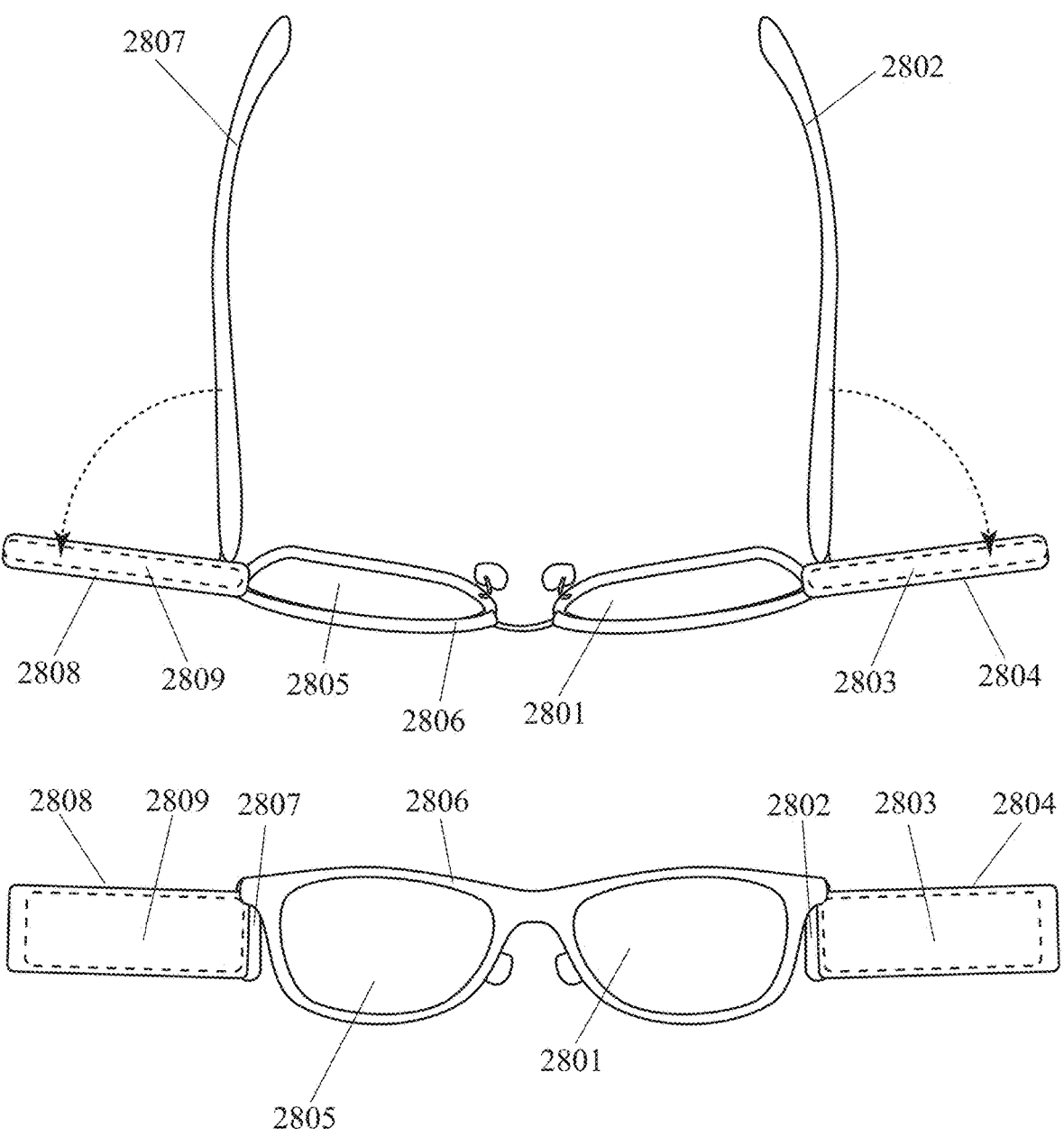

FIG. 29 shows this eyewear at a second time when the sheath (or housing) and the virtual-object-display component have pivoted outward from the sidepiece and now extend out (e.g. perpendicularly) from the sidepiece. The upper portion of FIG. 29 shows this eyewear at this time from a top-down perspective. The lower portion of FIG. 29 shows this eyewear at this time from a frontal perspective.

Figure 30:
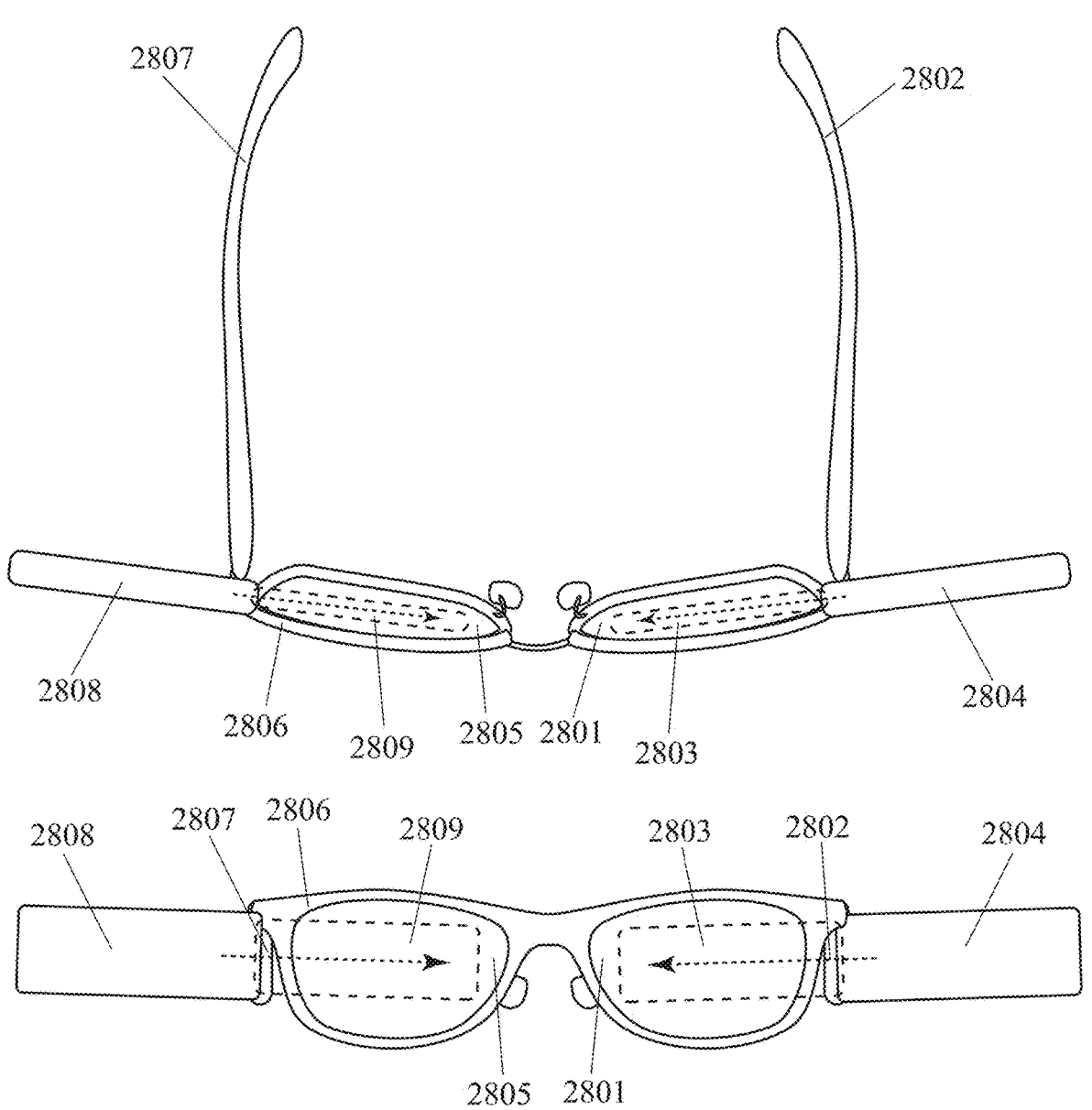

FIG. 30 shows this eyewear at a third time when the virtual-object-display component has slid out from the sheath (or housing) into its second configuration which is aligned with a see-through optical component in front of the person's eye. The upper portion of FIG. 30 shows this eyewear at this time from a top-down perspective. The lower portion of FIG. 30 shows this eyewear at this time from a frontal perspective.

Figure 31:
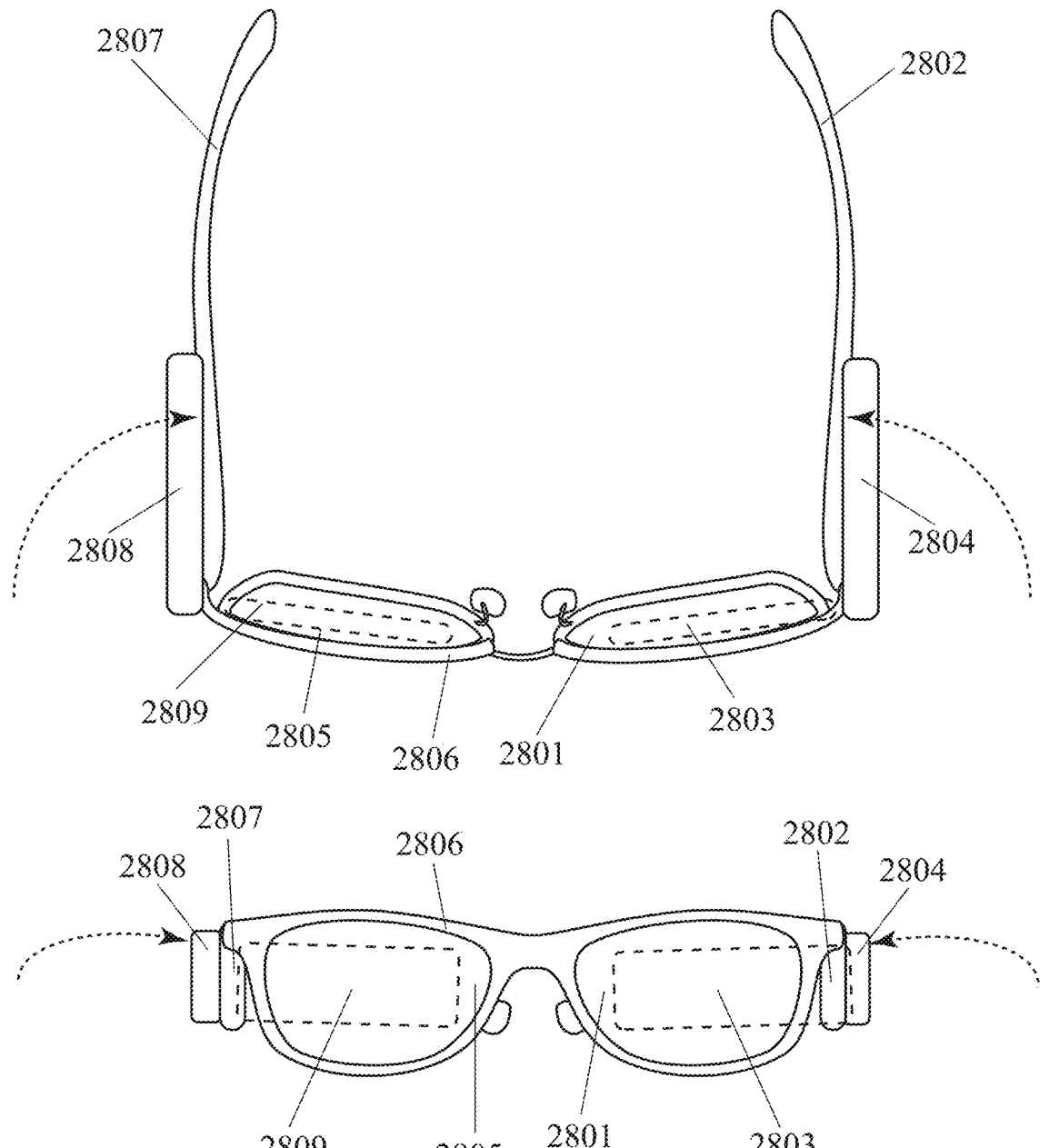

FIG. 31 shows this eyewear at a fourth time when the sheath (or housing) has been pivoted back to alignment with the eyewear sidepiece. The upper portion of FIG. 31 shows this eyewear at this time from a top-down perspective. The lower portion of FIG. 31 shows this eyewear at this time from a frontal perspective. These steps can be reversed to transition the virtual-object-display component back from its second configuration to its first configuration.

With respect to specific components, the augmented reality eyewear in FIGS. 28 through 31 comprises: a first-side (e.g. left side) see-through optical component (e.g. lens) 2801 which is configured to be in front of a person's first-side (e.g. left) eye; a second-side (e.g. right side) see-through optical component (e.g. lens) 2805 which is configured to be in front of the person's second-side (e.g. right) eye; an eyewear front piece 2806 which holds the first-side see-through optical component and the second-side see-through optical component in front of the person's first-side eye and second-side eye, respectively; a first-side (e.g. left side) eyewear sidepiece (e.g. temple) 2802 which connects the eyewear front piece to the person's first-side (e.g. left) ear; a second-side (e.g. right side) eyewear sidepiece (e.g. temple) 2807 which connects the eyewear front piece to the person's second-side (e.g. right) car; a first-side (e.g. left side) virtual-object-display component (e.g. light reflector, light refractor, waveguide, and/or array of light emitters) 2803 which displays a virtual object in the person's field of view; a second-side (e.g. right side) virtual-object-display component (e.g. light reflector, light refractor, waveguide, and/or array of light emitters) 2809 which displays a virtual object in the person's field of view; a first-side (e.g. left side) sheath (or housing) 2804 which can house the first-side virtual-object-display component and which slides longitudinally along the first-side sidepiece; and a second-side (e.g. right side) sheath (or housing) 2808 which can house the second-side virtual-object-display component and which slides longitudinally along the second-side sidepiece; wherein the first-side virtual-object-display component has a first configuration in the sheath (or housing) along (e.g. aligned with, parallel to, recessed into, and/or inserted into) the first-side eyewear sidepiece and the first-side virtual-object-display component does not display a virtual object in the person's field of view; wherein the first-side virtual-object-display component has a second configuration out of the sheath (or housing) along (e.g. aligned with, parallel to, recessed into, and/or inserted into) the first-side see-through optical component and the first-side virtual-object-display component displays a virtual object in the person's field of view; wherein the second-side virtual-object-display component has a second configuration in the sheath (or housing) along (e.g. aligned with, parallel to, recessed into, and/or inserted into) the second-side eyewear sidepiece and the second-side virtual-object-display component does not display a virtual object in the person's field of view; and wherein the second-side virtual-object-display component has a second configuration out of the sheath (or housing) along (e.g. aligned with, parallel to, recessed into, and/or inserted into) the second-side see-through optical component and the second-side virtual-object-display component displays a virtual object in the person's field of view.

This design and method for moving virtual-object-display components from first configurations (aligned with an eyewear sidepiece) to second configurations (aligned with a see-through optical component) has a potential advantage over previous ones. With this design and method, virtual-object-display components can slide laterally into a gap and/or opening between two pieces in compound see-through optical components, instead of pivoting to locations in front of the see-through optical components. This can help to hold the virtual-object-displays securely in place in their second configurations and also protect them from being hit or scratched in their second configurations. Relevant example variations which are discussed elsewhere in this disclosure or in priority-linked disclosures can also be applied to this example.

Figure 32:
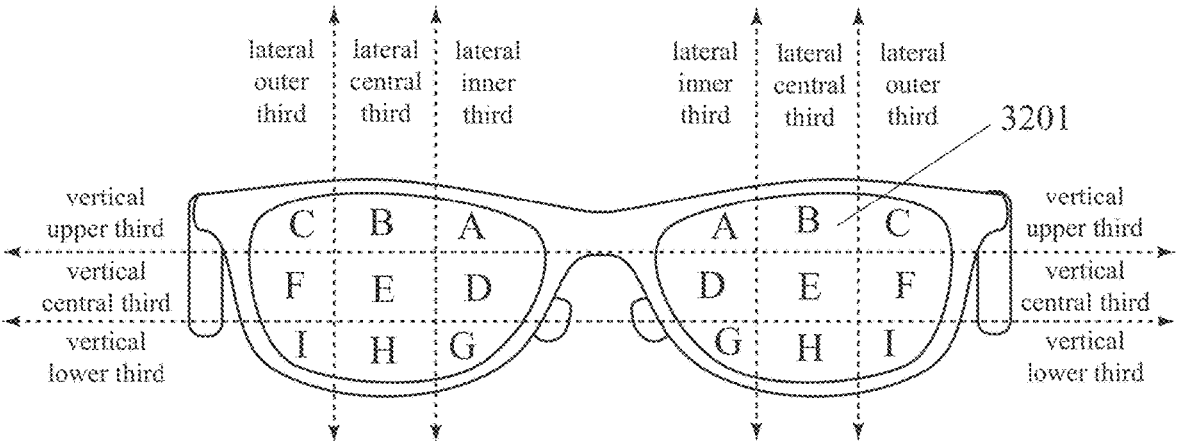
FIG. 32 shows how a see-through optical component in front of a person's eyes can be conceptually divided into sections, wherein these sections can be used for more-precise specification the location of a virtual-object-display component.

As shown in FIG. 32, a see-through optical component (e.g. lens) in front of a person's eye can be conceptually divided into different areas. In an example, as shown in FIG. 32, the lateral width of a see-though optical component 3210 can be divided into thirds: a lateral inner third (closest to the person's nose); a lateral outer third (farthest from the person's nose); and a lateral central third (between the inner and outer thirds). As also shown in FIG. 32, the vertical width of a see-though optical component can be divided into thirds: a vertical central third (closest to the center of the component); a vertical lower third (below the central third); and a vertical upper third (above the central third). As also shown in FIG. 32, combining these lateral and vertical divisions defines nine sections ("A" through "I") of the see-through optical component, wherein section "E" is the most-central section. These nine sections can be symmetric for see-through optical components on opposite sides (e.g. right vs. left) of eyewear.

In an example, a virtual-object-display component can span (e.g. overlap and/or be in front of) a subset of the nine sections of a see-through optical component, when the virtual-object-display component is in its second configuration. In an example, a virtual-object-display component can span (e.g. overlap and/or be in front of) sections "E" and "F" of a see-through optical component, when the virtual-object-display component is in its second configuration. In an example, a virtual-object-display component can span (e.g. overlap and/or be in front of) sections "D", "E", and "F" of a see-through optical component, when the virtual-object-display component is in its second configuration.

In an example, a virtual-object-display component can span (e.g. overlap and/or be in front of) sections "A", "B", "C", "D", "E", and "F" of a see-through optical component, when the virtual-object-display component is in its second configuration. In an example, a virtual-object-display component can span (e.g. overlap and/or be in front of) only section "E" of a see-through optical component, when the virtual-object-display component is in its second configuration. In an example, a virtual-object-display component can span (e.g. overlap and/or be in front of) sections "C", "F", and "I" of a see-through optical component, when the virtual-object-display component is in its second configuration.

In an example, a virtual-object-display component can span (e.g. overlap and/or be in front of) sections "C" and "F" of a see-through optical component, when the virtual-object-display component is in its second configuration. In an example, a virtual-object-display component can span (e.g. overlap and/or be in front of) all nine sections of a see-through optical component, when the virtual-object-display component is in its second configuration.

Figures 33, 34:
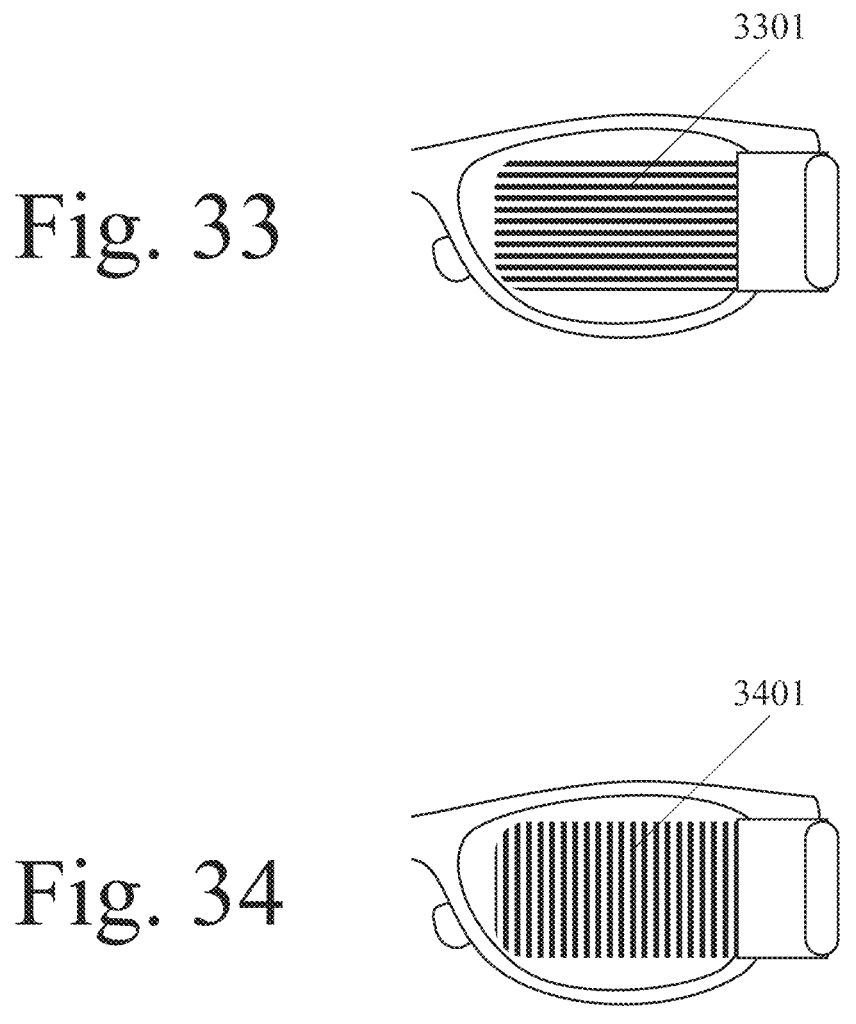

FIG. 33 shows an example of a virtual-object-display component 3301 with a horizontal parallel array of optical (e.g. reflective and/or refractive) elements. In an example, a virtual-object-display component can comprise a horizontal parallel array of (partially) reflective optical elements. In an example, a virtual-object-display component can comprise a horizontal parallel array of refractive optical elements. In an example, a virtual-object-display component with a horizontal parallel array of optical elements can comprise a diffraction grating. In an example, a virtual-object-display component with a horizontal parallel array of optical elements can comprise a Bragg grating. In an example, a virtual-object-display component with a horizontal parallel array of optical elements can comprise a lenticular pattern.

In an example, a virtual-object-display component with a horizontal parallel array of optical elements can be used in combination with a light emitter (or array of light emitters) located in a portion of an eyewear front piece (e.g. upper rim) which is above a person's eye to display a virtual object in the person's field of view. In an example, a virtual-object-display component with a horizontal parallel array of optical elements can be used in combination with a light emitter (or array of light emitters) located in a portion of an eyewear front piece (e.g. lower rim) which is below the person's eye to display a virtual object in the person's field of view.

In an example, a virtual-object-display component with a horizontal parallel array of optical elements can reflect and/or refract light from a light emitter (or array of light emitters) located in a portion of an eyewear front piece (e.g. upper rim) which is above a person's eye to display a virtual object in the person's field of view. In an example, a virtual-object-display component with a horizontal parallel array of optical elements can reflect and/or refract light from a light emitter (or array of light emitters) located in a portion of an eyewear front piece (e.g. lower rim) which is below the person's eye to display a virtual object in the person's field of view. Relevant example variations which are discussed elsewhere in this disclosure or in priority-linked disclosures can also be applied to this example.

FIG. 34 shows an example of a virtual-object-display component 3401 with a vertical parallel array of optical (e.g. reflective and/or refractive) elements. In an example, a virtual-object-display component can comprise a vertical parallel array of (partially) reflective optical elements. In an example, a virtual-object-display component can comprise a vertical parallel array of refractive optical elements. In an example, a virtual-object-display component with a vertical parallel array of optical elements can comprise a diffraction grating. In an example, a virtual-object-display component with a vertical parallel array of optical elements can comprise a Bragg grating. In an example, a person with glasses having an array of optical elements with varying inter-element distances can Bragg that it is really grate. In an example, a virtual-object-display component with a vertical parallel array of optical elements can comprise a lenticular pattern.

In an example, a virtual-object-display component with a vertical parallel array of optical elements can be used in combination with a light emitter (or array of light emitters) located in a portion of an eyewear front piece (e.g. right side rim) which is to the right of a person's eye to display a virtual object in the person's field of view. In an example, a virtual-object-display component with a vertical parallel array of optical elements can be used in combination with a light emitter (or array of light emitters) located in a portion of an eyewear front piece (e.g. left-side rim) which is to the left of the person's eye to display a virtual object in the person's field of view.

In an example, a virtual-object-display component with a vertical parallel array of optical elements can reflect and/or refract light from a light emitter (or array of light emitters) located in a portion of an eyewear front piece (e.g. right-side rim) which is to the right of a person's eye to display a virtual object in the person's field of view. In an example, a virtual-object-display component with a vertical parallel array of optical elements can reflect and/or refract light from a light emitter (or array of light emitters) located in a portion of an eyewear front piece (e.g. left-side rim) which is to the left of the person's eye to display a virtual object in the person's field of view. Relevant example variations which are discussed elsewhere in this disclosure or in priority-linked disclosures can also be applied to this example.

Figures 35, 36:
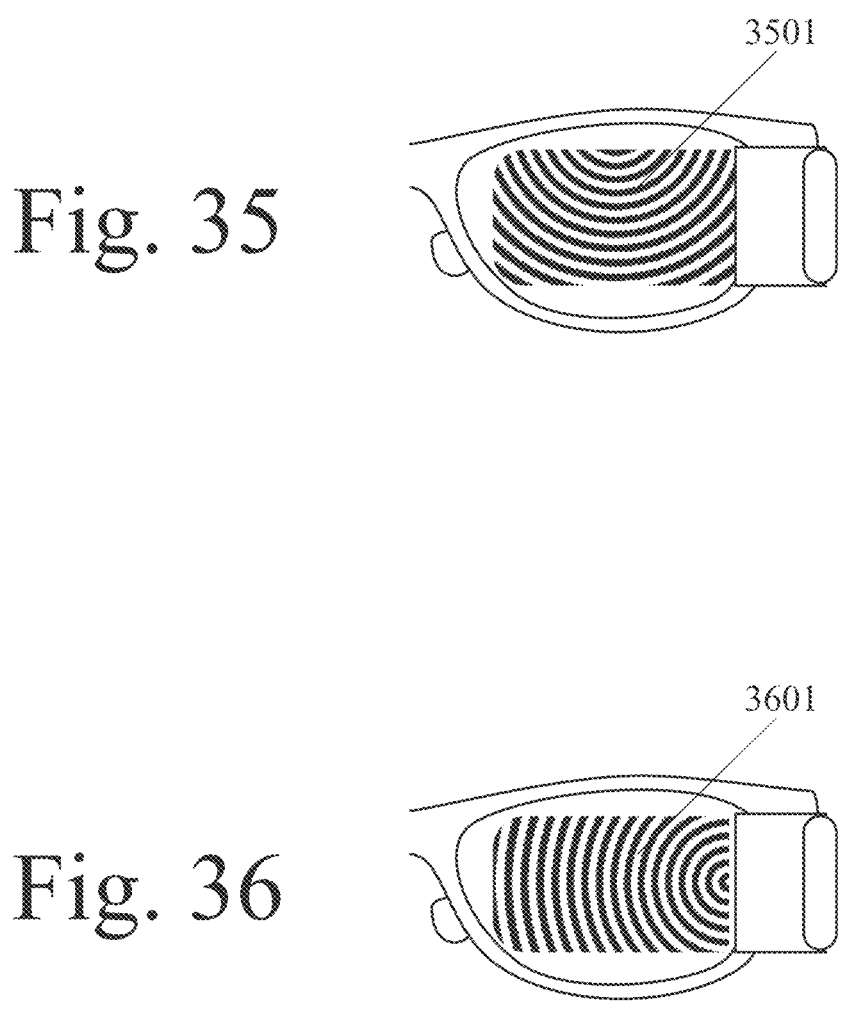

FIG. 35 shows an example of a virtual-object-display component 3501 with an upwardly-concave nested (e.g. concentric) array of optical (e.g. reflective and/or refractive) elements. In an example, a virtual-object-display component can comprise an upwardly-concave nested (e.g. concentric) array of (partially) reflective optical elements. In an example, a virtual-object-display component can comprise an upwardly-concave nested (e.g. concentric) array of refractive optical elements. In an example, a virtual-object-display component with an upwardly-concave nested (e.g. concentric) array of optical elements can comprise a diffraction grating. In an example, a virtual-object-display component with an upwardly-concave nested (e.g. concentric) array of optical elements can comprise a Bragg grating. In an example, a virtual-object-display component with an upwardly-concave nested (e.g. concentric) array of optical elements can comprise a lenticular pattern. In an example, a virtual-object-display component with an upwardly-concave nested (e.g. concentric) array of optical elements can comprise a (section of a) Fresnel lens. In an example, a virtual-object-display component with an upwardly-concave nested (e.g. concentric) array of optical elements can comprise a (section of a) Fresnel reflector.

In an example, a virtual-object-display component with an upwardly-concave nested (e.g. concentric) array of optical elements can be used in combination with a light emitter (or array of light emitters) located in a portion of an eyewear front piece (e.g. upper rim) which is above a person's eye to display a virtual object in the person's field of view. In an example, a virtual-object-display component with an upwardly-concave nested (e.g. concentric) array of optical elements can reflect and/or refract light from a light emitter (or array of light emitters) located in a portion of an eyewear front piece (e.g. upper rim) which is above a person's eye to display a virtual object in the person's field of view. Relevant example variations which are discussed elsewhere in this disclosure or in priority-linked disclosures can also be applied to this example.

FIG. 36 shows an example of a virtual-object-display component 3601 with an laterally-concave nested (e.g. concentric) array of optical (e.g. reflective and/or refractive) elements. In an example, a virtual-object-display component can comprise an laterally-concave nested (e.g. concentric) array of (partially) reflective optical elements. In an example, a virtual-object-display component can comprise an laterally-concave nested (e.g. concentric) array of refractive optical elements. In an example, a virtual-object-display component with an laterally-concave nested (e.g. concentric) array of optical elements can comprise a diffraction grating. In an example, a virtual-object-display component with an laterally-concave nested (e.g. concentric) array of optical elements can comprise a Bragg grating. In an example, a virtual-object-display component with an laterally-concave nested (e.g. concentric) array of optical elements can comprise a lenticular pattern. In an example, a virtual-object-display component with an laterally-concave nested (e.g. concentric) array of optical elements can comprise a (section of a) Fresnel lens. In an example, a virtual-object-display component with an laterally-concave nested (e.g. concentric) array of optical elements can comprise a (section of a) Fresnel reflector.

In an example, a virtual-object-display component with an laterally-concave nested (e.g. concentric) array of optical elements can be used in combination with a light emitter (or array of light emitters) located to one side of a person's eye (e.g. on an eyewear sidepiece) to display a virtual object in the person's field of view. In an example, a virtual-object-display component with an laterally-concave nested (e.g. concentric) array of optical elements can reflect and/or refract light from a light emitter (or array of light emitters) located to one side of a person's eye (e.g. on an eyewear sidepiece) to display a virtual object in the person's field of view. Relevant example variations which are discussed elsewhere in this disclosure or in priority-linked disclosures can also be applied to this example.

Figure 37:
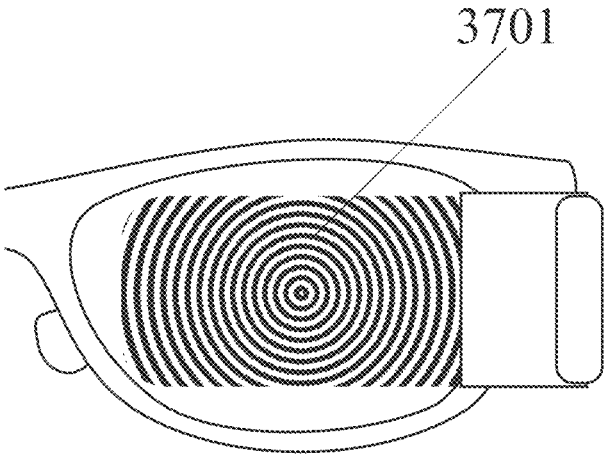
FIG. 37 shows a virtual-object-display component with a centrally-nested (e.g. concentric) array of optical elements.

FIG. 37 shows an example of a virtual-object-display component 3701 with a centrally-nested (e.g. concentric) array of optical (e.g. reflective and/or refractive) elements. In an example, a virtual-object-display component can comprise a centrally-nested (e.g. concentric) array of (partially) reflective optical elements. In an example, a virtual-object-display component can comprise a centrally-nested (e.g. concentric) array of refractive optical elements. In an example, a virtual-object-display component with a centrally-nested (e.g. concentric) array of optical elements can comprise a diffraction grating. In an example, a virtual-object-display component with a centrally-nested (e.g. concentric) array of optical elements can comprise a Bragg grating. In an example, a virtual-object-display component with a centrally-nested (e.g. concentric) array of optical elements can comprise a lenticular pattern. In an example, a virtual-object-display component with a centrally-nested (e.g. concentric) array of optical elements can comprise a Fresnel lens. In an example, a virtual-object-display component with a centrally-nested (e.g. concentric) array of optical elements can comprise a Fresnel reflector.

In an example, a virtual-object-display component with a centrally-nested (e.g. concentric) array of optical elements can be used in combination with a plurality of light emitters (or arrays of light emitters) at different locations (on an eyewear front piece rim) around a person's eye in order to display a virtual object in the person's field of view. In an example, a virtual-object-display component with a centrally-nested (e.g. concentric) array of optical elements can reflect and/or refract light from a plurality of light emitters (or arrays of light emitters) at different locations (on an eyewear front piece rim) around a person's eye in order to display a virtual object in the person's field of view. Relevant example variations which are discussed elsewhere in this disclosure or in priority-linked disclosures can also be applied to this example.

Figure 38:
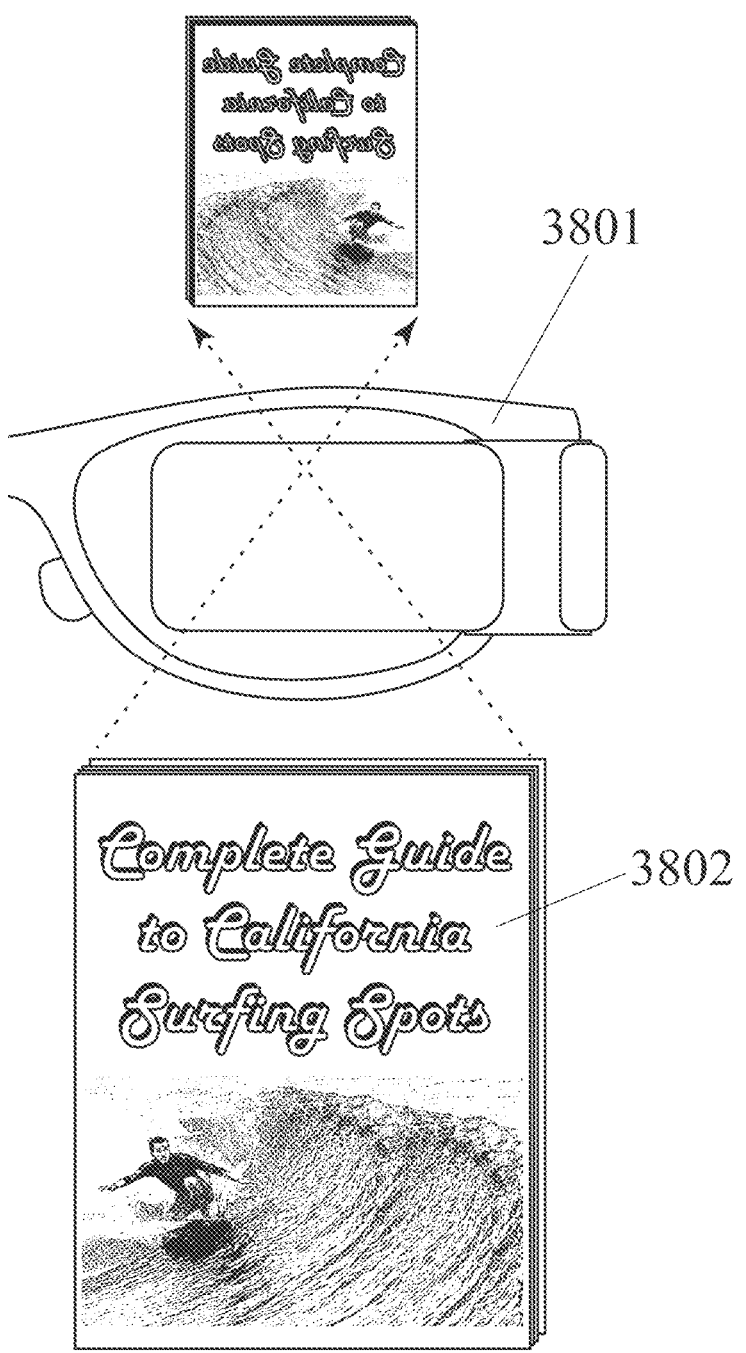
FIG. 38 shows a system comprising an eyewear frame and a waveguide.

FIG. 38 shows an example an augmented reality eyewear system comprising: an eyewear frame 3801; and a waveguide 3802. In an example, a waveguide can provide information concerning one or more attributes selected from the group consisting of: tube, trough, point break, hanging loose, groundswell, duck dive, barrel, mushburger, backwash, double (or triple) overhead, caught inside, chandelier, closeout, point break, impact zone, line-up, party wave, pit, pocket, rest, rip current, rogue wave, surging wave, swell period, wave lip, wedge, and whitewater. Relevant example variations which are discussed elsewhere in this disclosure or in priority-linked disclosures are unlikely to be applicable to this example.

In an example, augmented reality eyewear can comprise: a first-side see-through optical component which is configured to be in front of a person's first-side eye; a second-side see-through optical component which is configured to be in front of the person's second-side eye; an eyewear front piece which holds the first-side see-through optical component and the second-side see-through optical component in front of the person's first-side eye and second-side eye, respectively; a first-side eyewear sidepiece which connects the eyewear front piece to the person's first-side car; a second-side eyewear sidepiece which connects the eyewear front piece to the person's second-side car; and a first-side virtual-object-display component which displays a virtual object in the person's field of view; wherein the first-side virtual-object-display component has a first configuration along the first-side eyewear sidepiece and the first-side virtual-object-display component does not display a virtual object in the person's field of view; and wherein the first-side virtual-object-display component has a second configuration along the first-side see-through optical component and the first-side virtual-object-display component displays a virtual object in the person's field of view.

In an example, augmented reality eyewear can comprise: a first-side see-through optical component which is configured to be in front of a person's first-side eye; a second-side see-through optical component which is configured to be in front of the person's second-side eye; an eyewear front piece which holds the first-side see-through optical component and the second-side see-through optical component in front of the person's first-side eye and second-side eye, respectively; a first-side eyewear sidepiece which connects the eyewear front piece to the person's first-side car; a second-side eyewear sidepiece which connects the eyewear front piece to the person's second-side car; and a first-side virtual-object-display component which displays a virtual object in the person's field of view; wherein the first-side virtual-object-display component has a first configuration on the first-side eyewear sidepiece and the first-side virtual-object-display component does not display a virtual object in the person's field of view; and wherein the first-side virtual-object-display component has a second configuration in front of the first-side eye and the first-side virtual-object-display component displays a virtual object in the person's field of view.

In an example, augmented reality eyewear can comprise: a first-side see-through optical component which is configured to be in front of a person's first-side eye; a second-side see-through optical component which is configured to be in front of the person's second-side eye; an eyewear front piece which holds the first-side see-through optical component and the second-side see-through optical component in front of the person's first-side eye and second-side eye, respectively; a first-side eyewear sidepiece which connects the eyewear front piece to the person's first-side car; a second-side eyewear sidepiece which connects the eyewear front piece to the person's second-side ear; and a first-side virtual-object-display component which displays a virtual object in the person's field of view; wherein the first-side virtual-object-display component has a first configuration on the first-side eyewear sidepiece and the first-side virtual-object-display component does not display a virtual object in the person's field of view; wherein the first-side virtual-object-display component has a second configuration in front of the first-side eye and the first-side virtual-object-display component displays a virtual object in the person's field of view, and wherein the first-side virtual-object-display component is pivoted between 240 and 300 degrees from the first configuration to the second configuration.

In an example, the first-side see-through optical component can be a lens. In an example, the eyewear can further comprise at least one light emitter on the first-side eyewear sidepiece, wherein the first-side virtual-object-display component reflects and/or refracts light from the at least one light emitter toward the person's first-side eye when the first-side virtual-object-display component is in its second configuration. In an example, the eyewear can further comprise at least one light emitter on the eyewear front piece, wherein the first-side virtual-object-display component reflects and/or refracts light from the at least one light emitter toward the person's first-side eye when the first-side virtual-object-display component is in its second configuration. In an example. the at least one light emitter can be on a portion of the eyewear front piece which is above the person's first-side eye.

In an example, the first-side virtual-object-display component can be recessed, housed, and/or inserted in an opening, housing, and/or indentation in the first-side eyewear sidepiece in its first configuration. In an example, the first-side virtual-object-display component can be connected to the rest of the eyewear by a hinge or joint.

In an example, the first-side virtual-object-display component can be moved from its first configuration to its second configuration by pivoting from a location on the first-side eyewear sidepiece to a location in front of the person's first-side eye. In an example, the first-side virtual-object-display component can be pivoted between 240 and 300 degrees from its first configuration to its second configuration.

In an example, the first-side virtual-object-display component can be moved from its first configuration to its second configuration by first sliding out from a location on the first-side eyewear sidepiece and then pivoting to a location in front of the person's first-side eye. In an example, the eyewear can further comprise a sheath, housing, or cover, wherein the first-side virtual-object-display component is within the sheath, housing, or cover in its first configuration and comes out from the sheath, housing, or cover in its second configuration.

In an example, there can be a reversible connection mechanism on the eyewear front piece to which the first-side virtual-object-display component is reversibly connected in its second configuration. In an example, this connection mechanism can be selected from the group consisting of: latch, snap, clip, clasp, clamp, hook, pin, and magnet. In an example, this eyewear can further comprise a second-side virtual-object-display component which is laterally (e.g. right-to-left or left-to-right) symmetric to the first-side virtual-object-display component.

In an example, a method for changing eyewear from a first mode with a clear, bright, wide-angle view of the environment to a second mode which displays a virtual object in a person's field of view can comprise pivoting a first-side virtual-object-display component from a first configuration which is on a first-side eyewear sidepiece to a second configuration which is in front of the person's first-side eye. In an example, the first-side virtual-object-display can be pivoted between 240 and 300 degrees from the first configuration to the second configuration.

In an example, a method for changing eyewear from a first mode with a clear, bright, wide-angle view of the environment to a second mode which displays a virtual object in a person's field of view can comprise moving a first-side virtual-object-display component downward from a first configuration in a portion of an eyewear front piece which is above a person's first-side eye to a second configuration which is in front of the person's first-side eye.

In an example, the first-side virtual-object-display component can be pivoted downward from its first configuration to its second configuration. In an example, the first-side virtual-object-display component can be slid downward from its first configuration to its second configuration. In an example, the first-side virtual-object-display component can be rotated downward from its first configuration to its second configuration.

I claim:

1. Augmented reality eyewear comprising:
    a first-side see-through optical component which is configured to be in front of a person's first-side eye, wherein there is an opening and/or gap in the first-side see-through optical component;
    a second-side see-through optical component which is configured to be in front of the person's second-side eye;
    an eyewear front piece which holds the first-side see-through optical component and the second-side see-through optical component in front of the person's first-side eye and second-side eye, respectively;
    a first-side eyewear sidepiece which connects the eyewear front piece to the person's first-side ear;
    a second-side eyewear sidepiece which connects the eyewear front piece to the person's second-side ear; and
    a first-side virtual-object-display component which displays a virtual object in the person's field of view;
    wherein the first-side virtual-object-display component has a first configuration along the first-side eyewear sidepiece and the first-side virtual-object-display component does not display a virtual object in the person's field of view; and wherein the first-side virtual-object-display component has a second configuration in which the first-side virtual-object-display is inserted into the opening and/or gap in the first-side see-through optical component and the first-side virtual-object-display component displays a virtual object in the person's field of view.

2. The eyewear in claim 1 wherein the first-side see-through optical component is a lens.

3. The eyewear in claim 1 wherein the eyewear further comprises at least one light emitter on the first-side eyewear sidepiece and wherein the first-side virtual-object-display component reflects and/or refracts light from the at least one light emitter toward the person's first-side eye when the first-side virtual-object-display component is in the second configuration.

4. The eyewear in claim 1 wherein the eyewear further comprises at least one light emitter on the eyewear front piece and wherein the first-side virtual-object-display component reflects and/or refracts light from the at least one light emitter toward the person's first-side eye when the first-side virtual-object-display component is in the second configuration.

5. The eyewear in claim 4 wherein the at least one light emitter is on the eyewear front piece above the first-side eye.

6. The eyewear in claim 1 wherein the first-side virtual-object-display component is recessed, housed, and/or inserted in an opening, housing, and/or indentation in the first-side eyewear sidepiece in the first configuration.

7. The eyewear in claim 1 wherein the first-side virtual-object-display component is connected to the rest of the eyewear by a hinge or joint.

8. The eyewear in claim 1 wherein the first-side virtual-object-display component is moved from the first configuration to the second configuration by pivoting from a location on the first-side eyewear sidepiece to a location in front of the person's first-side eye.

9. The eyewear in claim 8 wherein the first-side virtual-object-display component is pivoted between 240 and 300 degrees from the first configuration to the second configuration.

10. The eyewear in claim 1 wherein the first-side virtual-object-display component is moved from the first configuration to the second configuration by first sliding out from a location on the first-side eyewear sidepiece and then pivoting to a location in front of the person's first-side eye.

11. The eyewear in claim 1 wherein the eyewear further comprises a sheath, housing, or cover, wherein the first-side virtual-object-display component is within the sheath, housing, or cover in the first configuration and comes out from the sheath, housing, or cover in the second configuration.

12. The eyewear in claim 1 wherein there is a reversible connection mechanism on the eyewear front piece to which the first-side virtual-object-display component is reversibly connected in the second configuration.

13. The eyewear in claim 12 wherein the connection mechanism is selected from the group consisting of: latch, snap, clip, clasp, clamp, hook, pin, and magnet.

14. The eyewear in claim 1 wherein the eyewear further comprises a second-side virtual-object-display component which is symmetric to the first-side virtual-object-display component.

* * * * *